(12) United States Patent
Prabhakar et al.

(10) Patent No.: US 10,628,353 B2
(45) Date of Patent: Apr. 21, 2020

(54) ENABLING USE OF NON-VOLATILE MEDIA-EXPRESS (NVME) OVER A NETWORK

(71) Applicant: Diamanti, Inc., San Jose, CA (US)

(72) Inventors: Venkatesh Prabhakar, San Jose, CA (US); Amitava Guha, San Jose, CA (US); Hiral Patel, San Jose, CA (US); Sunden Chen, San Jose, CA (US)

(73) Assignee: Diamanti, Inc., San Jose, CA (US)

( * ) Notice: Subject to any disclaimer, the term of this patent is extended or adjusted under 35 U.S.C. 154(b) by 0 days.

(21) Appl. No.: 15/821,467

(22) Filed: Nov. 22, 2017

(65) Prior Publication Data

US 2018/0095915 A1    Apr. 5, 2018

Related U.S. Application Data

(63) Continuation of application No. PCT/US2016/035474, filed on Jun. 2, 2016, and a continuation-in-part of application No. 14/640,717, filed on Mar. 6, 2015, said application No. PCT/US2016/035474 is a continuation-in-part of application No. 14/640,717, filed on Mar. 6, 2015.

(Continued)

(51) Int. Cl.
 *G06F 13/28* (2006.01)
 *G06F 13/42* (2006.01)
 (Continued)

(52) U.S. Cl.
 CPC .............. *G06F 13/28* (2013.01); *G06F 3/061* (2013.01); *G06F 3/067* (2013.01); *G06F 3/0613* (2013.01);
 (Continued)

(58) Field of Classification Search
 CPC ........ G06F 13/28; G06F 3/0613; G06F 3/0659; G06F 3/0679; G06F 13/385;
 (Continued)

(56) References Cited

U.S. PATENT DOCUMENTS 6,347,087 B1    2/2002 Cathey et al.
6,553,000 B1    4/2003 Ganesh et al.
(Continued)

FOREIGN PATENT DOCUMENTS

EP    993162 B1    12/2005
EP    993156 B1    1/2007
(Continued)

OTHER PUBLICATIONS

U.S. Appl. No. 15/783,155, filed Oct. 13, 2017, Pending.
(Continued)

*Primary Examiner* — Tan Doan
(74) *Attorney, Agent, or Firm* — GTC Law Group PC & Affiliates

(57) ABSTRACT

Enabling a protocol for efficiently and reliably using the NVME protocol over a network, referred to as NVME over Network, or NVMEoN, may include an NVMEoN exchange layer for handling exchanges between initiating and target nodes on a network, a burst transmission protocol that provides guaranteed delivery without duplicate retransmission, and an exchange status block approach to manage state information about exchanges.

8 Claims, 66 Drawing Sheets

Related U.S. Application Data

(60) Provisional application No. 62/170,544, filed on Jun. 3, 2015, provisional application No. 61/950,036, filed on Mar. 8, 2014.

(51) Int. Cl.

| | |
|---|---|
| *G06F 3/06* | (2006.01) |
| *G06F 13/40* | (2006.01) |
| *H04L 1/00* | (2006.01) |
| *H04L 12/801* | (2013.01) |
| *H04L 1/18* | (2006.01) |
| *H04L 12/805* | (2013.01) |
| *H04L 29/08* | (2006.01) |
| *H04L 12/861* | (2013.01) |
| *G06F 13/38* | (2006.01) |
| *G06F 9/455* | (2018.01) |
| *H04L 29/06* | (2006.01) |
| *H04L 1/16* | (2006.01) |

(52) U.S. Cl.
CPC .......... *G06F 3/0659* (2013.01); *G06F 3/0664* (2013.01); *G06F 3/0679* (2013.01); *G06F 9/455* (2013.01); *G06F 13/385* (2013.01); *G06F 13/4022* (2013.01); *G06F 13/4282* (2013.01); *H04L 1/009* (2013.01); *H04L 1/189* (2013.01); *H04L 47/36* (2013.01); *H04L 47/39* (2013.01); *H04L 49/9005* (2013.01); *H04L 67/1097* (2013.01); *H04L 67/14* (2013.01); *H04L 69/04* (2013.01); *G06F 2213/0026* (2013.01); *H04L 1/1614* (2013.01); *H04L 1/1848* (2013.01); *H04L 2001/0094* (2013.01)

(58) Field of Classification Search
CPC ............. G06F 13/4022; G06F 13/4282; G06F 2213/0026; G06F 12/0246; G06F 2212/2022; G06F 2212/7211; G06F 2212/7208; G06F 2212/72; H04L 1/009; H04L 1/189; H04L 47/36; H04L 47/39; H04L 49/9005; H04L 67/1097; H04L 2001/0094
USPC ......................................................... 709/212
See application file for complete search history.

(56) References Cited

U.S. PATENT DOCUMENTS

| | | | |
|---|---|---|---|
| 6,678,269 B1 | 1/2004 | Michels et al. | |
| 6,956,854 B2 | 10/2005 | Ganesh et al. | |
| 7,065,082 B2 | 6/2006 | Cathey et al. | |
| 7,386,546 B1 | 6/2008 | Santry et al. | |
| 7,711,789 B1 | 5/2010 | Jnagal et al. | |
| 8,340,005 B1 | 12/2012 | Belhadj et al. | |
| 8,850,130 B1 | 9/2014 | Aron et al. | |
| 8,996,644 B2 | 3/2015 | Pope et al. | |
| 9,137,165 B2 | 9/2015 | Anand et al. | |
| 9,621,642 B2 | 4/2017 | Ganesh et al. | |
| 2001/0053150 A1 | 12/2001 | Clear et al. | |
| 2003/0004975 A1 | 1/2003 | Nakano et al. | |
| 2003/0110300 A1 | 6/2003 | Chen et al. | |
| 2004/0210584 A1 | 10/2004 | Nir et al. | |
| 2004/0233910 A1 | 11/2004 | Chen et al. | |
| 2007/0028138 A1 | 2/2007 | Noya et al. | |
| 2007/0088904 A1 | 4/2007 | Sinclair | |
| 2008/0043732 A1 | 2/2008 | Desai et al. | |
| 2008/0123638 A1 | 5/2008 | Liao et al. | |
| 2009/0003361 A1 | 1/2009 | Bakthavathsalam et al. | |
| 2009/0161684 A1* | 6/2009 | Voruganti | H04L 49/90 370/412 |
| 2009/0185551 A1* | 7/2009 | Winter | H04L 12/66 370/351 |
| 2009/0248994 A1* | 10/2009 | Zheng | G06F 9/5016 711/151 |
| 2010/0005234 A1 | 1/2010 | Ganga et al. | |
| 2010/0131881 A1 | 5/2010 | Ganesh et al. | |
| 2011/0191522 A1 | 8/2011 | Condict et al. | |
| 2012/0066430 A1* | 3/2012 | Cooper | G06F 13/4022 710/316 |
| 2012/0072716 A1 | 3/2012 | Hu et al. | |
| 2012/0079096 A1 | 3/2012 | Cowan et al. | |
| 2012/0284587 A1 | 11/2012 | Yu et al. | |
| 2012/0317393 A1 | 12/2012 | Driever et al. | |
| 2013/0019057 A1 | 1/2013 | Stephens | |
| 2013/0094356 A1* | 4/2013 | Keith | H04L 47/2433 370/229 |
| 2013/0131869 A1 | 5/2013 | Majewski et al. | |
| 2013/0138912 A1* | 5/2013 | Bux | G06F 12/0646 711/170 |
| 2013/0198312 A1 | 8/2013 | Tamir et al. | |
| 2013/0204849 A1 | 8/2013 | Chacko | |
| 2013/0232267 A1 | 9/2013 | Shatzkamer et al. | |
| 2013/0254829 A1 | 9/2013 | Jakubowski et al. | |
| 2013/0268496 A1 | 10/2013 | Baldwin et al. | |
| 2013/0290601 A1 | 10/2013 | Sablok et al. | |
| 2013/0340088 A1 | 12/2013 | Thadikaran et al. | |
| 2014/0052706 A1 | 2/2014 | Misra et al. | |
| 2014/0095826 A1 | 4/2014 | Rajagopal et al. | |
| 2014/0115420 A1* | 4/2014 | Willey | H04L 12/4641 714/758 |
| 2014/0201541 A1 | 7/2014 | Paul et al. | |
| 2014/0301395 A1 | 10/2014 | Khanal et al. | |
| 2014/0372616 A1 | 12/2014 | Ganesh et al. | |
| 2015/0006663 A1* | 1/2015 | Huang | G06F 13/4221 709/213 |
| 2015/0067086 A1 | 3/2015 | Adriaens et al. | |
| 2015/0160962 A1 | 6/2015 | Borntraeger et al. | |
| 2015/0163014 A1* | 6/2015 | Birrittella | H04L 1/08 714/807 |
| 2015/0199151 A1 | 7/2015 | Klemm et al. | |
| 2015/0254088 A1 | 9/2015 | Chou et al. | |
| 2017/0177222 A1 | 6/2017 | Singh et al. | |
| 2018/0039412 A1 | 2/2018 | Singh et al. | |

FOREIGN PATENT DOCUMENTS

| | | | |
|---|---|---|---|
| EP | 2372521 A2 | 10/2011 | |
| JP | 2012212192 A | 11/2012 | |
| KR | 1020080052846 A | 6/2008 | |
| WO | 2010048238 A1 | 4/2010 | |
| WO | 2015138245 A1 | 9/2015 | |
| WO | 2016196766 A2 | 12/2016 | |
| WO | 2016196766 A3 | 1/2017 | |

OTHER PUBLICATIONS

"ISCSI Management", API Version 2.0 rev 15 (SNIA Technical Position Jun. 30, 2008), Jun. 30, 2008.

15761423.1, "European Application Serial No. 15761423.1, Extended European Search Report Received dated Sep. 28, 2017", Diamanti, Inc., 7 Pages.

Kim, et al., "Building Fast, Dense, Low-Power Caches Using Erasure-Based Inline Multi-Bit ECC", 2013 IEEE 19th Pacific Rim International Symposium on Dependable Computing, pp. 102, 105.

PCT/US2015/019206, "International Application Serial No. PCT/US2015/011697, International Search Report and Written Opinion dated May 28, 2015", Data Wise Systems, Inc., 15 pages.

PCT/US2015/019206, "International Application Serial No. PCT/US2015/019206, International Preliminary Report on Patentability and Written Opinion dated Sep. 22, 2016", Diamanti, Inc., 12 Pages.

PCT/US2016/035474, "Application Serial No. PCT/US2016/035474, International Search Report dated Dec. 1, 2016", 14 pages.

PCT/US2016/035474, "International Application Serial No. PCT/US2016/035474, International Preliminary Report on Patentability dated Dec. 14, 2017", Diamanti, Inc., 10 Pages.

(56) References Cited

OTHER PUBLICATIONS

Lee, et al., "System and Method of Vector-OMA cache-XOR for MPCC Erasure Coding", U.S. Appl. No. 61/886,480, 2013, 10 pages.

* cited by examiner

2700 — Provide a converged storage and networking controller, wherein a gateway provides a connection for network and storage traffic between a storage component and a networking component of the device without intervention of the operating system of a host computer.

2702 — Map the at least one application or container to a target physical storage device that is controlled by the converged storage and networking controller, such that the application or container can access the target physical storage, without intervention of the operating system of the host system to which the target physical storage is attached, when the application or container is moved to another computing system.

Fig. 27

Provide a converged storage and networking controller, wherein a gateway provides a connection for network and storage traffic between a storage component and a networking component of the device without intervention of the operating system of a host computer. — 2800

Without intervention of the operating system of a host computer, manage at least one quality of service (QoS) parameter related to a network in the data path of which the storage and networking controller is deployed, such managing being based on at least one of the storage traffic and the network traffic that is handled by the converged storage and networking controller. — 2802

Fig. 28

| Initiator | Target | Exchange id | State |
|---|---|---|---|
| E8:66:C4:00:00:01 | E8:66:C4:00:00:02 | 0x0001:0x0002 | OPEN |

| State | Trigger for Initiator | Trigger for Target |
|---|---|---|
| OPEN | Sending NVME command | Receiving NVME command |
| DATA XFER | Receiving Xfer Rdy for Write Sending Xfer Rdy for Read | Sending Xfer Rdy for Write Receiving Xfer Rdy for Read |
| CLEANUP | Abort, Controller Reset etc from upper levels | Receiving NVMEoN Cleanup Command (explained in later subsection) |
| CLOSED | Receiving NVME status | Sending NVME status |

Fig. 43

| Scenario | Total packets with NVMEoN and BTP | Total packets with Raw NVME |
|---|---|---|
| Single 4K I/O with no drops | 19 | 11 |
| 16 parallel 4K I/Os with no drops | 127 | 192 |
| Single 32K I/O with no drops | 47 | 88 |
| Single 128K I/O with no drops | 152 | 352 |
| Single 32K I/O with one packet drop | 51 | 99 |
| Single 32K I/O with two packet drops | 52 | 110 |

5600

5800

| DMAC |  |
|---|---|
| DMAC | SMAC |
| SMAC |  |
| .1Q Tag |  |
| EType = NVMEoN | Rsvd, Ver |
| BTP Type | BTP Opcode |
| Channel Id | Burst Id (24 bits) |
| Rsvd | Sequence Id (30 bits) |
| Rsvd | NVMEoN Opcode |
| IXID | TXID |
| NVME Command (payload) | |

BTP Type is 0 (BTP command packet)

BTP Opcode is 0

NVMEoN Opcode is 0 (NVME Command)

| DMAC |  |
|---|---|
| DMAC | SMAC |
| SMAC | |
| .1Q Tag | |
| EType = NVMEoN | Rsvd, Ver |
| BTP Type | BTP Opcode |
| Channel Id | Burst Id (24 bits) |
| Rsvd | Sequence Id (30 bits) |
| Rsvd | NVMEoN Opcode |
| IXID | TXID |
| Offset | Length |

BTP Type is 0 (BTP command packet)

BTP Opcode is 0

NVMEoN Opcode:
2 => Xfer Rdy
3 => Request Xfer Rdy

Offset and Length provides information on data transfer

| DMAC |
| DMAC | SMAC |
| SMAC |
| .1Q Tag |
| EType = NVMEoN | Rsvd, Ver |
| BTP Type | BTP Opcode |
| Channel Id | Burst Id (24 bits) |
| Rsvd | Sequence Id (30 bits) |
| Rsvd | NVMEoN Opcode |
| Num Exchange Ids |
| IXID | TXID |

BTP Type is 0 (BTP command packet)

BTP Opcode is 0

NVMEoN Opcode is
4 => Cleanup Request
5 => Cleanup Response

List of IXIDs & TXIDs

Fig. 62

| Control Packet | CTL bits (binary) | Meaning |
|---|---|---|
| Request Credit | 01 | Command packet |
| Request Credit | 10 | Batched Command packet |
| Request Credit | 11 | Data packet |
| Grant Credit | 01 | Already received in previous burst window |
| Grant Credit | 10 | Credit granted for current burst window |
| ACK | 01 | Not received in current burst window |
| ACK | 10 | Received in current burst window |

ENABLING USE OF NON-VOLATILE MEDIA-EXPRESS (NVME) OVER A NETWORK

CROSS REFERENCE TO RELATED APPLICATIONS

This application is a continuation in part of U.S. patent application Ser. No. 14/640,717 filed Mar. 6, 2015 and entitled "Methods and Systems for Converged Networking and Storage" (DWIS-0004-U01).

This application also is a continuation of International Application No. PCT/US2016/035474, filed on Jun. 2, 2016, and entitled "Enabling Use of Non-Volatile Media—Express (NVME) Over a Network" (DWIS-0005-WO).

PCT/US2016/035474 claims the benefit of U.S. Provisional Patent Application No. 62/170,544 filed on Jun. 3, 2015 (DWIS-0005-P01).

PCT/US2016/035474 is also a continuation in part of U.S. patent application Ser. No. 14/640,717 filed Mar. 6, 2015 that claims the benefit of provisional application U.S. patent application 61/950,036, filed Mar. 8, 2014 and entitled "Method and Apparatus for Application Driven Storage Access" (DWIS-0002-P01).

Each of the foregoing applications is incorporated herein by reference in its entirety.

FIELD OF THE INVENTION

This application relates to the fields of networking and data storage, and more particularly to the field of converged networking and data storage devices.

BACKGROUND OF THE INVENTION

Storage protocols have been designed in the past to provide reliable delivery of data. Examples include Fibre channel (FC), Fibre Channel over Ethernet (FCoE), and iSCSI, including RDMA-capable transports (e.g., Infiniband™, etc). NVMe is a relatively recent storage protocol that is designed for a new class of storage media, such as NAND Flash™, and the like. As the name NVMe (Non volatile Media—express) suggests, NVMe is a protocol highly optimized for media that is close to the speeds of DRAM, as opposed that of to Hard Disk Drives (HDDs). NVMe is typically accessed on a host system via a driver over the PCIe interface of the host. However, as noted above, methods and systems disclosed herein provide for accessing NVMe over a network. Since the latency of DRAM and similar media is orders of magnitude lower than that of HDDs, the approach for accessing NVMe over a network may preferably entail minimal overhead (in terms of latency). As such, there is a need to design a protocol to access NVMe devices over the network via a lightweight protocol.

Also, NVMe is designed to operate over a PCIe interface, where there are hardly any packet drops. So, the error recovery mechanisms built into conventional NVMe are based primarily on large I/O timeouts implemented in the host driver. To enable use of NVMe over a network, a need exists to account for errors that result from packet drops.

The proliferation of scale-out applications has led to very significant challenges for enterprises that use such applications. Enterprises typically choose between solutions like virtual machines (involving software components like hypervisors and premium hardware components) and so-called "bare metal" solutions (typically involving use of an operating system like Linux™ and commodity hardware. At large scale, virtual machine solutions typically have poor input-output (IO) performance, inadequate memory, inconsistent performance, and high infrastructure cost. Bare metal solutions typically have static resource allocation (making changes in resources difficult and resulting in inefficient use of the hardware), challenges in planning capacity, inconsistent performance, and operational complexity. In both cases, inconsistent performance characterizes the existing solutions. A need exists for solutions that provide high performance in multi-tenant deployments, that can handle dynamic resource allocation, and that can use commodity hardware with a high degree of utilization.

FIG. 1 depicts the general architecture of a computing system 102, such as a server, functions and modules of which may be involved in certain embodiments disclosed herein. Storage functions (such as access to local storage devices on the server 102, such as media 104 (e.g., rotating media or flash) and network functions such as forwarding have traditionally been performed separately in either software stacks or hardware devices (e.g., involving a network interface controller 118 or a storage controller 112, for network functions or storage functions, respectively). Within an operating system stack 108 (which may include an operating system and a hypervisor in some embodiments including all the software stacks associated with storage and networking functions for the computing system), the software storage stack typically includes modules enabling use of various protocols that can be used in storage, such as the small computer system interface (SCSI) protocol, the serial ATA (SATA) protocol, the non-volatile memory express (NVMe) protocol (a protocol for accessing disk-attached storage (DAS), like solid-state drives (SSDs), through the PCI Express (PCIe) bus 110 of a typical computing system 102) or the like. The PCIe bus 110 may provide an interconnection between a CPU 106 (with processor(s) and memory) and various IO cards. The storage stack also may include volume managers, etc. Operations within the storage software stack may also include data protection, such as mirroring or RAID, backup, snapshots, deduplication, compression and encryption. Some of the storage functions may be offloaded into a storage controller 112. The software network stack includes modules, functions and the like for enabling use of various networking protocols, such as Transmission Control Protocol/Internet Protocol (TCP/IP), the domain name system protocol (DNS), the address resolution protocol (ARP), forwarding protocols, and the like. Some of the network functions may be offloaded into a network interface controller 118 (or NIC) or the network fabric switch, such as via an ethernet connection 120, in turn leading to a network (with various switches, routers and the like). In virtualized environments, a NIC 118 may be virtualized into several virtual NICs as specified by SR-IOV under the PCI Express standard. Although not specified by the PCI Express standard and not as common, storage controllers can also be virtualized in a similar manner. This approach allows virtual entities, such as virtual machines, access to their own private resource.

Referring to FIG. 2, one major problem with hypervisors is with the complexity of IO operations. For example, in order to deal with an operation involving data across two different computers (computer system 1 and computer system 2 in FIG. 2), data must be copied repeatedly, over and over, as it moves among the different software stacks involved in local storage devices 104, storage controllers 112, the CPUs 106, network interface controller 118 and the hypervisor/operating systems 108 of the computers, resulting in large numbers of inefficient data copies for each IO operation whenever an activity is undertaken that involves moving data from one computer to another, changing the configuration of storage, or the like. The route 124 is one of many examples of the complex routes that data may take from one computer to another, moving up and down the software stacks of the two computers. Data that is sought by computing system 2 may be initially located in a local storage device 104, such as a disk, of computing system 1, then pulled by a storage controller card 112 (involving an IO operation and copying), send over the PCIe bus 110 (another IO operation) to the CPU 108 where it is handled by a hypervisor or other software component of the OS stack 108 of computing system 1. Next, the data may be delivered (another IO operation) through the network controller 118 and over the network 122 (another set of IO operations) to computing system 2. The route continues on computing system 2, where data may travel through the network controller 118 and to the CPU 106 of computing system 2 (involve additional IO operations), then sent over the PCIe bus 110 to the local storage controller 112 for storage, then back to the hypervisor/OS stack 108 for actual use. These operations may occur across a multiplicity of pairs of computing systems, with each exchange involving this kind of proliferation of IO operations (and many other routes are possible, each involving significant numbers of operations). Many such complex data replication and transport activities among computing systems are required in scaleout situations, which are increasingly adopted by enterprises. For example, when implementing a scaleout application like MongoDB™, customers must repeatedly run real time queries during rebalancing operations, and perform large scale data loading. Such activities involve very large numbers of IO operations, which result in poor performance in hypervisor solutions. Users of those applications also frequently re-shard (change the shards on which data is deployed), resulting in big problems for bare metal solutions that have static storage resource allocations, as migration of data from one location to another also involves many copying and transport operations, with large numbers of IO operations. As the amount of data used in scaleout applications grows rapidly, and the connectedness among disparate systems increases (such as in cloud deployments involving many machines), these problems grow exponentially. A need exists for storage and networking solutions that reduce the number and complexity of IO operations and otherwise improve the performance and scaleability of scaleout applications without requiring expensive, premium hardware.

Referring still to FIG. 2, for many applications and use cases, data (and in turn, storage) needs to be accessed across the network between computing systems 102. Three high-level steps of this operation include the transfer of data from the storage media of one computing system out of a box, movement across the network 122, and the transfer of data into a second box (second computing system 102) to the storage media 104 of that second computing system 102. First, out of the box transfer, may involve intervention from the storage controller 112, the storage stack in the OS 108, the network stack in the OS 108, and the network interface controller 118. Many traversals and copying across internal busses (PCIe 110 and memory) as well as CPU 106 processing cycles are spent. This not only degrades performance (creating latency and throughput issues) of the operation, but also adversely affects other applications that run on the CPU. Second, once the data leaves the box, 102 and moves onto the network 122, it is treated like any other network traffic and needs to be forwarded/routed to its destination. Policies are executed and decisions are made. In environments where a large amount of traffic is moving, congestion can occur in the network 122, causing degradation in performance as well as problems with availability (e.g., dropped packets, lost connections, and unpredictable latencies). Networks have mechanisms and algorithms to avoid spreading of congestion, such as pause functions, backward congestion notification (BCN), explicit congestion notification (ECN), etc. However, these are reactive methods; that is, they detect formation of congestion points and push back on the source to reduce congestion, potentially resulting in delays and performance impacts. Third, once the data arrives at its "destination" computing system 102, it needs to be processed, which involves intervention from the network interface controller 118, the network stack in the OS 108, the storage stack in the OS 108, and the storage controller 112. As with out of the box operations noted above, many traversals and copying across internal busses as well as CPU 106 processing cycles are spent. Further, the final destination of the data may well reside in still a different box. This can be the result of a need for more data protection (e.g., mirroring or across-box RAID) or the need for de-duplication. If so, then the entire sequence of out-of-the box, across the network, and into the box data transfer needs to be repeated again. As described, limitations of this approach include degradation in raw performance, unpredictable performance, impact on other tenants or operations, availability and reliability, and inefficient use of resources. A need exists for data transfer systems that avoid the complexity and performance impacts of the current approaches.

As an alternative to hypervisors (which provide a separate operating system for each virtual machine that they manage), technologies such as Linux™ containers have been developed (which enable a single operating system to manage multiple application containers). Also, tools such as Dockers have been developed, which provide provisioning for packaging applications with libraries. Among many other innovations described throughout this disclosure, an opportunity exists for leveraging the capabilities of these emerging technologies to provide improved methods and systems for scaleout applications.

SUMMARY

Referring to FIG. 29 and subsequent figures, methods and systems are provided herein to enable use of NVME over a network, such as an Ethernet network. Such methods and systems are referred to in some cases as NVMEoN, of which an embodiment is NVME over Ethernet, or NVMEoE. In order to run NVMe over a network (such as Ethernet) where there tend to be packet drops, a protocol is provided that (a) provides guaranteed delivery of NVMe commands and data over the network and (b) converges quickly from network drops without adversely affecting I/O performance. The embodiments described below provide specification of a protocol to run NVMe reliably over a network, such as Ethernet, that can drop packets.

The NVMEoN protocol enabled herein is designed with no assumption made about the underlying network being Layer 2 or Layer 3. The endpoints may be defined generically, with constraint as to the type of host. Various options for network encapsulation for implementation and standardization are described below.

Among other characteristics, the NVMEoN protocol may fit into the generic NVME architecture and be standardizable; work independent of other lossless protocols in the network, including with built-in error detection and recovery; minimize overhead introduced in the network; dynamically carve receiver's resources (buffers) across multiple senders; and be easily implementable through a combination of hardware and software modules (e.g., to achieve minimal latency overhead and to use hardware functions where beneficial).

Elements of the methods and systems disclosed herein may include various components, processes, features and the like, which are described in more detail below. These may include an NVMEoN Exchange Layer, a layer in NVMEoN that maintains exchanges for every NVME command. Also provided below is a Burst Transmission Protocol (BTP) layer in NVMEoN that provides guaranteed delivery. Also provided is a proxy NVME controller, an NVME controller that is used to terminate PCIe level transactions of NVME commands and transport them over a network. Also, one or more remote NVME controllers may include virtual NVME controllers that can handle NVME commands received over a network.

As noted elsewhere throughout this disclosure, a "node" may refer to any host computer on a network, such as any server. An initiator may comprise a node that initiates a command (such as an NVME command), while a target may comprise a node that is a destination of an NVME command. A mode may include an NVME driver, which may be a conventional NVME driver that runs on a Linux or Windows server. The host may include a host CPU, a processor on which applications run. A host may have an embedded CPU, a processor on which NVMEoN-specific control agents run.

As described below, NVMEoN may involve exchanges. Each NVME command may be translated by the NVMEoN exchange layer, such as at an initiator, into a unique exchange for purposes of tracking the exchanges over a network. An Exchange Status Block (ESB), may comprise a table of open exchanges and their state information.

The conventional NVME protocol on a host typically runs with an NVME Driver (e.g., in the Linux kernel) accessing an NVME controller over PCIe. The NVME controller translates the NVME I/O commands into actual reads/writes, such as to a NAND Flash drive. NVMEoN, as disclosed herein, extends this NVME protocol over a network with no assumptions as to the absence of losses in the network.

Methods and systems enabling use of non-volatile Media-express (NVME) over a network may include a system of an exchange layer for maintaining information about exchanges for every NVME command sent between an initiator node and a target node on the network; a burst transmission protocol layer that encapsulates the command packets and the data packets for a plurality of I/O commands into a burst window and that enables guaranteed delivery of data packets between a source node and a target node while avoiding retransmission of duplicate packets; a proxy NVME controller located on a host node attached to a network that takes PCIe level transactions of NVME commands from the host and transports them over a network; a virtual NVME controller adapted to receive NVME commands received over a network; and a credit redistribution algorithm for managing burst transmission protocol buffers among receivers and senders. The system may further comprise a burst transmission protocol that facilitates initiating and closing of a burst window based on a credit distribution algorithm that takes into account fairness, packet losses in a network, and priority, wherein the burst window is configurable based on at least one of a type of data, type of network and network conditions.

In the methods and systems, the exchange layer responds to a least one of an NVME command completion failure, an NVME Aborts and an NVME controller reset by applying a unified error recovery protocol and exchange timeouts. The exchange layer further using a concurrent exchange algorithm to control the number of outstanding exchanges between a sender and a receiver. The exchange layer further using a concurrent exchange algorithm to limit the number of outstanding exchanges between an initiator and a target.

In the methods and systems, an initiator and target follow a state machine in lock step across a plurality of network protocol layers using a transfer ready-based control mechanism. The transfer ready-based control mechanism facilitates completing exchanges and preserving data integrity.

In the methods and systems, the burst transmission protocol layer uses a credit algorithm to control flow of packets, the credit algorithm enabling controlling flow of packets on a sender-specific basis that facilitates controlling packet flow differently for different senders. The burst transmission protocol layer further provides guaranteed delivery of command and data buffers by detecting packet losses and in response thereto using acknowledgements and selective retransmission. The burst transmission protocol layer further avoids retransmission of duplicate packets by using acknowledgements and selective retransmission. The burst transmission protocol layer further uses multiple channels for high throughput and network utilization. Also the burst transmission protocol layer avoids fragmentation of packets by performing maximum transmission unit (MTU) discovery and applying the discovered MTU to burst transmissions. The burst transmission protocol aggregates NVME flows across command and data buffers, optionally increasing burst size to decrease network overhead. In addition, the burst transmission protocol meets pipelining requirements through the use of one of software, hardware and a combination of hardware and software.

Methods and systems enabling use of non-volatile Media—express may include maintaining information about exchanges for every NVME command sent between an initiator node and a target node on a network in an exchange status block by an exchange layer executing on at least one node that is accessible over the network; encapsulating command packets and data packets for a plurality of I/O commands into a burst window that enables delivery of data packets between a source node and a target node while avoiding retransmission of duplicate packets; transporting PCIe level transactions of NVME commands to a virtual NVME controller executing on a node over the network with a proxy NVME controller located on a host node attached to the network; and managing burst transmission protocol buffers among receivers and senders based on a credit redistrubution algorithm that assures a minimum of one command and one data buffer per sender is provided by a receiver and that limits a sender to a predefined maximum number of command and data buffers. The methods and systems may further include initiating closing of a burst window that is configurable based on at least one of a type of data, type of network and network conditions, wherein a burst transmission protocol facilitates the initiating closing of the burst window.

Methods and systems for enabling use of non-volatile Media-express (NVME) over a network include a burst transmission protocol that uses credit distribution algorithm to distribute buffers among a plurality of senders by accounting for fairness and priority of Quality of Service (QoS) policies. The burst transmission protocol uses a backoff algorithm at at least one of the plurality of senders when congestion is detected at a receiver to which the at least one sender sends a data packet, wherein the backoff algorithm dynamically adjusts a burst window size to reduce the detected congestion.

Provided herein are methods and systems that include a converged storage and network controller in hardware that combines initiator, target storage functions and network functions into a single data and control path, which allows a "cut-through" path between the network and storage, without requiring intervention by a host CPU. For ease of reference, this is referred to variously in this disclosure as a converged hardware solution, a converged device, a converged adaptor, a converged IO controller, a "datawise" controller, or the like throughout this disclosure, and such terms should be understood to encompass, except where context indicates otherwise, a converged storage and network controller in hardware that combines target storage functions and network functions into a single data and control path.

Among other benefits, the converged solution will increase raw performance of a cluster of computing and/or storage resources; enforce service level agreements (SLAs) across the cluster and help guarantee predictable performance; provide a multi-tenant environment where a tenant will not affect its neighbor; provide a denser cluster with higher utilization of the hardware resulting in smaller data center footprint, less power, fewer systems to manage; provide a more scalable cluster; and pool storage resources across the cluster without loss of performance.

The various methods and systems disclosed herein provide high-density consolidation of resources required for scaleout applications and high performance multi-node pooling. These methods and systems provide a number of customer benefits, including dynamic cluster-wide resource provisioning, the ability to guarantee quality-of-service (QoS), Security, Isolation etc. on network and storage functions, and the ability to use shared infrastructure for production and testing/development.

Also provided herein are methods and systems to perform storage functions through the network and to virtualize storage and network devices for high performance and deterministic performance in single or multi-tenant environments.

Also provided herein are methods and systems for virtualization of storage devices, such as those using NVMe and similar protocols, and the translation of those virtual devices to different physical devices, such as ones using SATA.

The methods and systems disclosed herein also include methods and systems for end-to-end congestion control involving only the hardware on the host (as opposed to the network fabric) that includes remote credit management and a distributed scheduling algorithm at the box level.

Also provided herein are various methods and systems that are enabled by the converged network/storage controller, including methods and systems for virtualization of a storage cluster or of other elements that enable a cluster, such as a storage adaptor, a network adaptor, a container (e.g., a Linux container), a Solaris zone or the like. Among advantages, one aspect of virtualizing a cluster is that containers can become location-independent in the physical cluster. Among other advantages, this allows movement of containers among machines in a vastly simplified process described below.

Provided herein are methods and systems for virtualizing direct-attached storage (DAS), so that the operating system stack 108 still sees a local, persistent device, even if the physical storage is moved and is remotely located; that is, provided herein are methods and systems for virtualization of DAS. In embodiments this may include virtualizing DAS over a fabric, that is, taking a DAS storage system and moving it outside the box and putting it on the network. In embodiments this may include carving DAS into arbitrary name spaces. In embodiments the virtualized DAS is made accessible as if it were actual DAS to the operating system, such as being accessible by the OS 108 over a PCIe bus via NVMe. Thus, provided herein is the ability to virtualize storage (including DAS) so that the OS 108 sees it as DAS, even if the storage is actually accessed over a network protocol such as Ethernet, and the OS 108 is not required to do anything different than would be required with local physical storage.

Provided herein are methods and systems for providing DAS across a fabric, including exposing virtualized DAS to the OS 108 without requiring any modification of the OS 108.

Also provided herein are methods and systems for virtualization of a storage adaptor (referring to a target storage system).

Provided herein are methods and systems for combining storage initiation and storage targeting in a single hardware system. In embodiments, these may be attached by a PCIe bus 110. A single root virtualization function (SR-IOV) may be applied to take any standard device and have it act as if it is hundreds of such devices. Embodiments disclosed herein include using SR-IOV to give multiple virtual instances of a physical storage adaptor. SR-IOV is a PCIe standard that virtualizes I/O functions, and while it has been used for network interfaces, the methods and systems disclosed herein extend it to use for storage devices. Thus, provided herein is a virtual target storage system.

Embodiments may include a switch form factor or network interface controller, wherein the methods and systems disclosed herein may include a host agent (either in software or hardware). Embodiments may include breaking up virtualization between a front end and a back end.

Embodiments may include various points of deployment for a converged network and target storage controller. While some embodiments locate the converged device on a host computing system 102, in other cases the disk can be moved to another box (e.g., connected by Ethernet to a switch that switches among various boxes below. While a layer may be needed to virtualize, the storage can be separated, so that one can scale storage and computing resources separately. Also, one can then enable blade servers (i.e., stateless servers). Installations that would have formerly involved expensive blade servers and attached to storage area networks (SANs) can instead attach to the switch. In embodiments this comprises a "rackscale" architecture where resources are disaggregated at the rack level.

Methods and systems disclosed herein include methods and systems for virtualizing various types of non-DAS storage as DAS in a converged networking/target storage appliance. In embodiments, one may virtualize whatever storage is desired as DAS, using various front end protocols to the storage systems while exposing storage as DAS to the OS stack 108.

Methods and systems disclosed herein include virtualization of a converged network/storage adaptor. From a traffic perspective, one may combine systems into one. Combining the storage and network adaptors, and adding in virtualization, gives significant advantages. Say there is a single host 102 with two PCIe buses 110. To route from the PCIe 110, you can use a system like RDMA to get to another machine/host 102. If one were to do this separately, one has to configure the storage and the network RDMA system separately. One has to join each one and configure them at two different places. In the converged scenario, the whole step of setting up QoS, seeing that this is RDMA and that there is another fabric elsewhere is a zero touch process, because with combined storage and networking the two can be configured in a single step. That is, once one knows the storage, one doesn't need to set up the QoS on the network separately.

Method and systems disclosed herein include virtualization and/or indirection of networking and storage functions, embodied in the hardware, optionally in a converged network adaptor/storage adaptor appliance. While virtualization is a level of indirection, protocol is another level of indirection. The methods and systems disclosed herein may convert a protocol suitable for use by most operating systems to deal with local storage, such as NVMe, to another protocol, such as SAS, SATA, or the like. One may expose a consistent interface to the OS 108, such as NVMe, and in the back end one may convert to whatever storage media is cost-effective. This gives a user a price/performance advantage. If components are cheaper/faster, one can connect any one of them. The back end could be anything, including NVMe.

Provided herein are methods and systems that include a converged data path for network and storage functions in an appliance. Alternative embodiments may provide a converged data path for network and storage functions in a switch.

In embodiments, methods and systems disclosed herein include storage/network tunneling, wherein the tunneling path between storage systems over a network does not involve the operating system of a source or target computer. In conventional systems, one had separate storage and network paths, so accessing storage remotely, required extensive copying to and from memory, I/O buses, etc. Merging the two paths means that storage traffic is going straight onto the network. The OS 108 of each computer sees only a local disk. Another advantage is simplicity of programming. A user does not need to separately program a SAN, meaning that the methods disclosed herein include a one-step programmable SAN. Rather than requiring discovery and specification of zones, and the like, encryption, attachment, detachment and the like may be centrally, and programmatically done.

Embodiments disclosed herein may include virtualizing the storage to the OS 108 so that the OS 108 sees storage as a local disk. The level of indirection involved in the methods and systems disclosed herein allows the converged system to hide not only the location, but the media type, of storage media. All the OS sees is that there is a local disk, even if the actual storage is located remotely and/or is or a different type, such as a SAN. Thus, virtualization of storage is provided, where the OS 108 and applications do not have to change. One can hide all of the management, policies of tiering, polices of backup, policies of protection and the like that are normally needed to configure complex storage types behind.

Methods and systems are provided for selecting where indirection occurs in the virtualization of storage. Virtualization of certain functions may occur in hardware (e.g., in an adaptor on a host, in a switch, and in varying form factors (e.g., FPGA or ASICs) and in software. Different topologies are available, such as where the methods and systems disclosed herein are deployed on a host machine, on a top of the rack switch, or in a combination thereof. Factors that go into the selection include ease of use. Users who want to run stateless servers may prefer a top of rack. Ones who don't care about that approach might prefer the controller on the host.

Methods and systems disclosed herein include providing NVMe over Ethernet. These approaches can be the basis for the tunneling protocol that is used between devices. NVMe is a suitable DAS protocol that is intended conventionally to go to a local PCIe. Embodiments disclosed herein may tunnel the NVMe protocol traffic over Ethernet. NVMe (non-volatile memory express) is a protocol that in Linux and Windows provides access to PCIe-based Flash Storage. This provides high performance by-passing the software stacks used in conventional systems.

Embodiments disclosed herein may include providing an NVMe device that is virtualized and dynamically allocated. In embodiments one may piggy back NVMe, but carve up and virtualize and dynamically allocate an NVMe device. In embodiments there is no footprint in the software. The operating system stays the same (just a small driver that sees the converged network/storage card). This results in virtual storage presented like a direct attached disk, but the difference is that now we can pool such devices across the network.

Provided herein are methods and systems for providing the simplicity of direct attached storage (DAS) with the advantages of sharing like in a storage area network (SAN). Each converged appliance in various embodiments disclosed herein may be a host, and any storage drives may be local to a particular host but seen by the other hosts (as in a SAN or other network-accessible storage). The drives in each box enabled by a network/storage controller of the present disclosure behave like a SAN (that is, are available on the network), but the management methods are much simpler. When a storage administrator sets up a SAN, a typical enterprise may have a whole department setting up zones for a SAN (e.g., a fiber channel switch), such as setting up "who sees what." That knowledge is pre-loaded and a user has to ask the SAN administrator to do the work to set it up. There is no programmability in a typical legacy SAN architecture. The methods and systems disclosed herein provide local units that are on the network, but the local units can still access their storage without having to go through complex management steps like zone definition, etc. These devices can do what a SAN does just by having both network and storage awareness. As such, they represent the first programmatic SAN.

Methods and systems disclosed herein may include persistent, stateful, disaggregated storage enabled by a hardware appliance that provides converged network and storage data management.

Methods and systems disclosed herein may also include convergence of network and storage data management in a single appliance, adapted to support use of containers for virtualization. Such methods and systems are compatible with the container ecosystem that is emerging, but offering certain additional advantages.

Methods and systems are disclosed herein for implementing virtualization of NVMe. Regardless how many sources to how many destinations, as long as the data from the sources is serialized first before going into the hub, then the hub distributes to data to the designated destination sequentially. If so, then data transport resources such as DMA engine can be reduced to only one copy. This may include various use scenarios. In one scenario, for NVMe virtual functions (VFs), if they are all connected to the same PCIe bus, then regardless how many VFs are configured, the data would be coming into this pool of VFs serially, so there is only one DMA engine and only one storage block (for control information) is needed. In another use scenario, for a disk storage system with a pool of discrete disks/controllers, if the data is originated from the physical bus, i.e. PCIe, since the data is serially coming into this pool of disks, then regardless how many disks/controllers are in the pool, the transport resources such as the DMA engine can be reduced to only one instead of one per controller.

In accordance with various exemplary and non-limiting embodiments, a device comprises a converged input/output controller that includes a physical target storage media controller, a physical network interface controller; and a gateway between the storage media controller and the network interface controller, wherein gateway provides a direct connection for storage traffic and network traffic between the storage media controller and the network interface controller.

In accordance with various exemplary and non-limiting embodiments, a method of virtualization of a storage device comprises accessing a physical storage device that responds to instructions in a first storage protocol, translating instructions between the first storage protocol and a second storage protocol and using the second protocol, presenting the physical storage device to an operating system, such that the storage of the physical storage device can be dynamically provisioned, whether the physical storage device is local or remote to a host computing system that uses the operating system.

In accordance with various exemplary and non-limiting embodiments, a method of facilitating migration of at least one of an application and a container comprises providing a converged storage and networking controller, wherein a gateway provides a connection for network and storage traffic between a storage component and a networking component of the device without intervention of the operating system of a host computer and mapping the at least one application or container to a target physical storage device that is controlled by the converged storage and networking controller, such that the application or container can access the target physical storage, without intervention of the operating system of the host system to which the target physical storage is attached, when the application or container is moved to another computing system.

In accordance with various exemplary and non-limiting embodiments, a method of providing quality of service (QoS) for a network, comprises providing a converged storage and networking controller, wherein a gateway provides a connection for network and storage traffic between a storage component and a networking component of the device without intervention of the operating system, a hypervisor, or other software running on the CPU of a host computer and, also without intervention of the operating system, hypervisor, or other software running on the CPU of a host computer, managing at least one quality of service (QoS) parameter related to a network in the data path of which the storage and networking controller is deployed, such managing being based on at least one of the storage traffic and the network traffic that is handled by the converged storage and networking controller.

QoS may be based on various parameters, such as one or more of a bandwidth parameter, a network latency parameter, an IO performance parameter, a throughput parameter, a storage type parameter and a storage latency parameter. QoS may be maintained automatically when at least one of an application and a container that is serviced by storage through the converged storage and network controller is migrated from a host computer to another computer. Similarly, QoS may be maintained automatically when at least one target storage device that services at least one of an application and a container through the converged storage and network controller is migrated from a first location to another location or multiple locations. For example, storage may be scaled, or different storage media types may be selected, to meet storage needs as requirements are increased. In embodiments, a security feature may be provided, such as encryption of network traffic data, encryption of data in storage, or both. Various storage features may be provided as well, such as compression, protection levels (e.g., RAID levels), use of different storage media types, global de-duplication, and snapshot intervals for achieving at least one of a recovery point objective (RPO) and a recovery time objective (RTO).

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

FIG. 27 illustrates a method according to an exemplary and non-limiting embodiment.

FIG. 28 illustrates a method according to an exemplary and non-limiting embodiment.

FIG. 42 illustrates a use of an Exchange Status Block.

FIG. 43 illustrates a table of exchange state triggers.

FIG. 58 illustrates NVMEoN encapsulation of an NVME Command Packet 5800 in an embodiment.

FIG. 60 illustrates an NVMEoN Xfer Rdy command 6000 in an embodiment.

FIG. 62 illustrates an NVMEoN Exchange Cleanup Request/Response 6200 in an embodiment.

Figure 1:
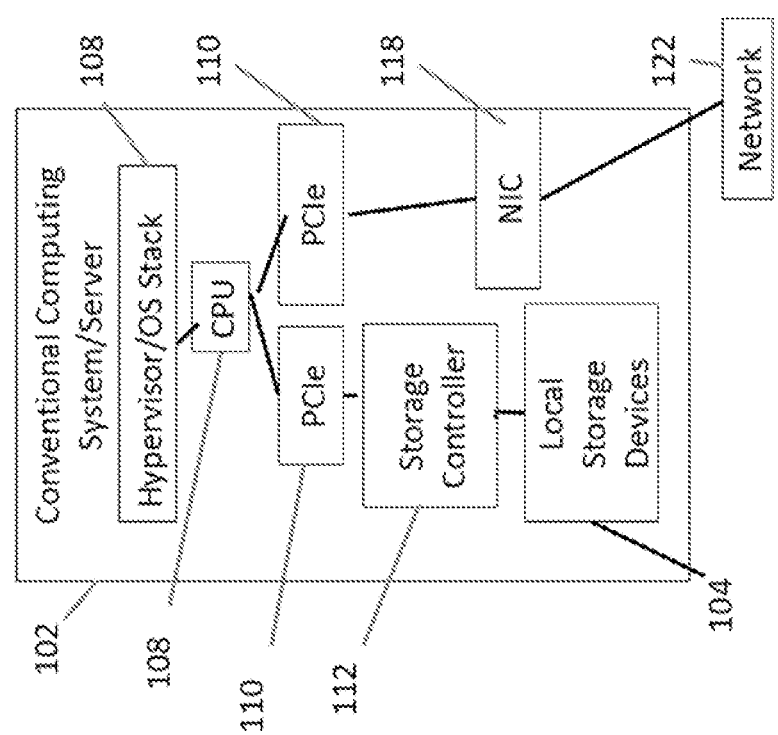
FIG. 1 illustrates a general architecture in accordance with an exemplary and non-limiting embodiment.
Figure 2:
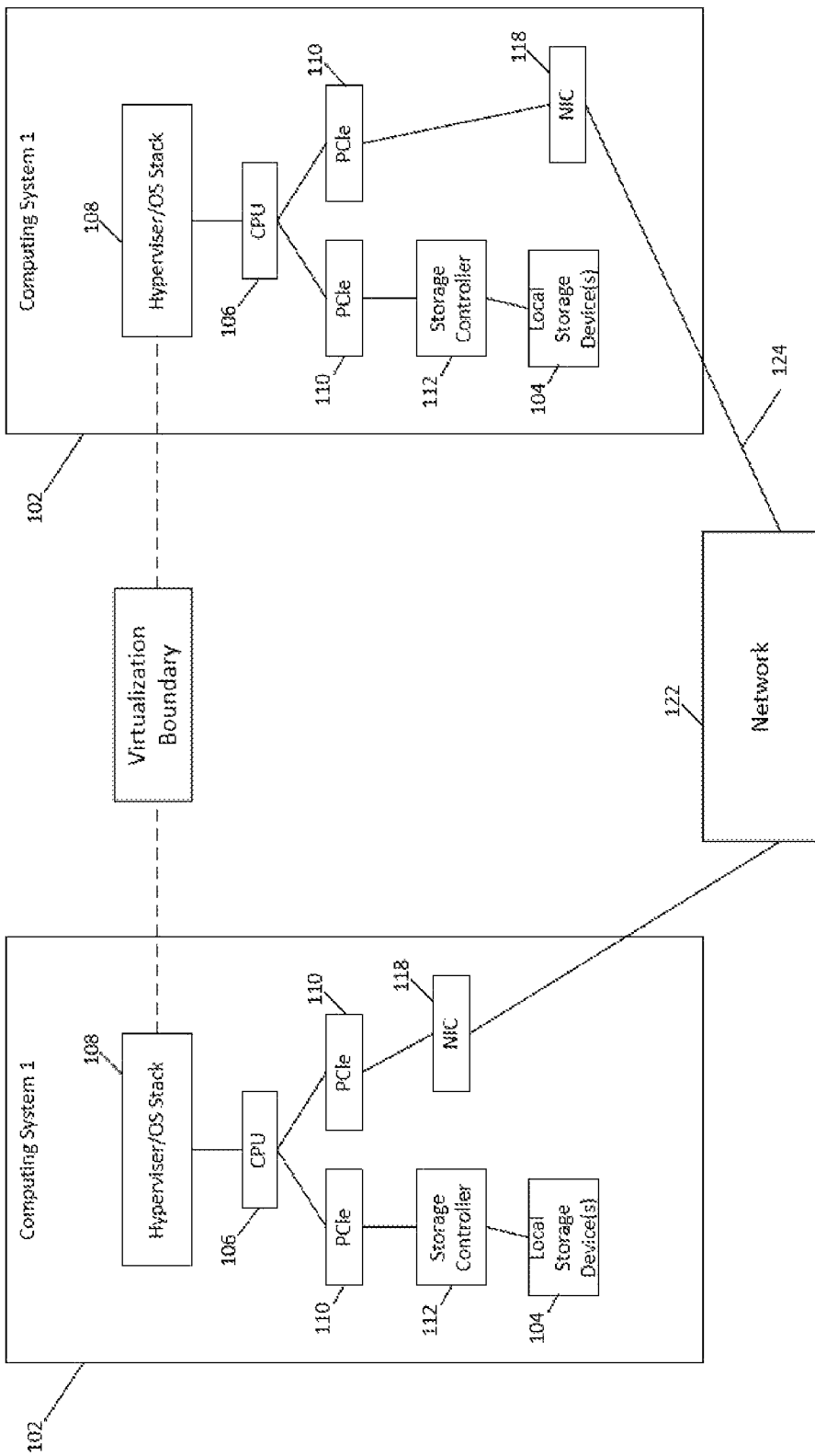
FIG. 2 illustrates a computer system in accordance with an exemplary and non-limiting embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION OF THE INVENTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components related to converged networking and storage. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art.

Figure 3:
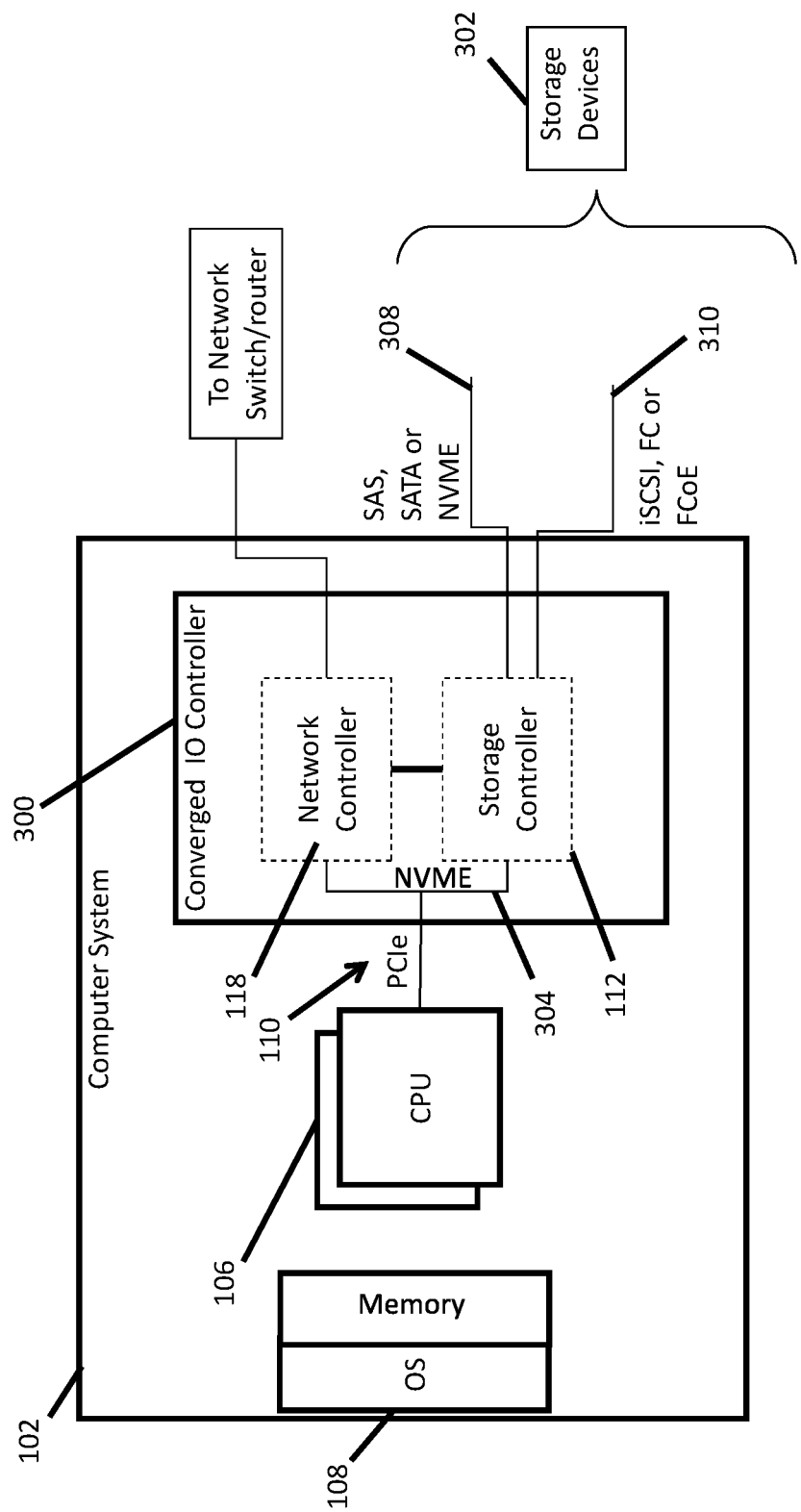
FIG. 3 illustrates a converged solution in accordance with an exemplary and non-limiting embodiment.

Referring to FIG. 3, the converged solution 300 may include three important aspects and may be implemented in a hardware device that includes a combination of hardware and software modules and functions. First, a cut-through data path 304 may be provided between a network controller 118 and a storage controller 112, so that access of the storage to and from the network can be direct, without requiring any intervention of the OS stack 108, the PCIe bus 110, or the CPU 106. Second, cut through storage stack access, such as to storage devices 302, may be provided, such as access of the storage to and from entities on the local host, which allows bypassing of complex legacy software stacks for storage access, such as SCSI/SAS/SATA stacks. Third, end-to-end congestion management and flow control of the network may be provided, such as by a mechanism to reserve and schedule the transfer of data across the network, which guarantees the availability of the target's data to remote initiators and minimizes the congestion of the traffic as it flows through intermediate network fabric switches. The first and second aspects remove software stacks (hence the CPU 106 and memory) from the path of the data, eliminating redundant or unnecessary movement and processing. End-to-end congestion management and flow control delivers a deterministic and reliable transport of the data.

As noted above, one benefit of the converged solution 300 is that the operating system stack 108 connects to the converged solution 300 over a conventional PCIe 110 or a similar bus, so that the OS stack 108 sees the converged solution 300, and any storage that it controls through the cut-through to storage devices 302, as one or more local, persistent devices, even if the physical storage is remotely located. Among other things, this comprises the capability for virtualization of DAS 308, which may include virtualizing DAS 308 over a fabric, that is, taking a DAS 308 storage system and moving it outside the computing system 102 and putting it on the network. The storage controller 112 of the converged solution 300 may connect to and control DAS 308 on the network 122 via various known protocols, such as SAS, SATA, or NVMe. In embodiments virtualization may include carving DAS 308 into arbitrary name spaces. In embodiments the virtualized DAS 308 is made accessible as if it were actual, local, physical DAS to the operating system, such as being accessible by the OS 108 over a PCIe bus 110 to the storage controller 112 of the converged solution 300 via a standard protocol such as NVMe. Again, the OS 108 sees the entire solution 300 as a local, physical device, such as DAS. Thus, provided herein is the ability to virtualize storage (including DAS and other storage types, such as SAN 310) so that the OS 108 sees any storage type as DAS, even if the storage is actually accessed over a network 122, and the OS 108 is not required to do anything different than would be required with local physical storage. In the case where the storage devices 302 are SAN 310 storage, the storage controller 112 of the converged solution may control the SAN 310 through an appropriate protocol used for storage area networks, such as the Internet Small Computing System Interface (iSCSI), Fibre Channel (FC), or Fibre Channel over Ethernet (FCoE). Thus, the converged solution 300 provides a translation for the OS stack 108 from any of the other protocols used in storage, such as Ethernet, SAS, SATA, NVMe, iSCSI, FC or FCoE, among others, to a simple protocol like NVMe that makes the disparate storage types and protocols appear as local storage accessible over PCIe 110. This translation in turns enables virtualization of a storage adaptor (referring to any kind of target storage system). Thus, methods and systems disclosed herein include methods and systems for virtualizing various types of non-DAS storage as DAS in a converged networking/target storage appliance 300. In embodiments, one may virtualize whatever storage is desired as DAS, using various protocols to the storage systems while exposing storage as DAS to the OS stack 108. Thus, provided herein are methods and systems for virtualization of storage devices, such as those using NVMe and similar protocols, and the translation of those virtual devices to different physical devices, such as ones using SATA.

Storage/network tunneling 304, where the tunneling path between storage systems over the network 122 does not involve the operating system of a source or target computer enables a number of benefits. In conventional systems, one has separate storage and network paths, so accessing storage remotely required extensive copying to and from memory, I/O buses, etc. Merging the two paths means that storage traffic is going straight onto the network. An advantage is simplicity of programming. A user does not need to separately program a SAN 310, meaning that the methods disclosed herein enable a one-step programmable SAN 310. Rather than requiring discovery and specification of zones, and the like, configuration, encryption, attachment, detachment and the like may be centrally, and programmatically done. As an example, a typical SAN is composed of "initiators," "targets," and a switch fabric, which connects the initiators and targets. Typically which initiators see which targets are defined/controlled by the fabric switches, called "zones." Therefore, if an initiator moves or a target moves, zones need to be updated. The second control portion of a SAN typically lies with the "targets." They can control which initiator port can see what logical unit numbers (LUNs) (storage units exposed by the target). This is typically referred to as LUN masking and LUN mapping. Again, if an initiator moves locations, one has to re-program the "Target". Consider now that in such an environment if an application moves from one host to another (such as due to a failover, load re-balancing, or the like) the zoning and LUN masking/mapping needs to be updated. Alternatively, one could pre-program the SAN, so that every initiator sees every target. However, doing so results in an un-scalable and un-secure SAN. In the alternate solution described throughout this disclosure, such a movement of an application, a container, or a storage device does NOT require any SAN re-programming, resulting in a zero touch solution. The mapping maintained and executed by the converged solution 300 allows an application or a container, the target storage media, or both, to be moved (including to multiple locations) and scaled independently, without intervention by the OS, a hypervisor, or other software running on the host CPU.

The fact that the OS 108 sees storage as a local disk allows simplified virtualization of storage. The level of indirection involved in the methods and systems disclosed herein allows the converged system 300 to hide not only the location, but the media type, of storage media. All the OS 108 sees is that there is a local disk, even if the actual storage is located remotely and/or is or a different type, such as a SAN 310. Thus, virtualization of storage is provided through the converged solution 300, where the OS 108 and applications do not have to change. One can hide all of the management, policies of tiering, polices of backup, policies of protection and the like that are normally needed to configure complex storage types behind.

The converged solution 300 enables the simplicity of direct attached storage (DAS) with the advantages of a storage area network (SAN). Each converged appliance 300 in various embodiments disclosed herein may act as a host, and any storage devices 302 may be local to a particular host but seen by the other hosts (as is the case in a SAN 310 or other network-accessible storage). The drives in each box enabled by a network/storage controller of the present disclosure behave like a SAN 310 (e.g., are available on the network), but the management methods are much simpler. When a storage administrator normally sets up a SAN 310, a typical enterprise may have a whole department setting up zones for a SAN 310 (e.g., a fiber channel switch), such as setting up "who sees what." That knowledge must be pre-loaded, and a user has to ask the SAN 310 administrator to do the work to set it up. There is no programmability in a typical legacy SAN 310 architecture. The methods and systems disclosed herein provide local units that are on the network, but the local units can still access their storage without having to go through complex management steps like zone definition, etc. These devices can do what a SAN does just by having both network and storage awareness. As such, they represent the first programmatic SAN.

The solution 300 can be described as a "Converged IO Controller" that controls both the storage media 302 and the network 122. This converged controller 300 is not just a simple integration of the storage controller 112 and the network controller (NIC) 118. The actual functions of the storage and network are merged such that storage functions are performed as the data traverses to and from the network interface. The functions may be provided in a hardware solution, such as an FPGA (one or more) or ASIC (one or more) as detailed below.

Figure 4:
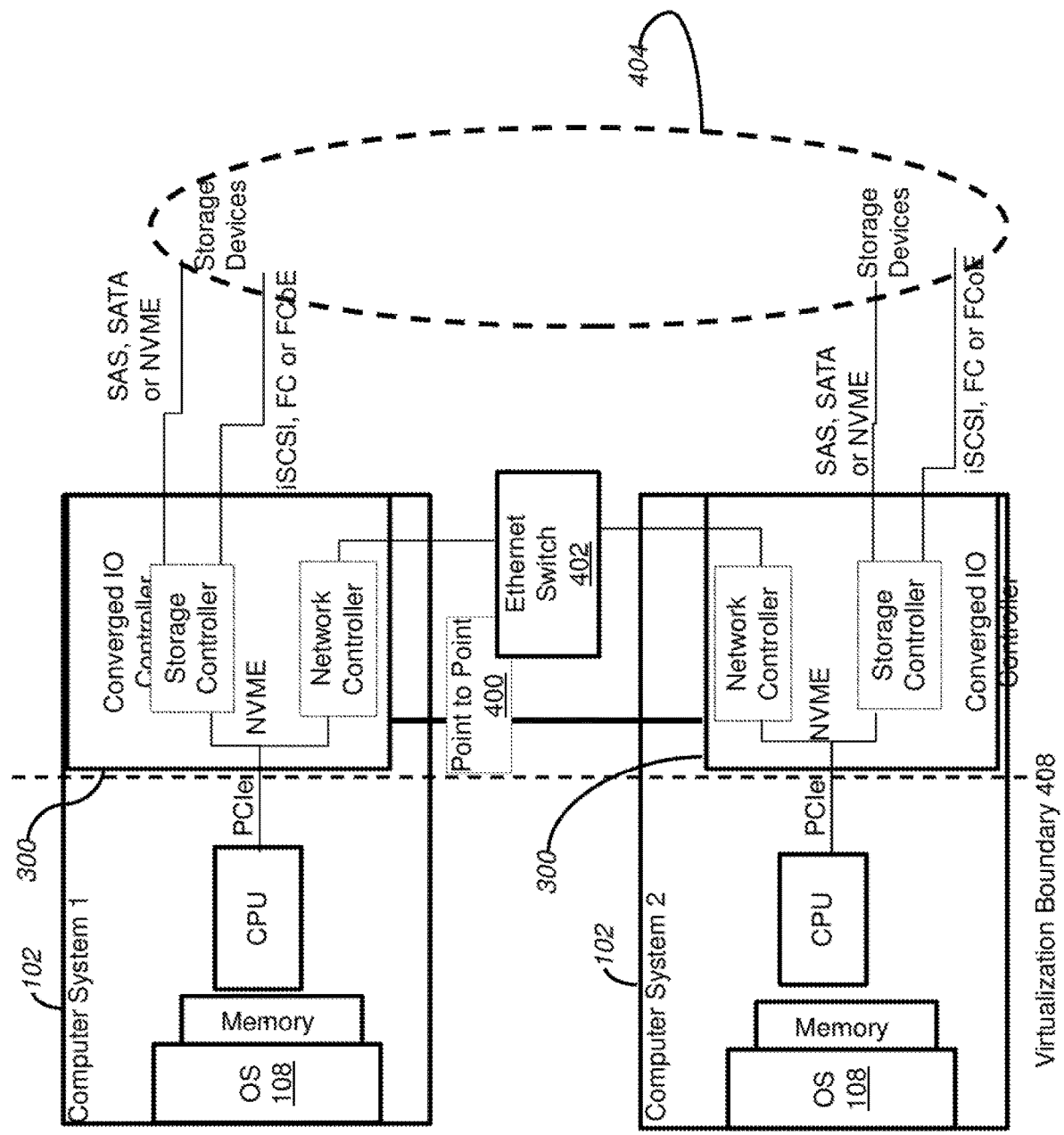
FIG. 4 illustrates two computing systems enabled by a converged solution in accordance with an exemplary and non-limiting embodiment.

Referring to FIG. 4, two or more computing systems 102 enabled by converged solutions 300 may serve as hosts for respective storage targets, where by merging storage and network and controlling both interfaces, direct access to the storage 302 can be achieved remotely over the network 122 without traversing internal busses or CPU/software work, such as by a point-to-point path 400 or by an Ethernet switch 402 to another computer system 102 that is enabled by a converged solution 300. The highest performance (high IOPs and low latency) can be achieved. Further, storage resources 302 can now be pooled across the cluster. In FIG. 4, this is conceptually illustrated by the dotted oval 404.

Figure 5:
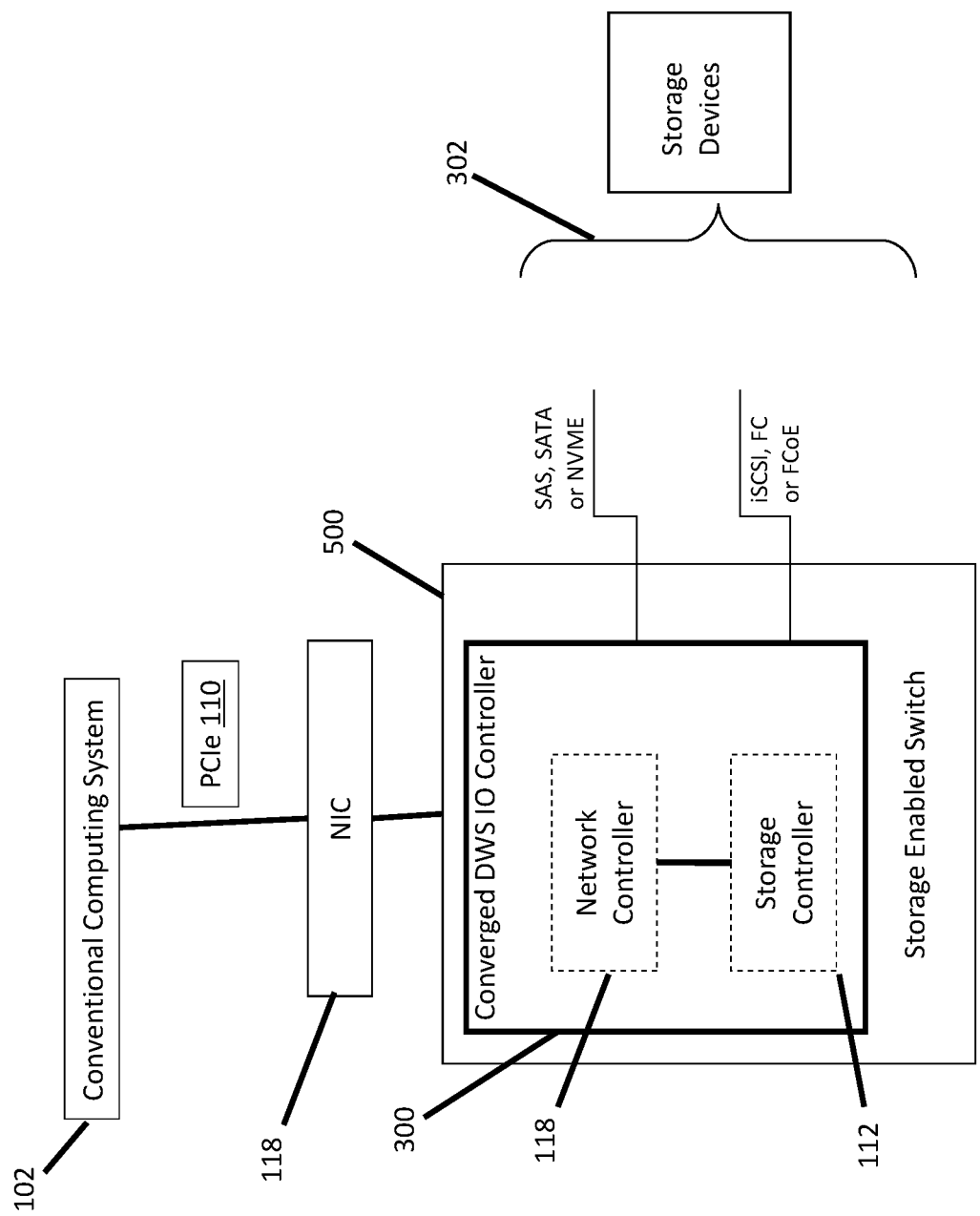
FIG. 5 illustrates a converged controller in accordance with an exemplary and non-limiting embodiment.

In embodiments, the converged solution 300 may be included on a host computing system 102, with the various components of a conventional computing system as depicted in FIG. 1, together with the converged IO controller 300 as described in connection with FIG. 3. Referring to FIG. 5, in alternative embodiments, the converged controller 300 may be disposed in a switch, such as a top of the rack switch, thus enabling a storage enabled switch 500. The switch may reside on the network 122 and be accessed by a network controller 118, such as of a conventional computing system 102.

Figure 6:
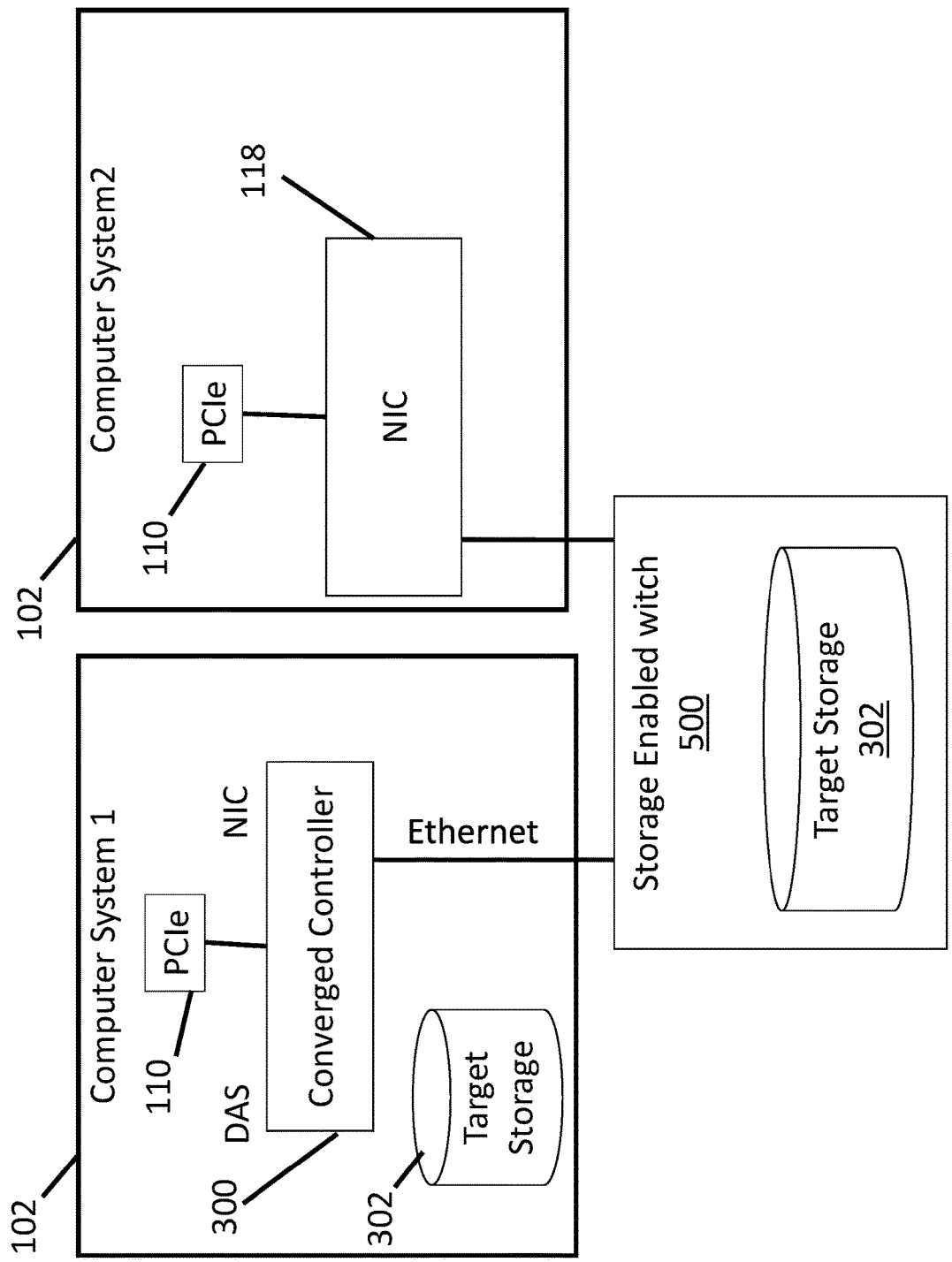
FIG. 6 illustrates a deployment of a converged controller in accordance with an exemplary and non-limiting embodiment.

Referring to FIG. 6, systems may be deployed in which a converged controller 300 is disposed both on one or more host computing systems 102 and on a storage enabled switch 500, which may be connected to systems 102 that are enabled by converged solutions 300 and to non-enabled systems 102. As noted above, target storage 302 for the converged controller(s) 300 on the host computing system 102 and on the storage enabled switch 500 can be visible to each other across the network, such as being treated as a unified resource, such as to virtualization solutions. In sum, intelligence, including handling converged network and storage traffic on the same device, can be located in a host system, in a switch, or both in various alternative embodiments of the present disclosure.

Embodiments disclosed herein may thus include a switch form factor or a network interface controller, or both which may include a host agent (either in software or hardware). These varying deployments allow breaking up virtualization capabilities, such as on a host and/or on a switch and/or between a front end and a back end. While a layer may be needed to virtualize certain functions, the storage can be separated, so that one can scale storage and computing resources separately. Also, one can then enable blade servers (i.e., stateless servers). Installations that would have formerly involved expensive blade servers and attached storage area networks (SANs) can instead attach to the storage enabled switch 500. In embodiments this comprises a "rack-scale" architecture, where resources are disaggregated at the rack level.

Methods and systems are provided for selecting where indirection occurs in the virtualization of storage. Virtualization of certain functions may occur in hardware (e.g., in a converged adaptor 300 on a host 102, in a storage enabled switch 500, in varying hardware form factors (e.g., FPGAs or ASICs) and in software. Different topologies are available, such as where the methods and systems disclosed herein are deployed on a host machine 102, on a top of the rack switch 500, or in a combination thereof. Factors that go into the selection of where virtualization should occur include ease of use. Users who want to run stateless servers may prefer a top of rack storage enabled switch 500. Ones who don't care about that approach might prefer the converged controller 300 on the host 102.

Figure 7:
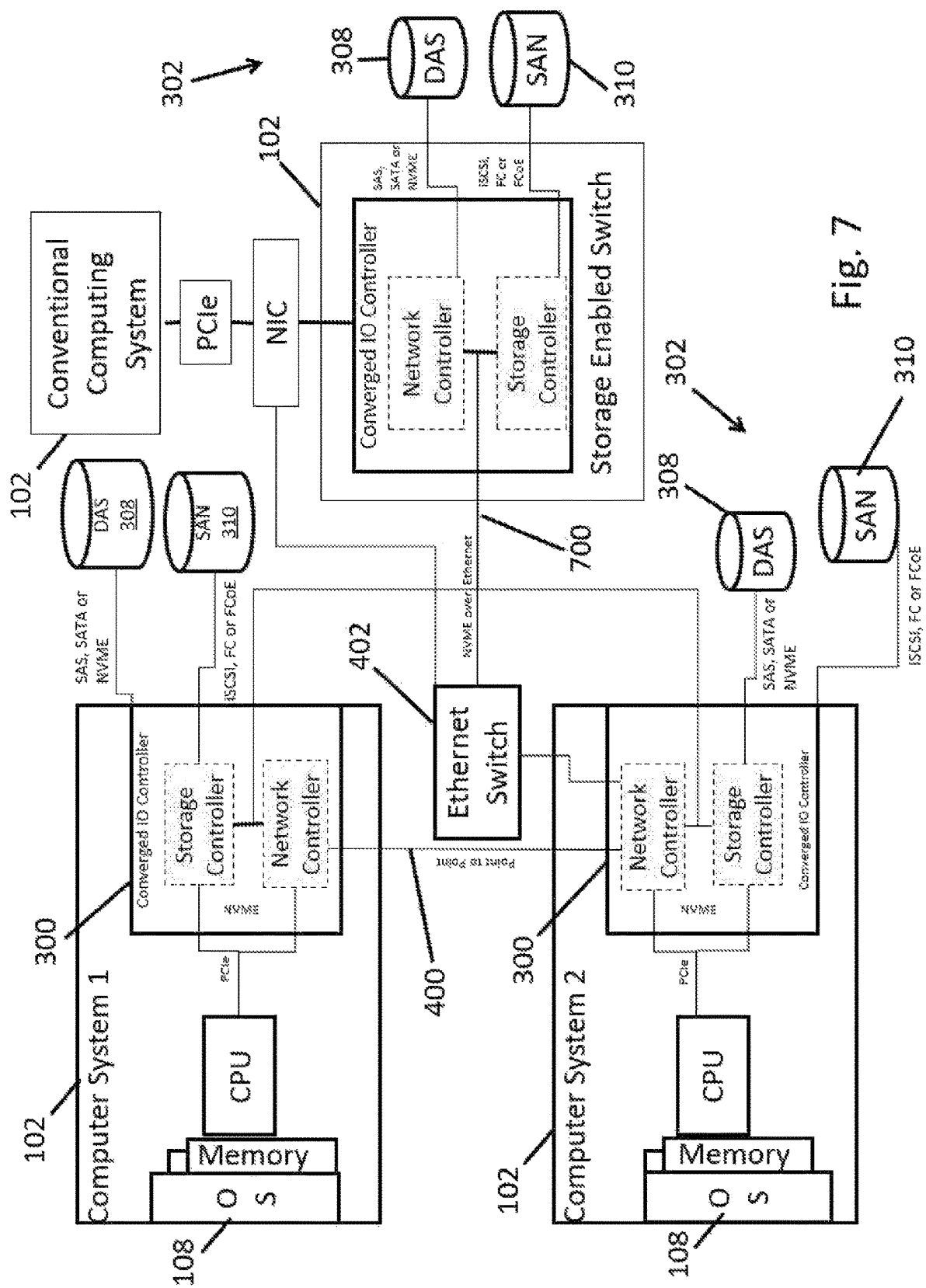
FIG. 7 illustrates a plurality of systems in accordance with an exemplary and non-limiting embodiment.

FIG. 7 shows a more detailed view of a set of systems that are enabled with converged controllers 300, including two computer systems 102 (computer system 1 and computer system 2), as well as a storage enabled switch 500. Storage devices 302, such as DAS 308 and SAN 310 may be controlled by the converged controller 300 or the storage enabled switch 500. DAS 308 may be controlled in either case using SAS, SATA or NVMe protocols. SAN 310 may be controlled in either case using iSCSI, FC or FCoE. Connections among hosts 102 that have storage controllers 300 may be over a point-to-point path 400, over an Ethernet switch 402, or through a storage enabled switch 500, which also may provide a connection to a conventional computing system. As noted above, the multiple systems with intelligent converged controllers 300 can each serve as hosts and as storage target locations that the other hosts see, thereby providing the option to be treated as a single cluster of storage for purposes of an operating system 108 of a computing system 102.

Method and systems disclosed herein include virtualization and/or indirection of networking and storage functions, embodied in the hardware converged controller 300, optionally in a converged network adaptor/storage adaptor appliance 300. While virtualization is a level of indirection, protocol is another level of indirection. The methods and systems disclosed herein may convert a protocol suitable for use by most operating systems to deal with local storage, such as NVMe, to another protocol, such as SAS, SATA, or the like. One may expose a consistent interface to the OS 108, such as NVMe, and on the other side of the converged controller 300 one may convert to whatever storage media 302 is cost-effective. This gives a user a price/performance advantage. If components are cheaper/faster, one can connect any one of them. The side of the converged controller 300 could face any kind of storage, including NVMe. Furthermore the storage media type may be any of the following including, but not limited to HDD, SSD (based on SLC, MLC, or TLC Flash), RAM etc or a combination thereof.

In embodiments, a converged controller may be adapted to virtualize NVMe virtual functions, and to provide access to remote storage devices 302, such as ones connected to a storage-enabled switch 500, via NVMe over an Ethernet switch 402. Thus, the converged solution 300 enables the use of NVMe over Ethernet 700, or NVMeoE. Thus, methods and systems disclosed herein include providing NVMe over Ethernet. These approaches can be the basis for the tunneling protocol that is used between devices, such as the host computing system 102 enabled by a converged controller 300 and/or a storage enabled switch 500. NVMe is a suitable DAS protocol that is intended conventionally to go to a local PCIe 110. Embodiments disclosed herein may tunnel the NVMe protocol traffic over Ethernet. NVMe (non-volatile memory express) is a protocol that in Linux and Windows provides access to PCIe-based Flash. This provides high performance via by-passing the software stacks used in conventional systems, while avoiding the need to translate from NVMe (as used by the OS stack 108) and the traffic tunneled over Ethernet to other devices.

Figure 8:
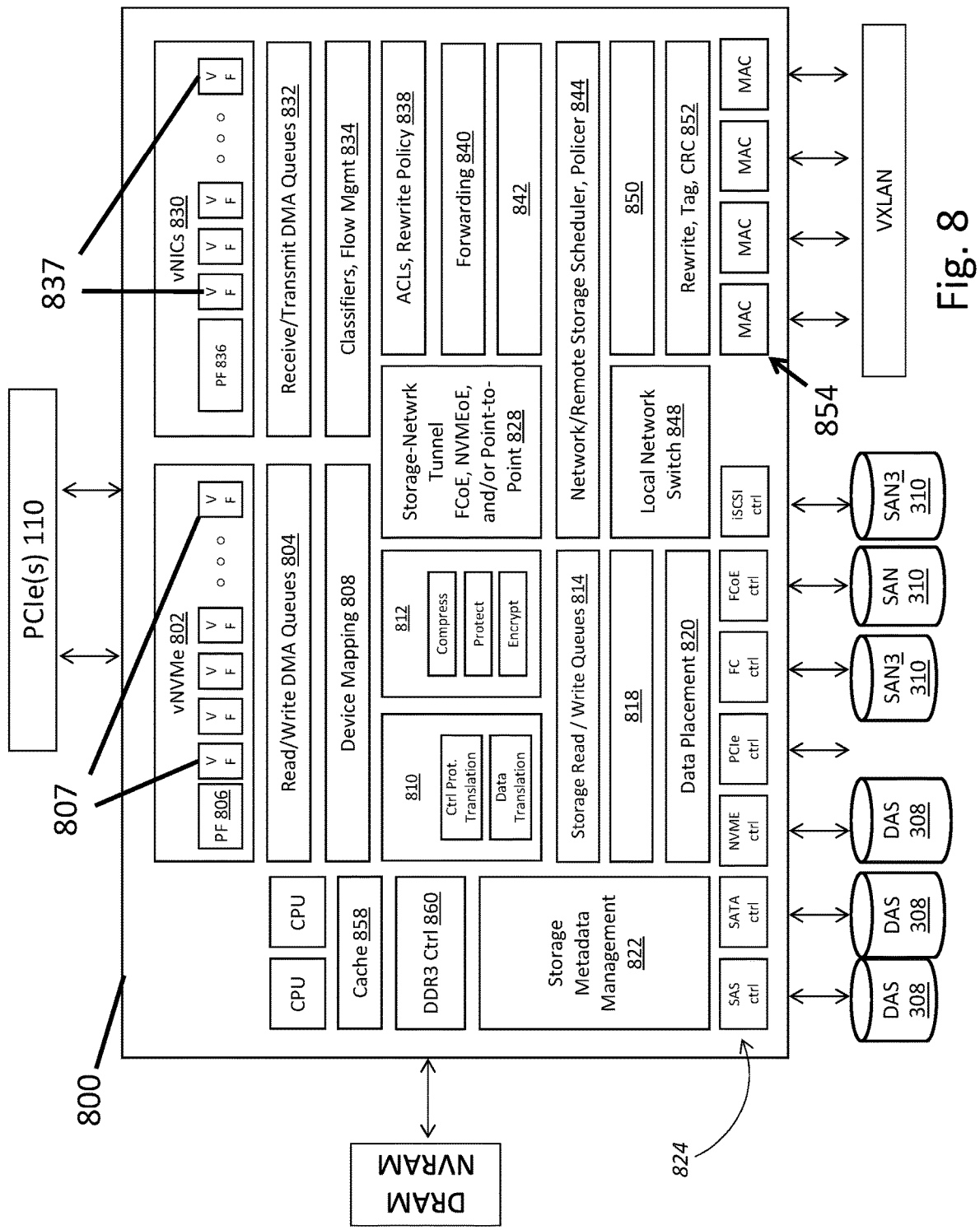
FIG. 8 illustrates a block diagram of a field-programmable gate array (FPGA) in accordance with an exemplary and non-limiting embodiment.

FIG. 8 is a block diagram of an FPGA 800, which may reside on an IO controller card and enable an embodiment of a converged solution 300. Note that while a single FPGA

800 is depicted, the various functional blocks could be organized into multiple FPGAs, into one or more customer Application Specific Integrated Circuits (ASICs), or the like. For example, various networking blocks and various storage blocks could be handled in separate (but interconnected) FPGAs or ASICs. References throughout this disclosure to an FPGA 800 should be understood, except where context indicates otherwise, to encompass these other forms of hardware that can enable the functional capabilities reflected in FIG. 8 and similar functions. Also, certain functional groups, such as for networking functions and/or storage functions, could be embodied in merchant silicon.

The embodiment of the FPGA 800 of FIG. 8 has four main interfaces. First, there is PCIe interface, such as to the PCIe bus 110 of a host computer 102. Thus, the card is a PCIe end point. Second, there is a DRAM/NVRAM interface. For example, a DDR interface may be provided to external DRAM or NVRAM, used by the embedded CPUs, metadata and data structures, and packet/data buffering. Third, there is a storage interface to media, such as DAS 308 and SAN 310. Storage interfaces can include ones for SAS, SATA, NVMe, iSCSI, FC and/or FCoE, and could in embodiments be any interface to rotating media, flash, or other persistent form of storage, either local or over a cut-through to a network-enabled storage like SAN 310. Fourth, a network interface is provided, such as Ethernet to a network fabric. The storage interfaces and the network interfaces can be used, in part, to enable NVMe over Ethernet.

The internal functions of the FPGA 800 may include a number of enabling features for the converged solution 300 and other aspects of the present disclosure noted throughout. A set of virtual endpoints (vNVMe) 802 may be provided for the host. Analogous to the SR-IOV protocol that is used for the network interface, this presents virtual storage targets to the host. In this embodiment of the FPGA 800, NVMe has benefits of low software overhead, which in turn provides high performance. A virtual NVMe device 802 can be dynamically allocated/de-allocated/moved and resized. As with SR-IOV, there is one physical function (PF) 806 that interfaces with a PCIe driver 110 (see below), and multiple virtual functions 807 (VF) in which each appears as an NVMe device.

Also provided in the FPGA 800 functions are one or more read and write direct memory access (DMA) queues 804, referred to in some cases herein as a DMA engine 804. These may include interrupt queues, doorbells, and other standard functions to perform DMA to and from the host computing system 102.

A device mapping facility 808 on the FPGA 800 may determine the location of the virtual NVMe devices 802. The location options would be local (ie—attached to one of the storage media interfaces 824 shown), or remote on another host 102 of a storage controller 300. Access to a remote vNVMe device requires going through a tunnel 828 to the network 122.

A NVMe virtualization facility 810 may translate NVMe protocol instructions and operations to the corresponding protocol and operations of the backend storage media 302, such as SAS or SATA (in the case of use of NVMe on the backend storage medium 302, no translation may be needed) where DAS 308 is used, or such as iSCSI, FC or FCoE in the case where SAN 310 storage is used in the backend. References to the backend here refer to the other side of the converged controller 300 from the host 102.

A data transformation function 812 may format the data as it is stored onto the storage media 302. These operations could include re-writes, transformation, compression, protection (such as RAID), encryption and other functions that involve changing the format of the data in any way as necessary to allow it to be handled by the applicable type of target storage medium 308. In some embodiments, storage medium 308 may be remote.

In embodiments, storage read and write queues 814 may include data structures or buffering for staging data during a transfer. In embodiments, temporary memory, such as DRAM of NVRAM (which may be located off the FPGA 800) may be used for temporary storage of data.

A local storage scheduler and shaper 818 may prioritize and control access to the storage media 302. Any applicable SLA policies for local storage may be enforced in the scheduler and shaper 818, which may include strict priorities, weighted round robin scheduling, TOP shapers, and policers, which may apply on a per queue, per initiator, per target, or per c-group basis, and the like.

A data placement facility 820 may implement an algorithm that determines how the data is laid out on the storage media 302. That may involve various placement schemes known to those of skill in the art, such as striping across the media, localizing to a single device 302, using a subset of the devices 302, or localizing to particular blocks on a device 302.

A storage metadata management facility 822 may include data structures for data placement, block and object i-nodes, compression, deduplication, and protection. Metadata may be stored either in off-FPGA 800 NVRAM/DRAM or in the storage media 302.

A plurality of control blocks 824 may provide the interface to the storage media. These may include SAS, SATA, NVMe, PCIe, iSCSI, FC and/or FCoE, among other possible control blocks, in each case as needed for the appropriate type of target storage media 302.

A storage network tunnel 828 of the FPGA 800 may provide the tunneling/cut-through capabilities described throughout this disclosure in connection with the converged solution 300. Among other things, the tunnel 828 provides the gateway between storage traffic and network traffic. It includes encapsulation/de-encapsulation or the storage traffic, rewrite and formatting of the data, and end-to-end coordination of the transfer of data. The coordination may be between FPGAs 800 across nodes within a host computing system 102 or in more than one computing system 102, such as for the point-to-point path 400 described in connection with FIG. 4. Various functions, such as sequence numbers, packet loss, time-outs, and retransmissions may be performed. Tunneling may occur over Ethernet, including by FCoE or NVMeoE.

A virtual network interface card facility 830 may include a plurality of SR-IOV endpoints to the host 102, presented as virtual network interface cards. One physical function (PF) 836 may interfaces with a PCIe driver 110 (see software description below), and multiple virtual functions (VF) 837, in which each appear as a network interface card (NIC) 118.

A set of receive/transmit DMA queues 832 may include interrupt queues, doorbells, and other standard functions to perform DMA to and from the host 102.

A classifier and flow management facility 834 may perform standard network traffic classification, typically to IEEE standard 802.1Q class of service (COS) mappings or other priority levels.

An access control and rewrite facility 838 may handle access control lists (ACLs) and rewrite policies, including access control lists typically operating on Ethernet tuples (MAC SA/DA, IP SA/DA, TCP ports, etc.) to reclassify or rewrite packets.

A forwarding function 840 may determines destination of the packet, such as through layer 2 (L2) or layer 3 (L3) mechanisms.

A set of network receive and transmit queues 842 may handle data structures or buffering to the network interface. Off-FPGA 800 DRAM may be used for packet data.

A network/remote storage scheduler and policer 844 may provide priorities and control access to the network interface. SLA policies for remote storage and network traffic may be enforced here, which may include strict priorities, weighted round robin, IOP and bandwidth shapers, and policers on a per queue, per initiator, per target, per c-group, or per network flow basis, and the like.

A local network switch 848 may forward packets between queues in the FPGA, so that traffic does not need to exit the FPGA 800 to the network fabric 122 if the destination is local to the FPGA 800 or the host 102.

An end-to-end congestion control/credit facility 850 may prevent network congestion. This is accomplished with two algorithms. First there may be an end-to-end reservation/credit mechanism with a remote FPGA 800. This may be analogous to a SCSI transfer ready function, where the remote FPGA 800 permits the storage transfer if it can immediately accept the data. Similarly, the local FPGA 800 allocates credits to remote FPGAs 800 as they request a transfer. SLA policies for remote storage may also be enforced here. Second there may be a distributed scheduling algorithm, such as an iterative round-robin algorithm, such as the iSLIP algorithm for input-queues proposed in the publication "The iSLIP Scheduling Algorithm for Input-Queues Switches", by Nick McKeown, IEEE/ACM TRANSACTIONS ON NETWORKING, VOL. 7, NO. 2, APRIL 1999. The algorithm may be performed cluster wide using the intermediate network fabric as the crossbar.

A rewrite, tag, and CRC facility 852 may encapsulate/de-encapulate the packet with the appropriate tags and CRC protection.

A set of interfaces 854, such as MAC interfaces, may provide an interface to Ethernet.

A set of embedded CPU and cache complexes 858 may implement a process control plan, exception handling, and other communication to and from the local host and network remote FPGAs 800.

A memory controller 860, such as a DDR controller, may act as a controller for the external DRAM/NVRAM.

As a result of the integration of functions provided by the converged solution 300, as embodied in one example by the FPGA 800, provided herein are methods and systems for combining storage initiation and storage targeting in a single hardware system. In embodiments, these may be attached by a PCIe bus 110. A single root virtualization function (SR-IOV) or the like may be applied to take any standard device (e.g., any storage media 302 device) and have it act as if it is hundreds of such devices. Embodiments disclosed herein include using a protocol like SR-IOV to give multiple virtual instances of a physical storage adaptor. SR-IOV is a PCIe standard that virtualizes I/O functions, and while it has been used for network interfaces, the methods and systems disclosed herein extend it to use for storage devices. Thus, provided herein is a virtualized target storage system. In embodiments the virtual target storage system may handle disparate media as if the media are a disk or disks, such as DAS 310.

Enabled by embodiments like the FPGA 800, embodiments of the methods and systems disclosed herein may also include providing an NVMe device that is virtualized and dynamically allocated. In embodiments one may piggyback the normal NVMe protocol, but carve up, virtualize and dynamically allocate the NVMe device. In embodiments there is no footprint in the software. The operating system 108 stays the same or nearly the same (possibly having a small driver that sees the converged network/storage card 300). This results in virtual storage that looks like a direct attached disk, but the difference is that now we can pool such storage devices 302 across the network 122.

Methods and systems are disclosed herein for implementing virtualization of NVMe. Regardless how many sources are related to how many destinations, as long as the data from the sources is serialized first before going into the hub, then the hub distributes to data to the designated destination sequentially. If so, then data transport resources such as the DMA queues 804, 832 can be reduced to only one copy. This may include various use scenarios. In one scenario, for NVMe virtual functions (VFs), if they are all connected to the same PCIe bus 110, then regardless how many VFs 807 are configured, the data would be coming into this pool of VFs 807 serially, so there is only one DMA engine 804, and only one storage block (for control information) is needed.

In another use scenario, for a disk storage system with a pool of discrete disks/controllers, if the data is originated from the physical bus, i.e. PCIe 110, since the data is serially coming into this pool of disks, then regardless how many disks/controllers are in the pool, the transport resources such as the DMA engine 804 can be reduced to only one instead of one per controller.

Methods and systems disclosed herein may also include virtualization of a converged network/storage adaptor 300. From a traffic perspective, one may combine systems into one. Combining the storage and network adaptors, and adding in virtualization, gives significant advantages. Say there is a single host 102 with two PCIe buses 110. To route from the PCIe 110, you can use a system like remote direct memory access (RDMA) to get to another machine/host 102. If one were to do this separately, one has to configure the storage and the network RDMA systems separately. One has to join each one and configure them at two different places. In the converged solution 300, the whole step of setting up QoS, seeing that this is RDMA and that there is another fabric elsewhere is a zero touch process, because with combined storage and networking the two can be configured in a single step. That is, once one knows the storage, one doesn't need to set up the QoS on the network separately. Thus, single-step configuration of network and storage for RDMA solutions is enabled by the converged solution 300.

Referring again to FIG. 4, remote access is enabled by the FPGA 800 or similar hardware as described in connection with FIG. 8. The virtualization boundary is indicated in FIG. 4 by the dotted line 408. To the left of this line, virtual storage devices (e.g., NVMe 802) and virtual network interfaces 830 are presented to the operating system 108. The operating system cannot tell these are virtual devices. To the right of the virtualization boundary 408 are physical storage devices 302 (e.g., using SATA or other protocols noted above) and physical network interfaces. Storage virtualization functions are implemented by the vNVMe 802 and the NVMe virtualization facility 810 of FIG. 8. Network virtualization functions are implemented by the vNIC facility 830. Location of the physical storage media is also hidden from the operating system 108. Effectively, the physical disks 302 across servers can be pooled and accessed remotely. The operating system 108 issues a read or write transaction to the storage media 302 (it is a virtual device, but the operation system 108 sees it as a physical device). If the physical storage media 302 happens to be remote, the read/write transaction is mapped to the proper physical location, encapsulated, and tunneled through Ethernet. This process may be implemented by the device mapping facility 808, the NVMe virtualization facility 810, the data transformation facility 812 and the storage-network tunnel 828 of FIG. 8. The target server (second computing system) un-tunnels the storage read/write and directly accesses its local storage media 302. If the transaction is a write, the data is written to the media 302. If the transaction is a read, the data is prepared, mapped to the origin server, encapsulated, and tunneled through Ethernet. The transaction completion arrives at the origin operating system 102. In a conventional system, these steps would require software intervention in order to process the storage request, data formatting, and network access. As shown, all of these complex software steps are avoided.

Figure 9:
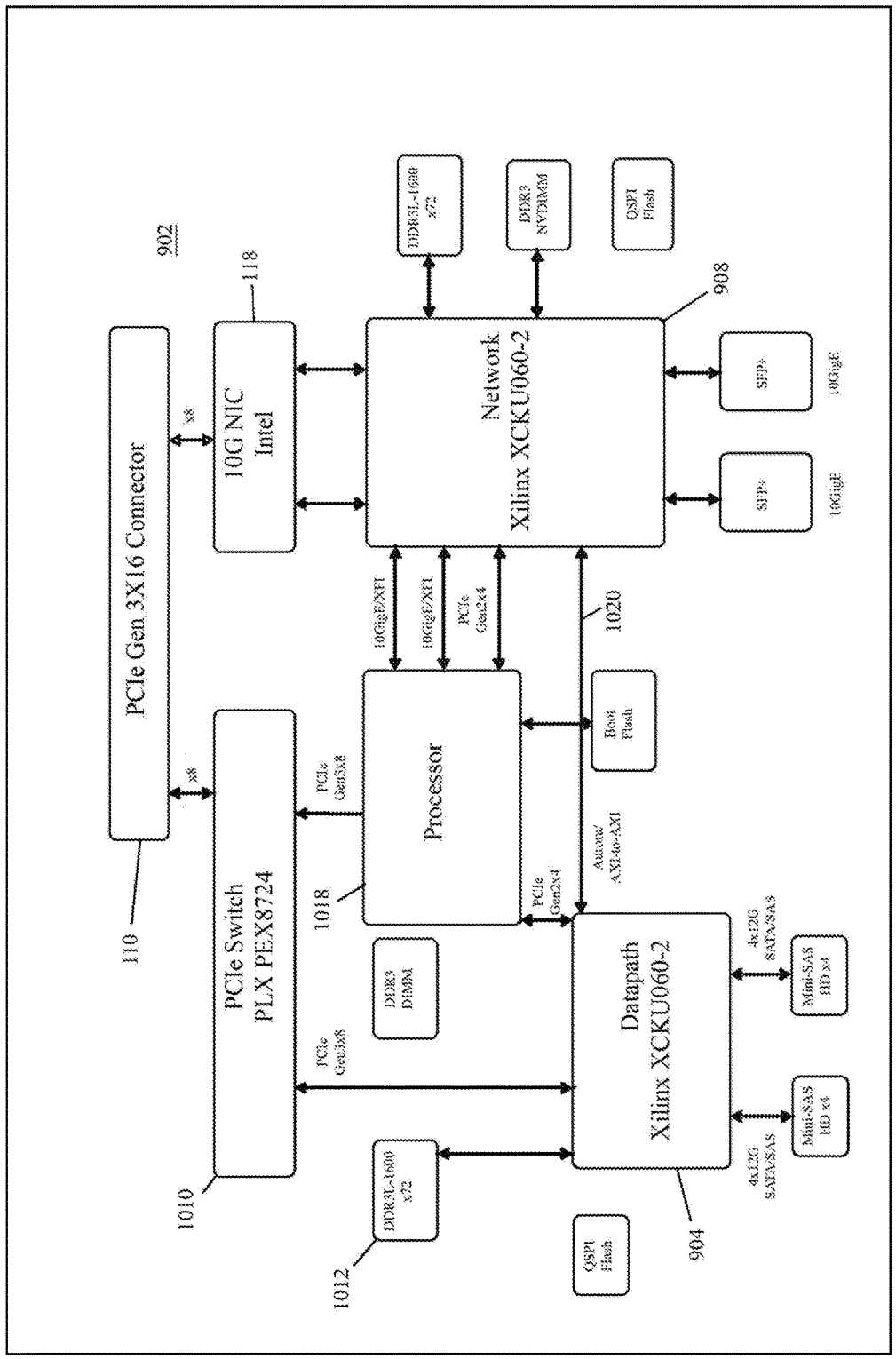
FIG. 9 illustrates an architecture of a controller card in accordance with an exemplary and non-limiting embodiment.

Referring to FIG. 9, a simplified block diagram is provided of an architecture of a controller card 902, as one embodiment of a converged solution 300 as described throughout this disclosure. The controller card 902 may be, for example, a standard, full-height, half-length PCIe card, such as a Gen3×16 card. However, a non-standard card size is acceptable, preferably sized so that it can fit into various types of targeted chassis. The PCIe form factor limits the stack up and layers used on the PCB.

The controller card 902 may be used as an add-on card on a commodity chassis, such as a 2RU, 4 node chassis. Each node of the chassis (called a sled) is typically 1RU and 6.76" wide. The motherboard typically may provide a PCIe Gen3× 16 connector near the back. A riser card may be used to allow the Controller card 902 to be installed on top of the motherboard; thus, the clearance between the card and the motherboard may be limited to roughly on slot width.

In embodiments, the maximum power supplied by the PCIe connector is 75W. The controller card 902 may consume about 60W or less.

The chassis may provide good airflow, but the card should expect a 10C rise in ambient temperature, because in this example the air will be warmed by dual Xeon processors and 16 DIMMs. The maximum ambient temperature for most servers is 35 C, so the air temperature at the controller card 902 will likely be 45 C or higher in some situations. Custom heat sinks and baffles may be considered as part of the thermal solution.

There are two FPGAs in the embodiment of the controller card 902 depicted in FIG. 9, a datapath FPGA, or datapath chip 904, and a networking FPGA, or networking chip 908.

The datapath chip 904 provides connectivity to the host computer 102 over the PCIe connector 110. From the host processor's point of view, the controller card 902 looks like multiple NVMe devices. The datapath chip 904 bridges NVMe to standard SATA/SAS protocol and in this embodiment controls up to six external disk drives over SATA/SAS links. Note that SATA supports up to 6.0 Gbps, while SAS supports up to 12.0 Gbps.

The networking chip 908 switches the two 10G Ethernet ports of the NIC device 118 and the eCPU 1018 to two external 10G Ethernet ports. It also contains a large number of data structures for used in virtualization.

The motherboard of the host 102 typically provides a PCIe Gen3×16 interface that can be divided into two separate PCIe Gen3×8 busses in the Intel chipset. One of the PCIe Gen3×8 bus 110 is connected to the Intel NIC device 118. The second PCIe Gen3×8 bus 110 is connected to a PLX PCIe switch chip 1010. The downstream ports of the switch chip 1010 are configured as two PCIe Gen3×8 busses 110. One of the busses 110 is connected to the eCPU while the second is connected to the datapath chip 904.

The datapath chip 904 uses external memory for data storage. A single ×72 DDR3 channel 1012 should provide sufficient bandwidth for most situations. The networking chip 908 also uses external memory for data storage, and a single ×72 DDR3 channel is likely to be sufficient for most situations. In addition, the data structures require the use of non-volatile memory, such as one that provides high performance and sufficient density, such as Non-volatile DIMM (NVDIMM, which typically has a built-in power switching circuit and super-capacitors as energy storage elements for data retention.

The eCPU 1018 communicates with the networking 908 using two sets of interfaces. It has a PCIe Gen2×4 interface for NVMe-like communication. The eCPU 1018 also has two 10G Ethernet interfaces that connect to the networking chip 908, such as through its L2 switch.

An AXI bus 1020 (a bus specification of the ARM chipset) will be used throughout the internal design of the two chips 904, 908. To allow seamless communication between the datapath chip 904 and the networking chip 908, the AXI bus 1020 is used for chip-to-chip connection. The Xilinx Aurora™ protocol, a serial interface, may be used as the physical layer.

The key requirements for FPGA configuration are that (1) The datapath chip 904 must be ready before PCIe configuration started (QSPI Flash memory (serial flash memory with quad SPI bus interface) may be fast enough) and (2) the chips are preferably field upgradeable. The Flash memory for configuration is preferably large enough to store at least 3 copies of the configuration bitstream. The bitstream refers to the configuration memory pattern used by Xilinx™ FPGAs. The bitstream is typically stored in non-volatile memory and is used to configure the FPGA during initial power-on. The eCPU 1018 may be provided with a facility to read and write the configuration Flash memories. New bitstreams may reside with the processor of the host 102. Security and authentication may be handled by the eCPU 1018 before attempting to upgrade the Flash memories.

In a networking subsystem, the Controller card 902 may handle all network traffic between the host processor and the outside world. The Networking chip 908 may intercept all network traffics from the NIC 118 and externally.

The Intel NIC 118 in this embodiment connects two10 GigE, XFI interfaces 1022 to the Networking chip 908. The embedded processor will do the same. The Networking chip 908 will perform an L2 switching function and route Ethernet traffic out to the two external 10 GigE ports. Similarly, incoming 10 GigE traffic will be directly to either the NIC 118, the eCPU 1018, or internal logic of the Networking chip 908.

The controller card 902 may use SFP+ optical connectors for the two external 10G Ethernet ports. In other embodiments, the card may support 10GBASE-T using an external PHY and RJ45 connectors; but a separate card may be needed, or a custom paddle card arrangement may be needed to allow switching between SFP+ and RJ45.

All the management of the external port and optics, including the operation of the LEDs, may be controlled by the Networking chip 908. Thus, signals such as PRST, I2C/MDIO, etc may be connected to the Networking chip 908 instead of the NIC 118.

Figure 10:
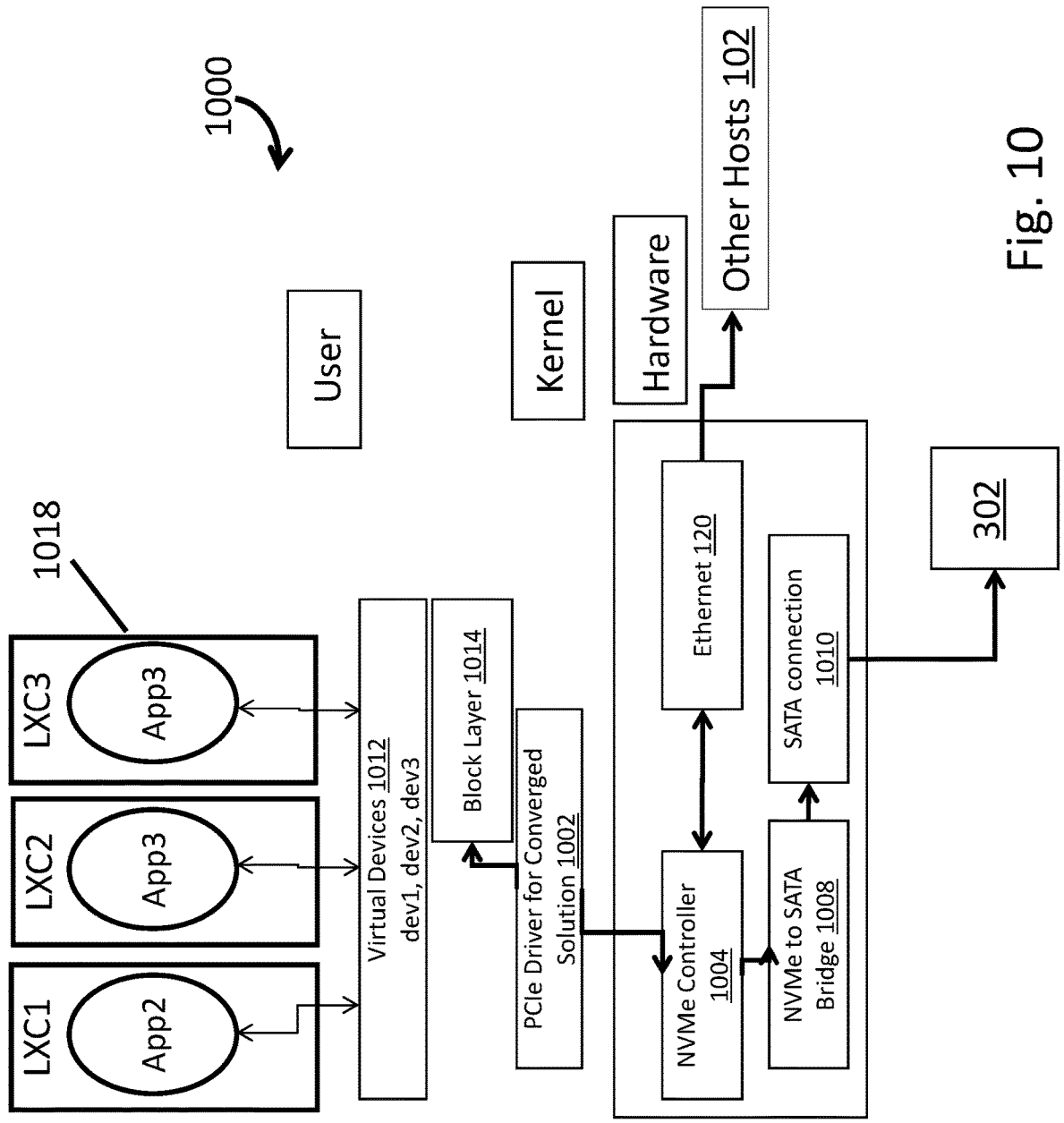
FIG. 10 illustrates a software stack in accordance with an exemplary and non-limiting embodiment.

In a storage subsystem, the Datapath chip 904 may drive the mini-SAS HD connectors directly. In embodiments such as depicted in FIG. 10, the signals may be designed to operate at 12 Gbps to support the latest SAS standard.

To provide efficient use of board space, two ×4 mini-SAS HD connectors may be used. All eight sets of signals may be connected to the Datapath chip 904, even though only six sets of signals might be used at any one time.

On the chassis, high-speed copper cables may be used to connect the mini-SAS HD connectors to the motherboard. The placement of the mini-SAS HD connectors may take into account the various chassis' physical space and routing of the cables.

The power to the controller card 902 may be supplied by the PCIe ×16 connector. No external power connection needs to be used. Per PCIe specification, the PCIe ×16 connector may supply only up to 25W of power after power up. The controller card 902 may be designed such that it draws less than 25W until after PCIe configuration. Thus, a number of interfaces and components may need to be held in reset after initial power up. The connector may supply up to 75W of power after configuration, which may be arranged such that the 75W is split between the 3.3V and 12V rails.

FIG. 10 shows a software stack 1000, which includes a driver 1002 to interface to the converged solution 300, such as one enabled by the FPGA 800. The NVMe controller 1004 is the set of functions of the hardware (e.g., FPGA 800) that serves the function of an NVMe controller and allocates virtual devices 1012 to the host. In FIG. 10, dev1, dev2, dev3 are examples of virtual devices 1012 which are dynamically allocated to containers 1018 LXC1, LXC2, and LXC3, respectively. The NVMe to SATA bridge 1008 is the part of the hardware sub-system (e.g., FPGA 800) that converts and maps virtual devices 1012 (dev1, dev2, dev3) to storage devices 302 (e.g., SSDs in the figure). The connection 1010 is the part of the hardware system that provides a SATA connection (among other possible connection options noted above). The Ethernet link 120, which can expose virtual devices 1012 (i.e. dev1, dev2, dev3) to other host(s) 102 connected via the Ethernet link 120 using a storage tunneling protocol. The PCI-E (NVMe driver) 1002 may program and drive the hardware subsystem for the storage side. This driver 1002 may run on the host as part of the operating system (e.g., Linux OS in this example). The block layer 1014 may be a conventional SCSI sub-system of the Linux operating system, which may interface with the converged solution PCIe driver 1002 to expose virtual storage devices 1012. The containers 1018 (LXC1, LXC2, LXC3) may request and dynamically be allocated virtual storage devices 1012 (dev1, dev2 and dev3, respectively).

Figure 11:
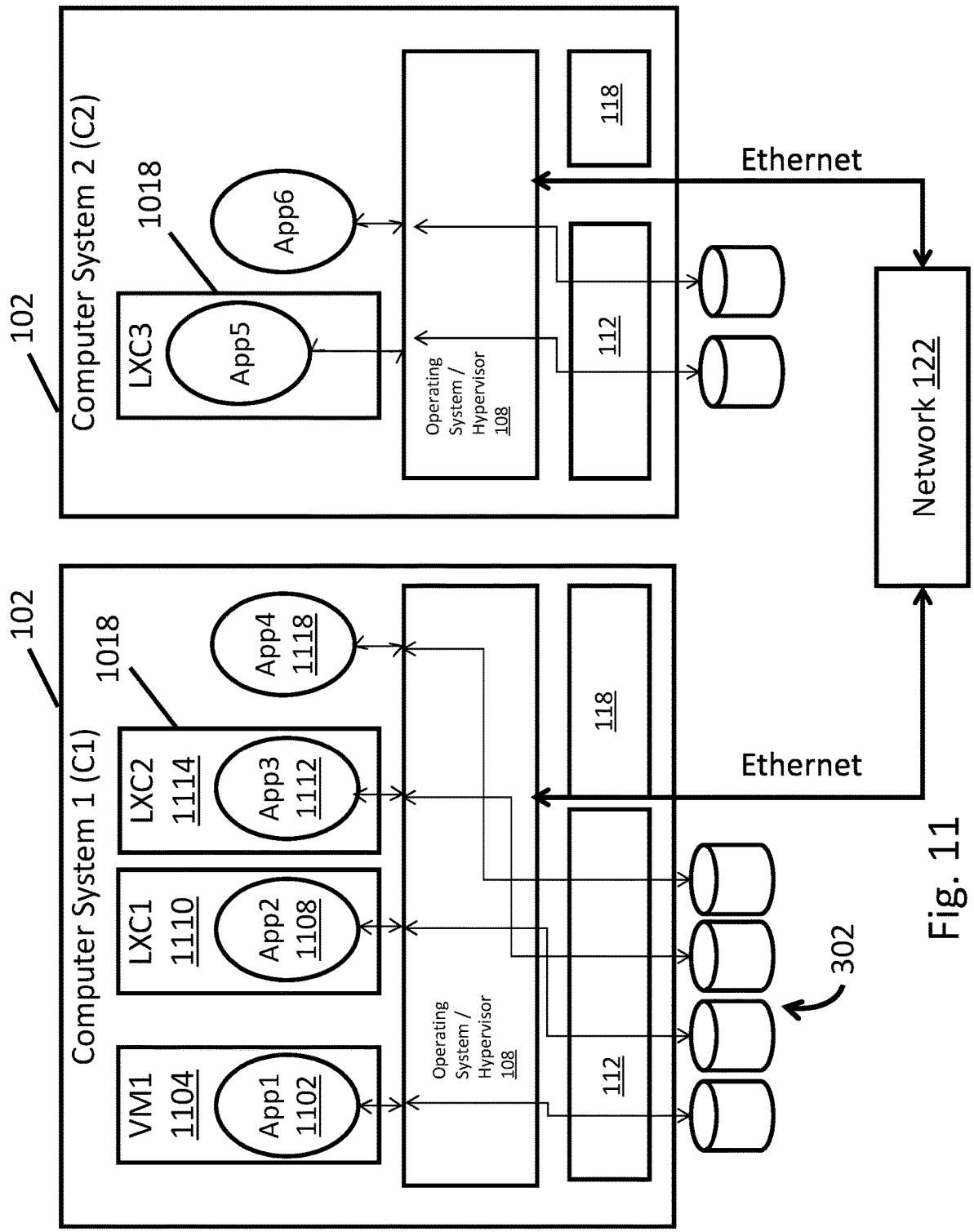
FIGS. 11-15 illustrate the movement of an application container across multiple systems in accordance with an exemplary and non-limiting embodiment.

FIGS. 11 through 15 show an example of the movement of an application container 1018 (e.g., a Linux container) across multiple systems 102, first in the absence of a converged solution 300 and then in the presence of such a converged solution 300. FIG. 11 shows an example of two conventional computer systems 102 with conventional storage controllers 112 and network controllers 118 hosting virtualized software in an OS/Hypervisor stack 108. Computer System 1 (C1) has a configuration similar to the one shown in FIG. 1 with CPU, memory and conventional storage controller 112 and network controller 118. The system runs an operating system 108, such as Linux™, Microsoft Windows™, etc, and/or hypervisor software, such as Xen, VMware, etc. to provide support for multiple applications natively or over virtualized environments, such as via virtual machines or containers. In this computer system 102, application App1 1102 is running inside a virtual machine VM1 1104. Applications App2 1108 and App3 1112 are running within virtualized containers LXC1 1110 and LXC2 1114 respectively. In addition to these, application App4 1118 is running natively over the Operating System 108. Although typically, a practical scenario might have only virtual machines or containers or native applications (not all three), here it is depicted in a combined fashion deliberately to cover all cases of virtualized environments. Computer System 2 (C2) 102 has similar configuration supporting App5 and App6 in a container and natively, respectively. Each of these applications access their storage devices 302 independent of each other, namely App1 uses S1, App2 uses S2, etc. These storage devices 302 (designated S1-S6) are not limited to being independent physical entities. They could be logically carved out of one or more physical storage elements as deemed necessary. As one can see, (represented by the arrow from each storage device 302 to an application), the data flow between the storage 302 and the application 1102, 1108, 1112, 1118 passes through the storage controller 112 and the operating system/hypervisor stack 108 before it reaches the application, entailing the challenges described in connection with FIG. 1.

Figure 12:
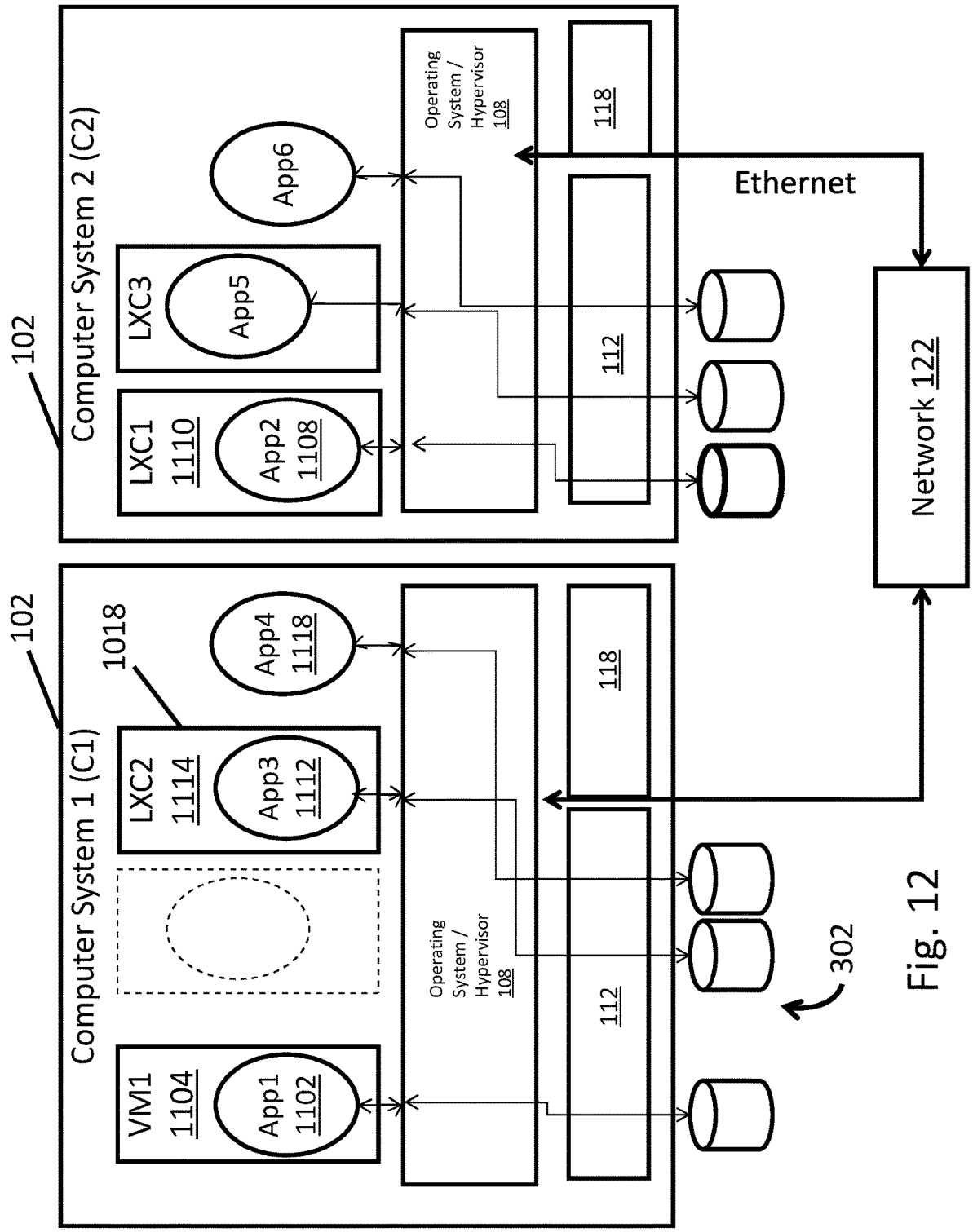

Referring to FIG. 12, when an application or a container is moved from C1 to C2, its corresponding storage device needs to be moved too. The movement could be needed due to the fact that C1 might be running out of resources (such as CPU, memory, etc.) to support the existing applications (App1-App4) over a period of time, such as because of behavioral changes within these applications.

Typically, it is easier to accomplish the movement within a reasonable amount of time as long as the application states and the storage are reasonable in terms of size. Typically storage-intense applications may use large amounts (e.g., multiple terabytes) of storage, in which case, it may not be practical to move the storage 302 within an acceptable amount of time. In that case, storage may continue to stay where it was and software-level shunting/tunneling would be undertaken to access the storage remotely, as shown in FIG. 13.

Figure 13:
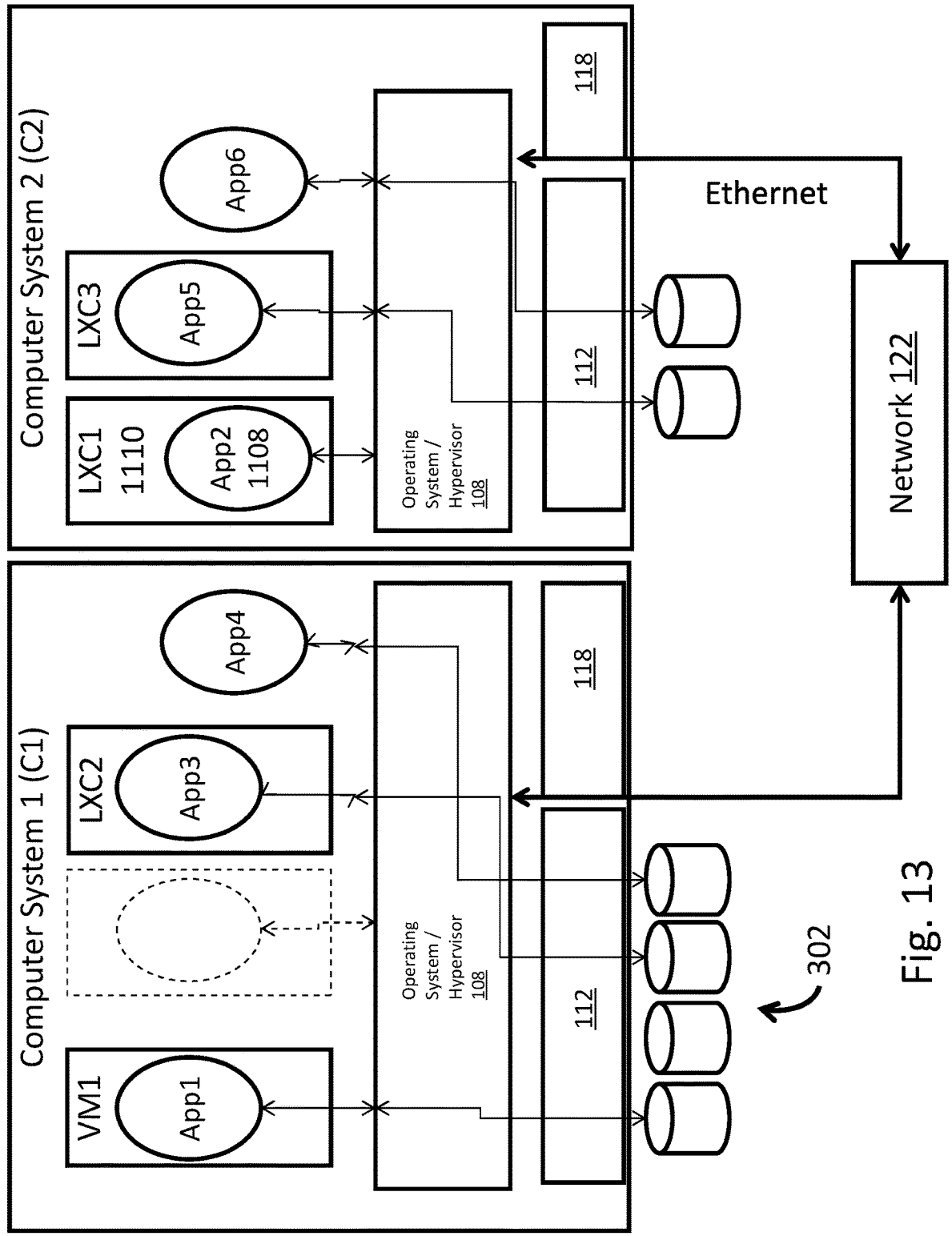

As shown in FIG. 13, App2 1108, after its movement to computer system C2, continues to access its original storage S2 located on computer system C1 by traversing through Operating Systems or Hypervisors 108 of both the systems C1 and C2. This is because the mapping of storage access through the network controllers 118 to that storage controller 112 and its attached storage devices 302 is done by the Operating System or Hypervisor software stack 108 running within the main CPU.

As shown in FIG. 13 after its movement to C2, App2 1108 continues to access its original storage S2 located in C1 by traversing through Operating Systems or Hypervisors 108 of both the systems C1 and C2. This is because, the mapping of storage access through the network controllers 118 from C2 to C1 and over to that storage controller 112 of C1 is done by the Operating System or Hypervisor software 108 running within the main CPU of each computer system.

Figure 14:
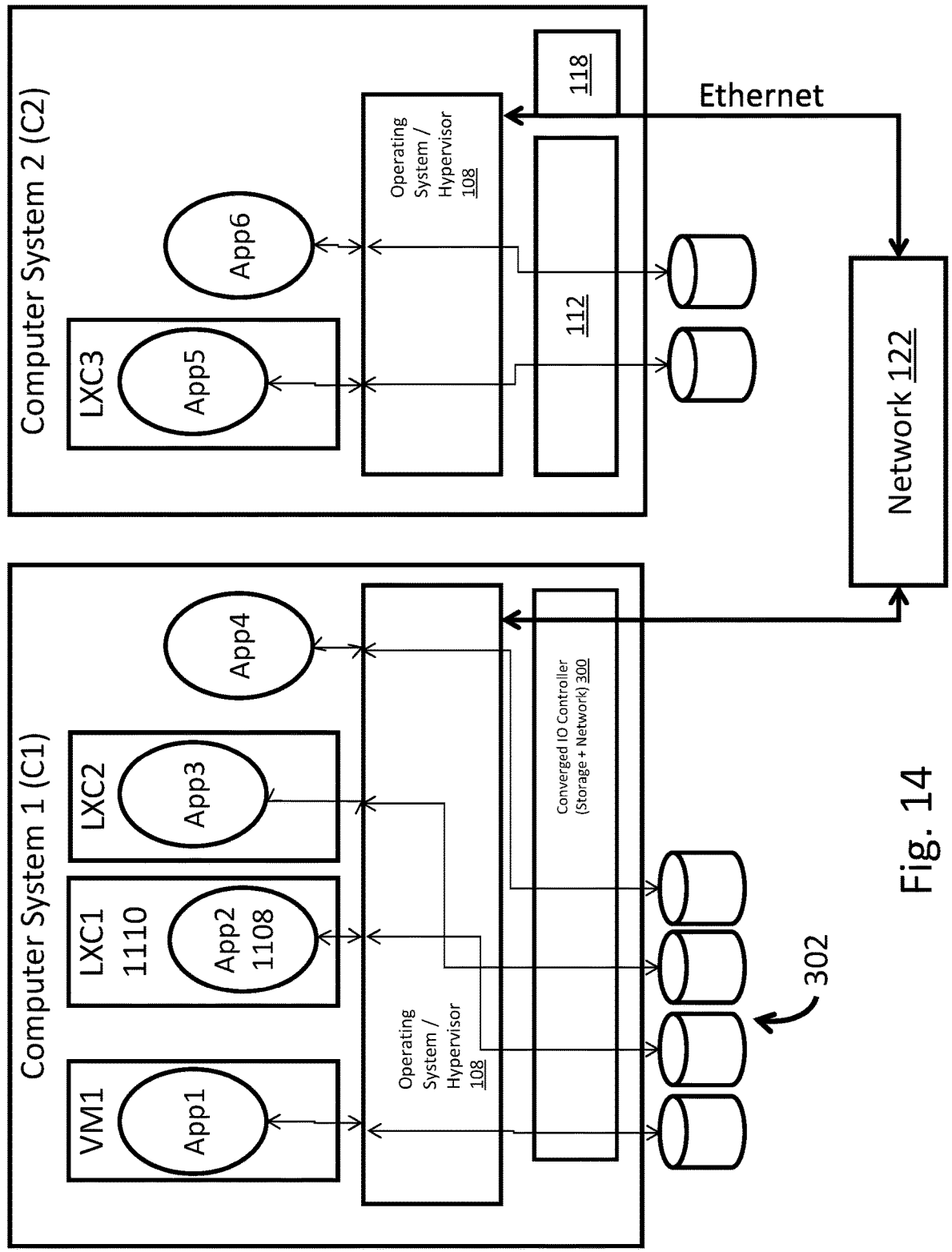
Figure 15:
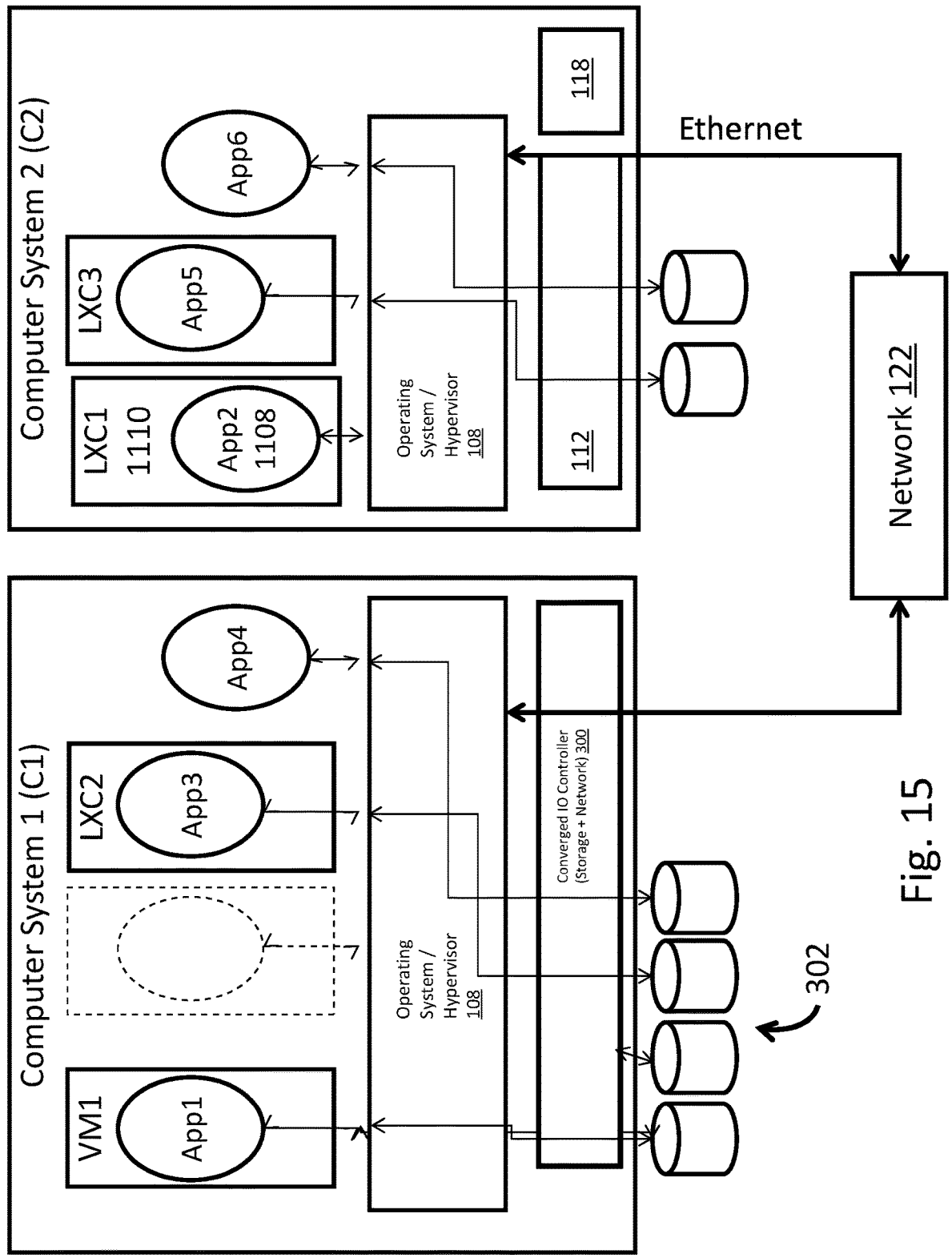

Consider a similar scenario when a converged controller 300 is applied as shown in the FIG. 14. As one can see, the scenario is almost identical to FIG. 11, except the Converged IO Controller 300 replaces the separate storage controller 112 and network controller 118. In this case, when App2 1108 along with its container LXC1 is moved to C2 (as shown in FIG. 15), the storage S2 is not moved, and the access is optimized by avoiding the traversal through any software (Operating System, Hypervisor 108 or any other) running in main CPU present in computing system C1.

Thus, provided herein is a novel way of bypassing the main CPU where a storage device is located, which in turn (a) allows one to reduce latency and bandwidth significantly in accessing a storage across multiple computer systems and (b) vastly simplifies and improves situations in which an application needs to be moved away from a machine on which its storage is located.

Ethernet networks behave on a best effort basis and hence lossy in nature as well as bursty. Any packet could be lost forever or buffered and delivered in bursty and delayed manner along with other packets. Whereas, typical storage centric applications are sensitive to losses and bursts, it is important that when storage traffic is sent over Ethernet networks.

Conventional storage accesses over their buses/networks involve reliable and predictable methods. For example, Fibre Channel networks employ credit based flow control to limit number of accesses made by end systems. And the number of credits given to an end system is based on whether the storage device has enough command buffers to receive and fulfill storage requests in predictable amount of time fulfilling required latency and bandwidth needs. The figure below shows some credit schemes adopted by different types of buses such as SATA, Fibre Channel (FC), SCSI, SAS, etc.

Figure 16:
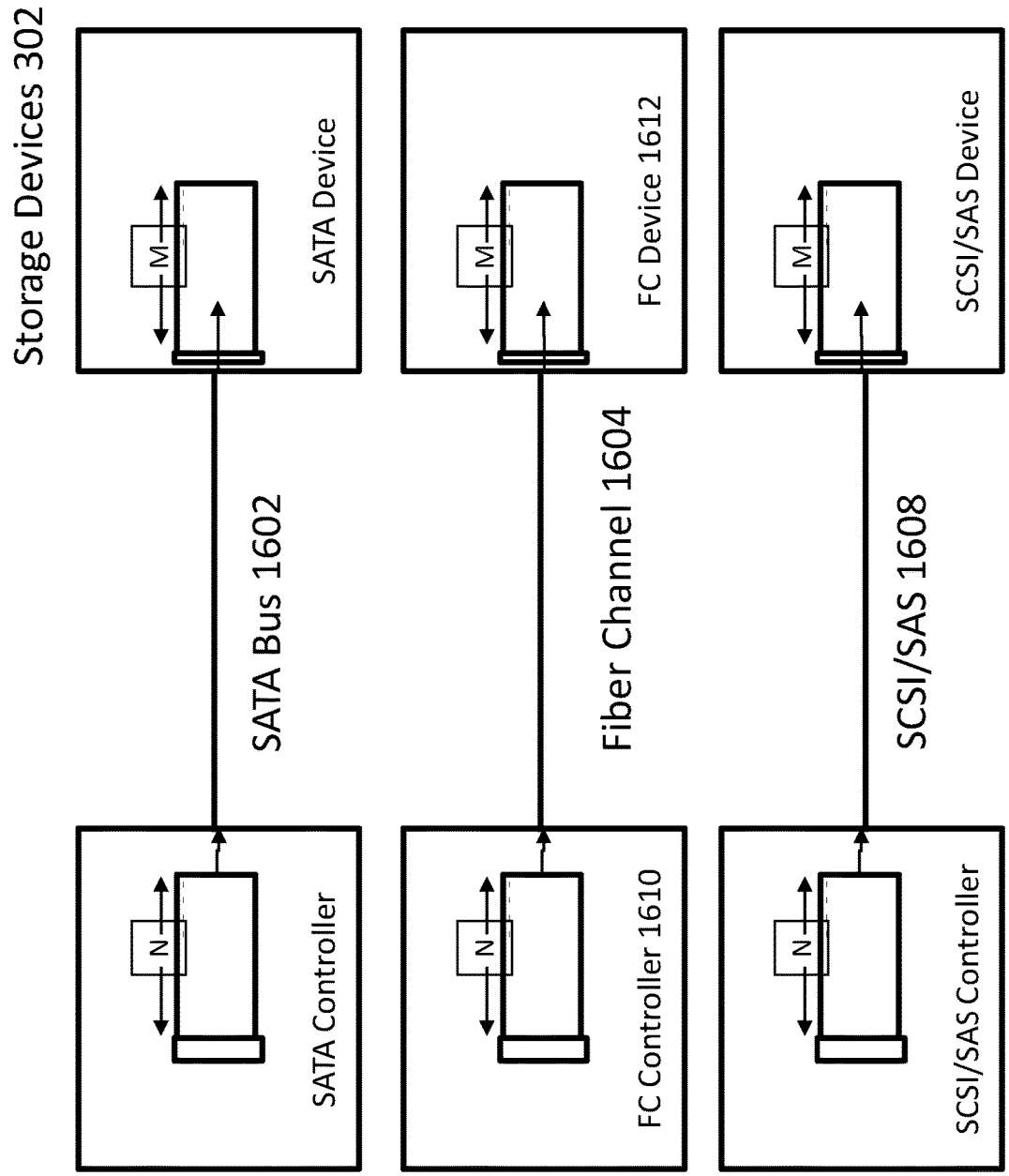
FIG. 16 illustrates packet transmission in accordance with an exemplary and non-limiting embodiment.

Referring to FIG. 16, Ethernet networks behave on a best effort basis and hence tend to be lossy in nature, as well as bursty. Any packet could be lost forever or buffered and delivered in a delayed manner, in a congestion-inducing burst, along with many other packets. Typical storage-centric applications are sensitive to losses and bursts, so it is important when storage traffic is sent over buses and Ethernet networks, that those involve reliable and predictable methods for maintaining integrity. For example, Fibre Channel networks conventionally employ credit-based flow control to limit the number of accesses made by end systems at any one time. The number of credits given to an end system can be based on whether the storage device 302 has enough command buffers to receive and fulfill storage requests in a predictable amount of time that satisfies required latency and bandwidth requirements. FIG. 16 shows some of the credit schemes adopted by different types of buses such as a SATA bus 1602, Fibre Channel (FC) 1604, and SCSI/SAS connection 1608, among other types of such schemes.

As one can see, for example, an FC controller 1610 may have its own buffering up to a limit of 'N' storage commands before sending them to an FC-based storage device 1612, but the FC device 1612 might have a different buffer limit, say 'M' in this example, which could be greater than, equal to, or less than 'N'. A typical credit-based scheme uses target level (in this example, one of the storage devices 302, such as the FC Device 1602, is the target) aggregate credits, information about which is propagated to various sources (in this example, the controller, such as the FC Controller 1610, is the source) which are trying to access the target 302. For example, if two sources are accessing a target that has a queue depth of 'N,' then sum of the credits given to the sources would not exceed 'N,' so that at any given time the target will not receive more than 'N' commands. The distribution of credits among the sources may be arbitrary, or it may be based on various types of policies (e.g., priorities based on cost/pricing, SLAs, or the like). When the queue is serviced, by fulfilling the command requests, credits may be replenished at the sources as appropriate. By adhering to this kind of credit-based storage access, losses that would result from queues at the target being overwhelmed can be avoided.

Typical storage accesses over Ethernet, such as FCOE, iSCSI, and the like, may extend the target-oriented, credit-based command fulfillment to transfers over Ethernet links. In such cases, they may be target device-oriented, rather than being source-oriented. Provided herein are new credit based schemes that can instead be based on which or what kind of source should get how many credits. For example, the converged solution 300 described above, which directly interfaces the network to the storage, may employ a multiplexer to map a source-oriented, credit-based scheduling scheme to a target device oriented credit based scheme, as shown in FIG. 17.

Figure 17:
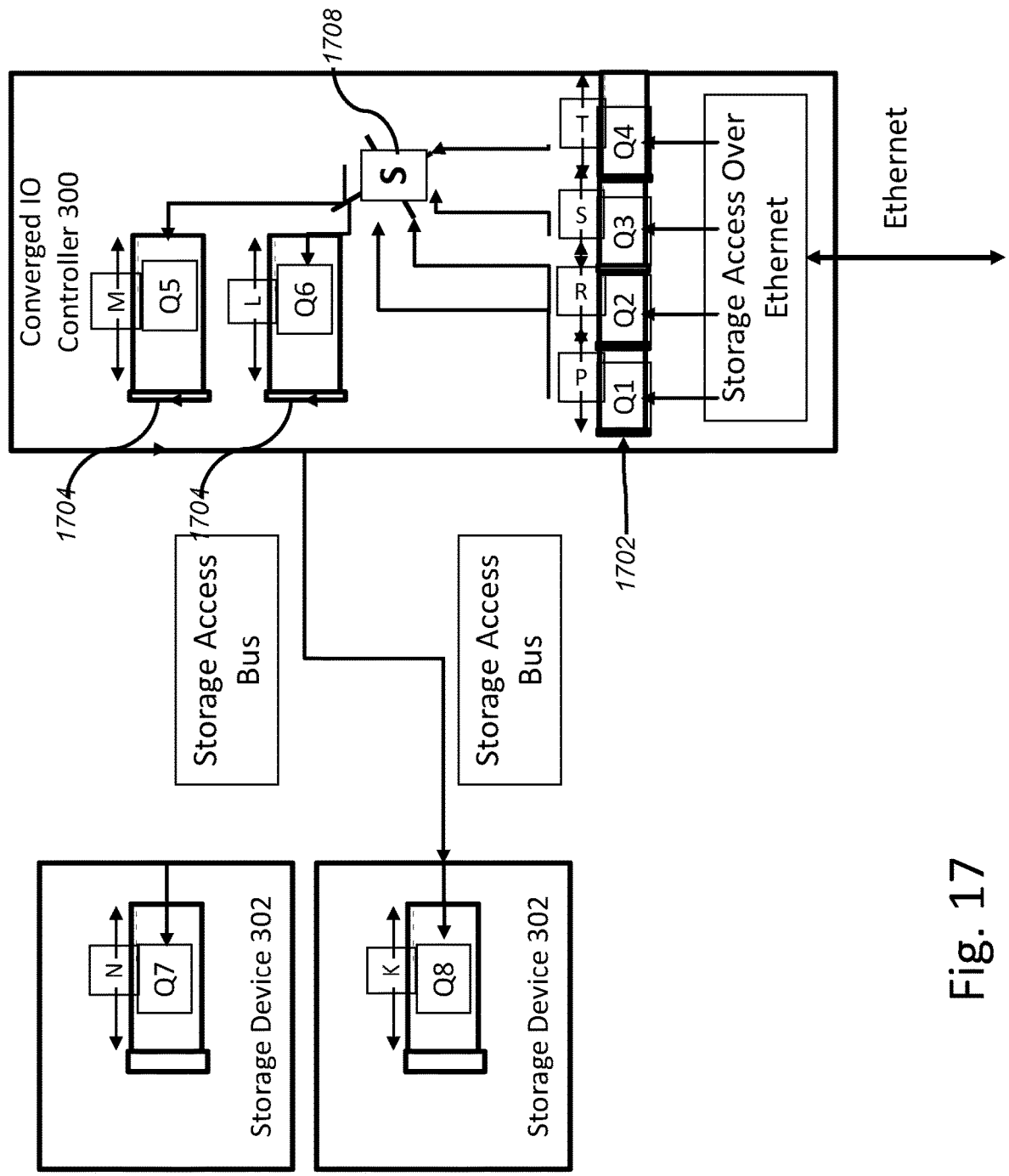
FIG. 17 illustrates a storage access scheme in accordance with an exemplary and non-limiting embodiment.

As shown in FIG. 17, four sources are located over Ethernet and there are two target storage devices 302. Typical target-oriented, credit-based schemes would expose two queues (one per target), or two connections per source to each of the targets. Instead, as shown in FIG. 17, the queues (Q1,Q2,Q3,Q4) 1702 are on a per-source basis, and they mapped/multiplexed to two target-oriented queues (Q5, Q6) 1704 across the multiplexor (S) 1708. By employing this type of source-oriented, credit-based scheme, one may guarantee access bandwidth and predictable access latency, independent of the number of target storage devices 302. As an example, one type of multiplexing is to make sure queue size 'P' of Q1 does not exceed 'L+M' of Q5 and Q6, so that Q1 is not overwhelmed by its source.

In embodiments, methods and systems to provide access to blocks of data from a storage device 302 is described. In particular, a novel approach to allowing an application to access its data, fulfilling a specific set of access requirements is described.

As used herein, the term "application-driven data storage" (ADS) encompasses storage that provides transparency to any application in terms of how the application's data is stored, accessed, transferred, cached and delivered to the application. ADS may allow applications to control these individual phases to address the specific needs of the particular application. As an example, an application might be comprised of multiple instances of itself, as well as multiple processes spread across multiple Linux nodes across the network. These processes might access multiple files in shared or exclusive manners among them. Based on how the application wants to handle these files, these processes may want to access different portions of the files more frequently, may need quick accesses or use once and throw away. Based on these criteria, it might want to prefetch and/or retain specific portions of a file in different tiers of cache and/or storage for immediate access on per session or per file basis as it wishes. These application specific requirements cannot be fulfilled in a generic manner such as disk striping of entire file system, prefetching of read-ahead sequential blocks, reserving physical memory in the server or LRU or FIFO based caching of file contents.

Application-driven data storage I/O is not simply applicable to the storage entities alone. It impacts the entire storage stack in several ways. First, it impacts the storage I/O stack in the computing node where the application is running comprising the Linux paging system, buffering, underlying File system client, TCP/IP stack, classification, QoS treatment and packet queuing provided by the networking hardware and software. Second, it impacts the networking infrastructure that interconnects the application node and its storage, comprising Ethernet segments, optimal path selections, buffering in switches, classification and QoS treatment of latency-sensitive storage traffic as well as implosion issues related to storage I/O. Also, it impacts the storage infrastructure which stores and maintains the data in terms of files comprising the underlying file layout, redundancy, access time, tiering between various types of storage as well as remote repositories.

Methods and systems disclosed herein include ones relating to the elements affecting a typical application within an application node and how a converged solution 300 may change the status quo to address certain critical requirements of applications.

Conventional Linux stacks may consist of simple building blocks, such generic memory allocation, process scheduling, file access, memory mapping, page caching, etc. Although these are essential for an application to run on Linux, this is not optimal for certain categories of applications that are input/output (TO) intensive, such as NoSQL. NoSQL applications are very IO intensive, and it is harder to predict their data access in a generic manner. If applications have to be deployed in a utility-computing environment, it is not ideal for Linux to provide generic minimal implementations of these building blocks. It is preferred for these building blocks to be highly flexible and have application-relevant features that can be controllable from the application(s).

Although every application has its own specific requirements, in an exemplary embodiment, the NoSQL class of applications has the following requirements which, when addressed by the Linux stack, could greatly improve the performance of NoSQL applications and other IO intensive applications. The requirements are first, the use of file level priority. The Linux file system should provide access level priority between different files at a minimum. For example, an application process (consisting of multiple threads) accessing two different files with one file given higher priority over the other (such as one database/table/index over the other). This would enable the precious storage I/O resources be preferentially utilized based on the data being accessed. One would argue that this could be indirectly addressed by running one thread/process be run at a higher or lower priority, but those process level priorities are not communicated over to file system or storage components. Process or thread level priorities are meant only for utilizing CPU resources. Moreover, it is possible that same thread might be accessing these two files and hence will be utilizing the storage resources at two different levels based on what data (file) being accessed. Second, there may be a requirement for access level preferences. A Linux file system may provide various preferences (primarily SLA) during a session of a file (opened file), such as priority between file sessions, the amount of buffering of blocks, the retention/life time preferences for various blocks, alerts for resource thresholds and contentions, and performance statistics. As an example, when a NoSQL application such as MongoDB or Cassandra would have two or more threads for writes and reads, where if writes may have to be given preference over reads, a file session for write may have to be given preference over a file session for read for the same file. This capability enables two sessions of the same file to have two different priorities.

Many of the NoSQL applications store different types of data into the same file; for example, MongoDB stores user collections as well as (b-tree) index collections in the same set of database files. MongoDB may want to keep the index pages (btree and collections) in memory in preference over user collection pages. When these files are opened, MongoDB may want to influence the Linux, File and storage systems to treat the pages according to MongoDB policies as opposed to treating these pages in a generic FIFO or LRU basis agnostic of the application's requirements.

Resource alerts and performance statistics enable an NoSQL database to understand the behavior of the underlying File and storage system and could service its database queries accordingly or trigger actions to be carried out such as sharding of the database or reducing/increasing of File I/O preference for other jobs running in the same host (such as backup, sharding, number read/write queries serviced, etc.). For example, performance stats about min, max and average number of IOPs and latencies as well as top ten candidate pages thrashed in and out of host memory in a given period of time would enable an application to fine tune itself dynamically adjusting the parameters noted above.

A requirement may also exist for caching and tiering preferences. A Linux file system may need to have a dynamically configurable caching policy while applications are accessing their files. Currently, Linux file systems typically pre-fetch contiguous blocks of a file, hoping that applications are reading the file in a sequential manner like a stream. Although it is true for many legacy applications like web servers and video streamers, emerging NoSQL applications do not follow sequential reads strictly. These applications read blocks randomly. As an example, MongoDB stores the document keys in index tables in b-tree, laid out flat on a portion of a file, which, when a key is searched, accesses the blocks randomly until it locates the key. Moreover, these files are not dedicated to such b-tree based index tables alone. These files are shared among various types of tables (collections) such as user documents and system index files. Because of this, a Linux file system cannot predict what portions of the file need to be cached, read ahead, swapped out for efficient memory usage, etc.

In embodiments of the methods and systems described herein, there is a common thread across various applications in their requirements for storage. In particular, latency and IOPs for specific types of data at specific times and places of need are very impactful on performance of these applications.

For example, to address the host level requirements listed above, disclosed herein are methods and systems for a well fine-tuned file-system client that enables applications to completely influence and control the storing, retrieving, retaining and tiering of data according to preference within the host and elsewhere.

Figure 18:
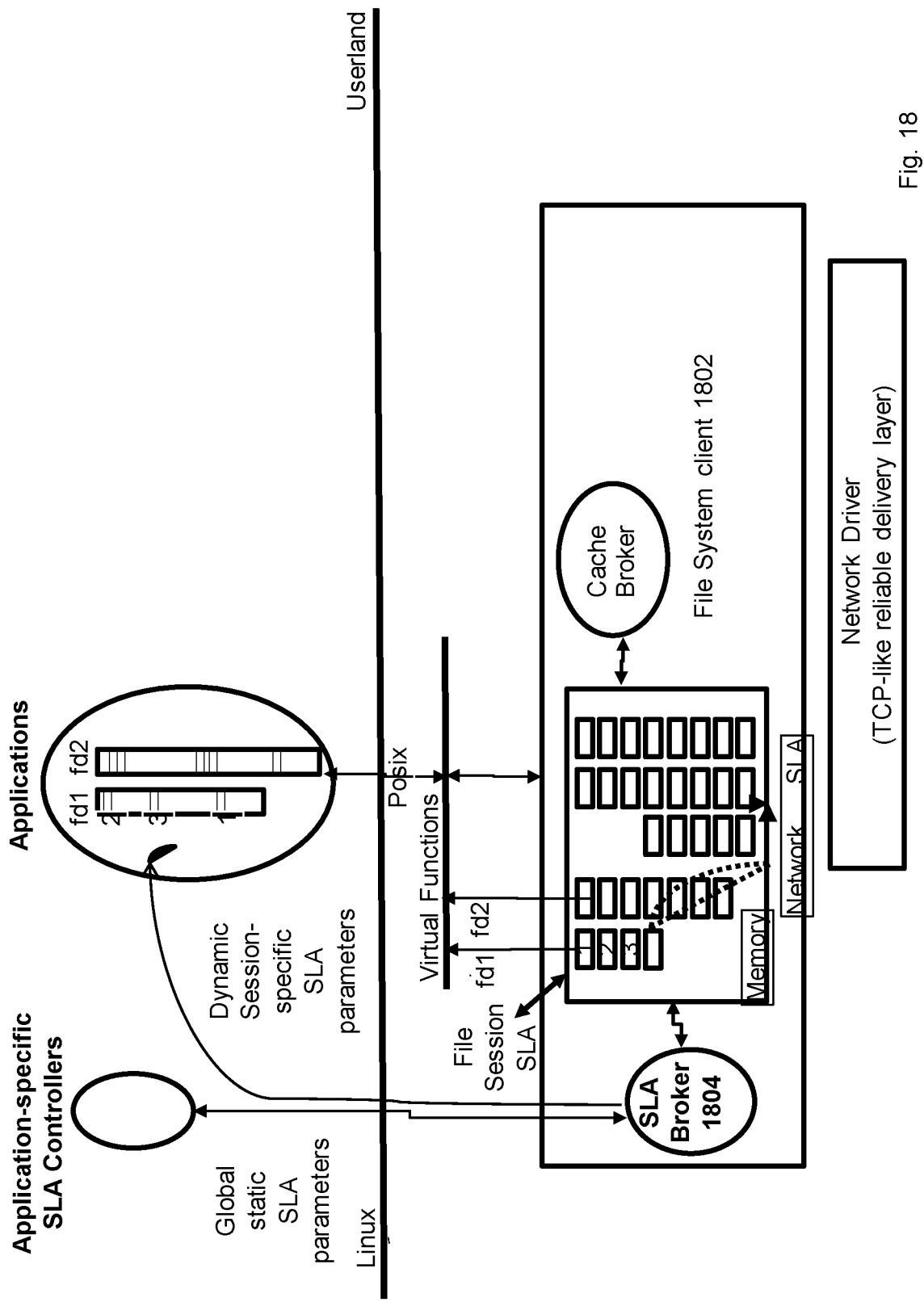
FIG. 18 illustrates the operation of a file system in accordance with an exemplary and non-limiting embodiment.

As shown in FIG. 18, a File System (FS) client 1802 keeps separate buffer pools for separate sessions of a file (fd1 and fd2). It also pre-allocates and maintains aggregate memory pools for each application or set of processes. The SLA-Broker 1804 may be exercised by the application either internally within the process/thread where the file I/O is carried out or externally from another set of processes, to influence the FS Client 1802 to provide appropriate storage I/O SLAs dynamically. Controlling the SLA from an external process enables a legacy application with no knowledge of these newer storage control features immediately without modifying the application itself.

Figure 19:
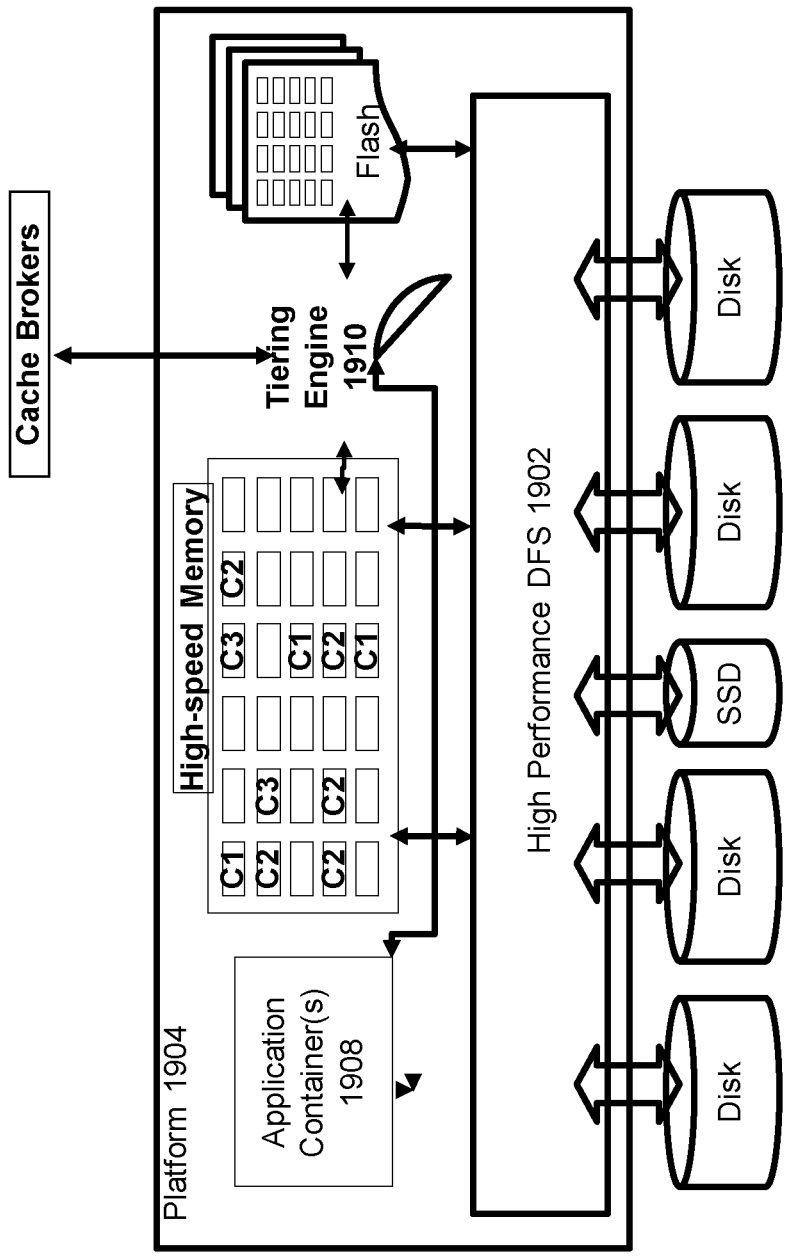
FIG. 19 illustrates the operation of a distributed file server in accordance with an exemplary and non-limiting embodiment.

Methods and systems disclosed herein may provide extensive tiering services for data retrieval across network and hosts. As one can see in FIG. 19 below, a High Performance Distributed File Server (DFS) 1902 enables application to run in the Platform 1904 in a containerized form to determine and execute what portions of files should reside in which media (DRAM, NVRAM, SSD or HDDs) in cached form storage form dynamically. These application containers 1908 can determine other storage policies such as whether a file has to be striped, mirrored, raided and disaster recovered (DR'ed) as well.

The methods and systems disclosed herein also provide extensive caching service. wherein an application container in the High Performance DFS 1902 can proactively retrieve specific pages of a file from local storage and/or remote locations and push these pages to specific places for fast retrieval later when needed. For instance, the methods and systems may local memory and SSD usages of the hosts running the application and proactively push pages of an application's interest into any of these hosts' local memory/SSD. The methods and systems may use the local tiers of memory, SSD and HDD provisioned for this purpose in the DFS platform 1904 for very low latency retrieval by the application at a later time of its need.

The use of extending the cache across hosts of the applications is immense. For example, in MongoDB when the working set temporarily grows beyond its local host's memory, thrashing happens, and it significantly reduces the query handling performance. This is because when a needed file data page is discarded in order to bring in a new page to satisfy a query and subsequently, if the original page has to be brought back, the system has to reread the page afresh from the disk subsystem, thereby incurring huge latency in completing a query. Application-driven storage access helps these kinds of scenarios by keeping a cache of the discarded page elsewhere in the network (in another application host's memory/SSD or in local tiers of storage of the High Performance DFS system 1902) temporarily until MongoDB requires the page again and thereby significantly reducing the latency in completing the query.

Figure 20:
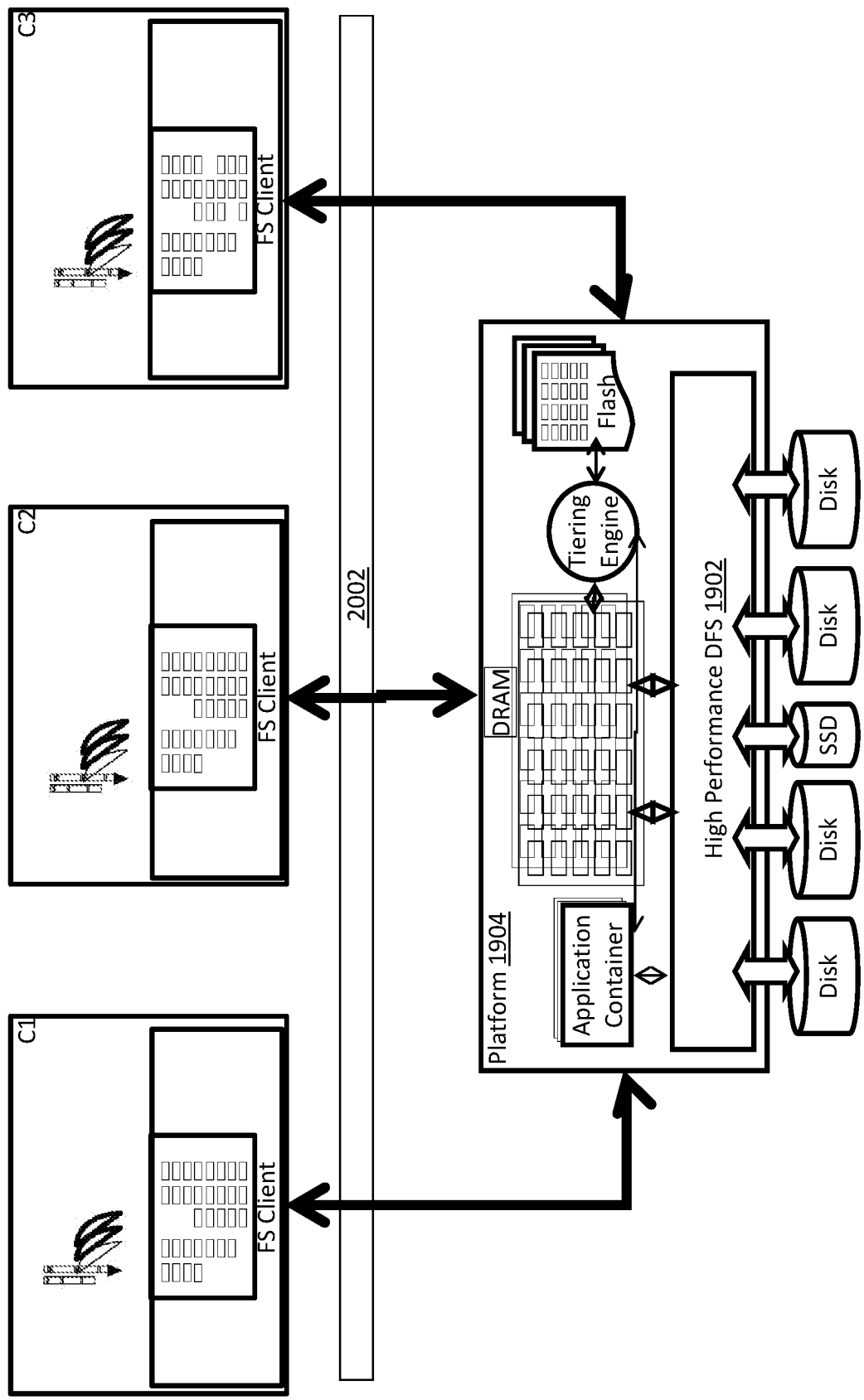
FIG. 20 illustrates a high performance distributed file server (DFS) in accordance with an exemplary and non-limiting embodiment.

Referring to FIG. 20, High Performance DFS 1902 takes advantage of DRAM and SSD resources across the application hosts in a single, unified RAM and SSD-based tier/cache 2002, in order to cache and serve the application data as necessary and as influenced and controlled by the application.

Figure 21:
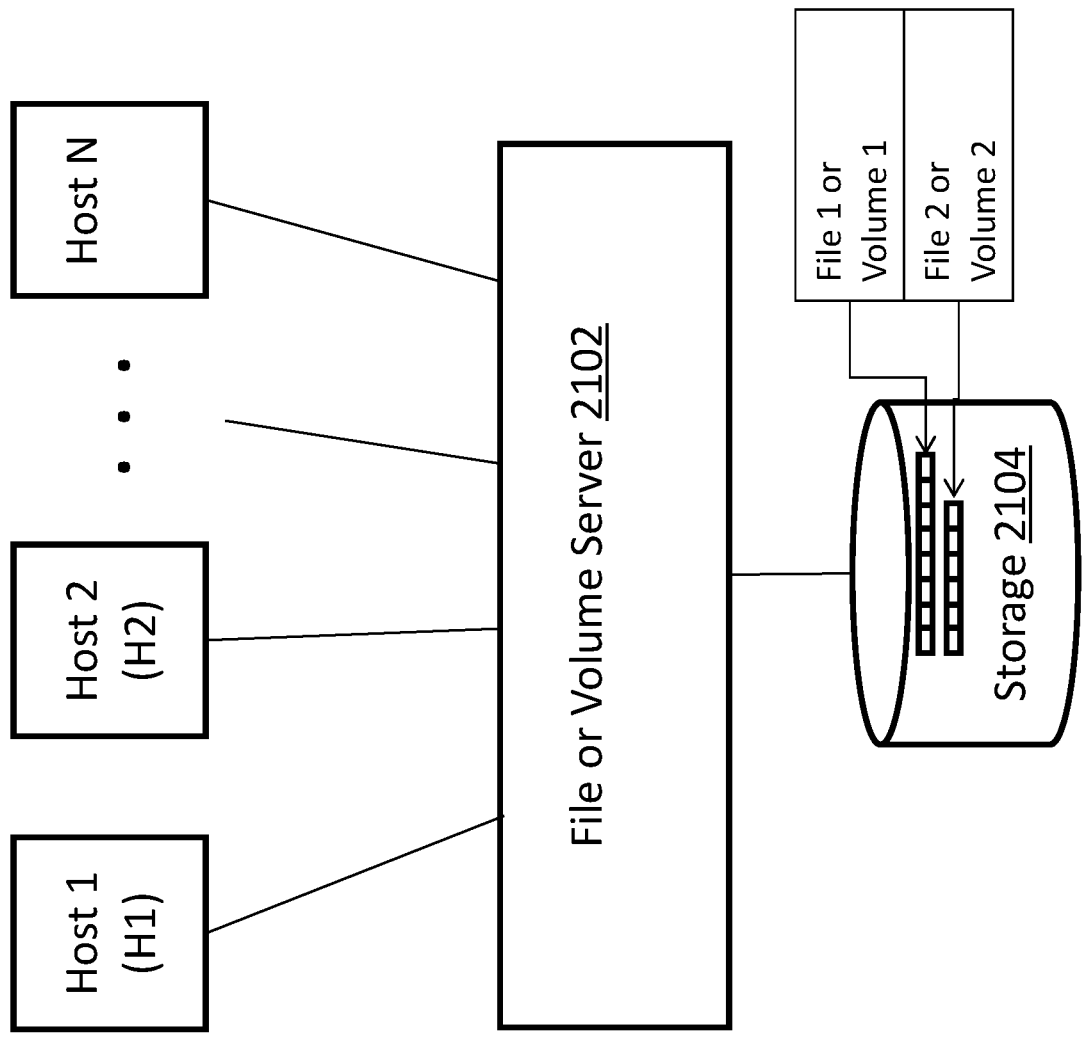
FIG. 21 illustrates a system in accordance with an exemplary and non-limiting embodiment.

A system comprising of a set of hosts (H1 through HN), a file or block server 2102 and a storage subsystem 2104 is disclosed herein as shown in the FIG. 21. A host H1-HN is typically a computer running an application that needs access to data permanently or temporarily stored in storage. The file or volume server 2102 may be a data organizer and a data server, typically running a hardware comprising a central processing unit (CPU), memory and special hardware to connect to external devices such as networking and storage devices. The file or volume server 2102 organizes user data in terms of multiple fixed or variable number of bytes called blocks. It stores these blocks of data in an internal or external storage. A random, but logically related, sequence of blocks is organized into a file or a volume. One or more Hosts H1-HN can access these files or volumes through an application programming interface (API) or any other protocol. A file or volume server can serve one or more files and volumes to one or more hosts. It is to be noted that a host and a file or volume server can be in two different physical entities connected directly or through a network or they could be logically located together in a single physical computer.

Storage 2104 may be a collection of entities capable of retaining a piece of data temporarily or permanently. This is typically comprised of static or dynamic random access memory (RAM), solid state storage (SSD), hard disk drive (HDD) or a combination of all of these. Storage could be an independent physical entity connected to a File or volume server 2102 through a link or a network. It could also be integrated with file or volume server 2102 in a single physical entity. Hence, hosts H1-HN, file or volume server 2102 and storage 2104 could be physically collocated in a single hardware entity.

Figure 22:
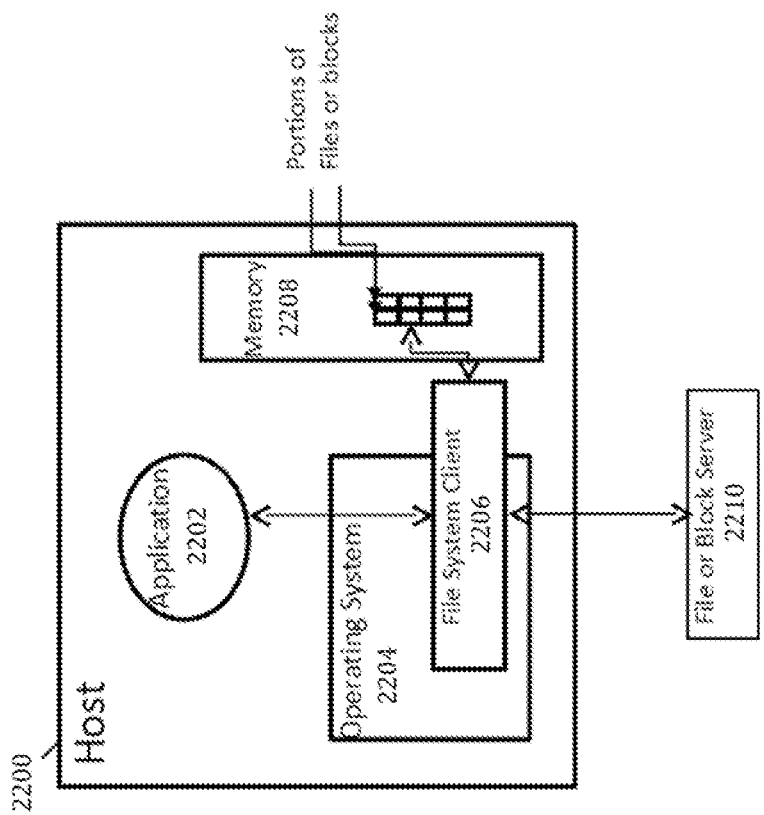
FIG. 22 illustrates a host in accordance with an exemplary and non-limiting embodiment.

A host is typically comprised of multiple logical entities as shown in FIG. 22. An application 2202 typically runs in a host and would access its data elements through an API provided by its local operating system 2204 or any other entity in place of it. The operating system 2204 typically has a standard API interface to interface to a file system through their file system client 2206. A file system client 2206 is a software entity running within the host to interface with a file or volume server 2210 either located remotely or locally. It would provide the data elements needed by application 2202, which are present in a single or multiple files or volumes, by retrieving them from file or volume server 2210 and keeping them in the host's memory 2208 until the application completes its processing of the elements of data. In a typical application scenario, a specific piece of data would be read and/or modified multiple number of times as required. It is also typical that an entire file or volume, consisting of multiple data elements, is potentially much larger than the size of local memory 2208 in certain types of applications. This makes operating system 2204 and file system client 2206 more complicated in its implementation in order to decide what blocks of data to be retained in or evicted from memory 2208 based on the prediction that the application 2202 may or may not access them in future. So far, the existing implementations execute some generic and application-independent methods, such as first-in-first-out (FIFO) or least-recently-used (LRU), to retain or evict the blocks of data in memory in order to bring in new blocks of data from file or volume server 2210. Moreover, when a memory occupied by a block of data is to be reclaimed for storing another block of data, the original data is simply erased without the consideration for its future use. Normally, the disk subsystem in is very slow and incurs high latency when a block of data is read from it and transferred by file or volume server 2210 to file system client 2206 to memory 2208. So, when the original block of data is erased, the application might have to wait longer if it tries to access the original data in near future. The main problem with this kind of implementation is that none of the modules in the path of data access, namely operating system 2204, file system client 2206, memory 2208, block server 2210 and storage have any knowledge of what, when and how often a block of data is going be accessed by application 2202.

Figure 23:
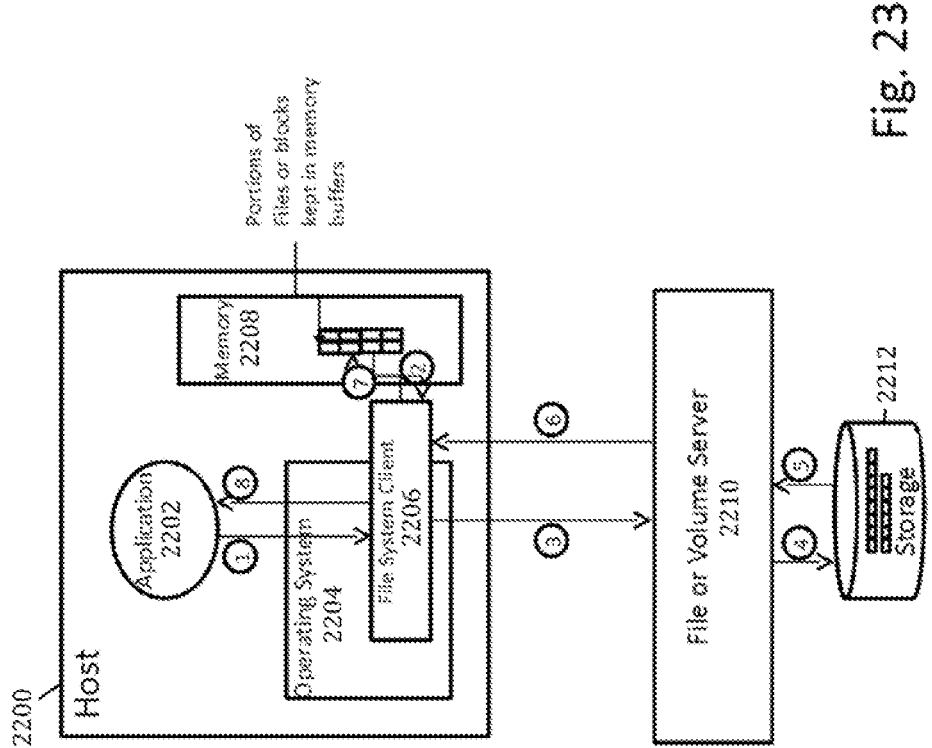
FIG. 23 illustrates an application accessing a block of data in accordance with an exemplary and non-limiting embodiment.

An example scenario depicting an application 2202 accessing a block of data from storage 2212 is shown in FIG. 23. The numbered circles are to show the steps involved in the process of accessing a block of data. These steps are explained below. First, application 2202 uses API of file or Operating System 2204 to access a block of data. operating system 2204 invokes an equivalent API for file system client 2206 to access the same. Second, file system client 2206 tries to find if the data exists in its local memory buffers dedicated for this purpose. If found, steps (3) through (7) below are skipped. Third, sends a command to retrieve the data from block server 2210. Fourth, block server 2210 sends a read command to storage 2212 to read the block of data from the storage. Fifth, storage 2212 returns the block of data to block server 2210 after reading it from the storage. Sixth, block server 2210 returns the block of data to file system client 2206. Seventh, file system client 2206 saves the data in a memory buffer in memory 2208 for any future access. Eighth, file system client 2206 returns the requested data to the application 2202.

Figure 24:
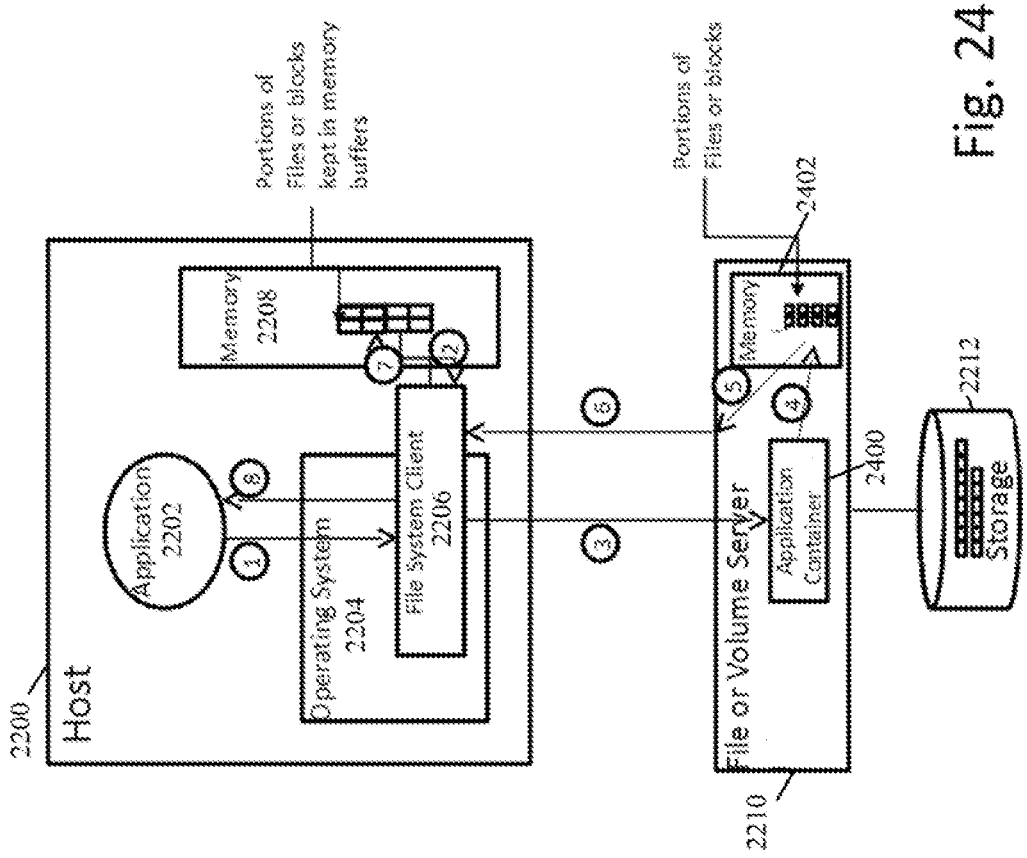
FIG. 24 illustrates an application accessing a block of data in accordance with an exemplary and non-limiting embodiment.

In the methods and systems disclosed herein, in order to address performance requirements related to data access by most newer class of applications in the area of NoSQL and BigData, it is proposed that the components in the data block access comprising operating system 2204, file system client 2206, memory 2208, block server 2210 and storage 2212 be controlled by any application 2202. Namely, we propose the following. First, enable operating system 2204 to provide additional API to allow applications to control file system client 2206. Second, enhance file system client 2206 to support the following: (a) allow application 2202 to create a dedicated pool of memory in memory 2208 for a particular file or volume, in the sense, a file or volume will have a dedicated pool of memory buffers to hold data specific to it which are not shared or removed for the purposes of other files or volumes; (b) allow application 2202 to create a dedicated pool of memory in memory 2208 for a particular session with a file or volume such that two independent sessions with a file or volume will have independent memory buffers to hold their data. As an example, a critically important file session may have large number of memory buffers in memory 2208, so that the session can take advantage of more data being present for quicker and frequent access, whereas a second session with the same file may be assigned with very few buffers and hence it might have to incur more delay and reuse of its buffers to access various parts of the file; (c) allow application 2202 to create an extended pool of buffers beyond memory 2208 across other hosts or block server 2210 for quicker access. This enables blocks of data be kept in memory 2208 of other hosts as well as any memory 2402 present in the file or block server 2210; (d) allow application 2202 to make any block of data to be more persistent in memory 2208 relative to other blocks of data for a file, volume or a session. This allows an application to pick and choose a block of data to be always available for immediate access and not let operating system 2204 or file system client 2206 to evict it based on their own eviction policies; and (e) allow application 2202 to make any block of data to be less persistent in memory 2208 relative to other blocks of data for a file, volume or a session. This allows an application to let know operating system 2204 and file system client 2206 to evict and reuse the buffer of the data block as and when they choose to. This helps in retaining other normal blocks of data for longer period of time. Third, enable block server 2210 to host application specific modules in terms of application container 2400 as shown in the FIG. 24 with the following capabilities: (a) enable application container 2400 to fetch blocks of data of interest to application 2202 ahead of time and store them in local memory 2402 for later quick access and avoid the latency penalty associated with storage 2212 and (b) enable storing of evicted pages from memory 2208 of hosts in local memory 2402 for any later access by application 2202.

Figure 25:
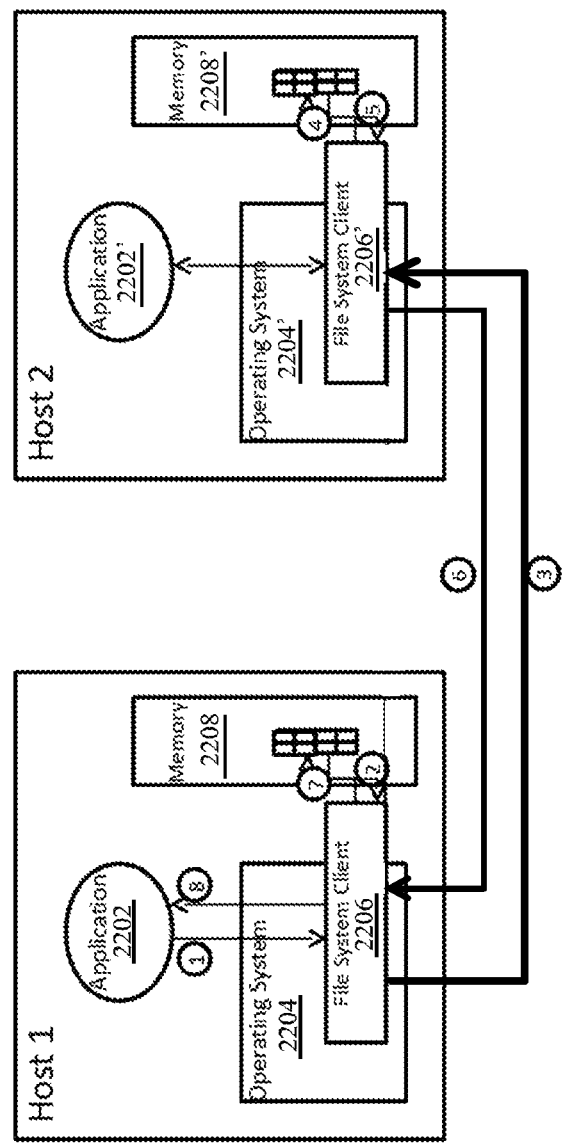
FIG. 25 illustrates a system in accordance with an exemplary and non-limiting embodiment.

The application driven feature of (2)(c) above needs further explanation. There are two scenarios. The first one involves block of data being retrieved from the memory of block server 2210. The other scenario involves retrieving the same from another host. Assuming the exact same block data has been read from storage 2212 by two hosts (H1) and (H2), the methods and systems disclosed herein provide a system such as depicted in FIG. 25. When a block of data is noticed to be present in another host (H2), it is directly retrieved from it by file system client 2206 instead asking block server 2210 to retrieve it from storage 2212, which will be slower and incurs high latency.

In embodiments, if file system client 2206 decides to evict a block of data from (D1) because of storing a more important block of data in its place, file system client 2206 could send the evicted block of data to file system client 2206' to be stored in memory 2208' on its behalf.

It should be noted that the above mentioned techniques can be applied to achieving fast failover in case of failure(s) of Hosts. Furthermore the caching techniques described above; especially pertaining to RAM can use used to achieve failover with a warm cache. FIG. 25 shows an example of a fast failover system with a warm cache. The end result is that during a failure of a node, the end application on a new node will not undergo a time period before the cache (in RAM) is warmed and thereby incur a period of lower application performance.

Provided herein is a system and method with a processor and a file server with an application specific module to control the storage access according to the application's needs.

Also provided herein is a system and method with a processor and a data (constituting blocks of fixed size bytes, similar or different objects with variable number of bytes) storage enabling an application specific module to control the storage access according to the application's needs.

Also provided herein is a system and method which retrieves a stale file or storage data block, previously maintained for the purposes of an application's use, from a host's memory and/or its temporary or permanent storage element and stores it in another host's memory or and/or its temporary or permanent storage element, for the purposes of use by the application at a later time.

Also provided herein is a system and method which retrieves any file or storage data block, previously maintained for the purposes of an application's use, from a host's memory and/or its temporary or permanent storage element and stores it in another host's memory or and/or its temporary or permanent storage element, for the purposes of use by the application at a later time.

Also provided herein is a system and method which utilizes memory and/or its temporary or permanent storage element of a host to store any file or storage data block which would be subsequently accessed by an application running in another host for the purposes of reducing latency of data access.

File or storage data blocks, previously maintained for the purposes of an application's use, from a host's memory and/or its temporary or permanent storage element, may be stored in another host's memory or and/or its temporary or permanent storage element, for the purposes of use by the application at a later time.

The mechanism of transferring a file or storage data block, previously maintained for the purposes of an application's use, from a host's memory and/or its temporary or permanent storage element to another host over a network.

In accordance with various exemplary and non-limiting embodiments, there is disclosed a device comprising a converged input/output controller that includes a physical target storage media controller, a physical network interface controller and a gateway between the storage media controller and the network interface controller, wherein gateway provides a direct connection for storage traffic and network traffic between the storage media controller and the network interface controller.

In accordance with some embodiments, the device may further comprise a virtual storage interface that presents storage media controlled by the storage media controller as locally attached storage, regardless of the location of the storage media. In accordance with yet other embodiments, the device may further comprise a virtual storage interface that presents storage media controlled by the storage media controller as locally attached storage, regardless of the type of the storage media. In accordance with yet other embodiments, the device may further comprise a virtual storage interface that facilitates dynamic provisioning of the storage media, wherein the physical storage may be either local or remote.

In accordance with yet other embodiments, the device may further comprise a virtual network interface that facilitates dynamic provisioning of the storage media, wherein the physical storage may be either local or remote. In accordance with yet other embodiments, the device may be adapted to be installed as a controller card on a host computing system, in particular, wherein the gateway operates without intervention by the operating system of the host computing system.

In accordance with yet other embodiments, the device may include at least one field programmable gate array providing at least one of the storage functions and the network functions of the device. In accordance with yet other embodiments, the device may be configured as a network-deployed switch. In accordance with yet other embodiments, the device may further comprise a functional component of the device for translating storage media instructions between a first protocol and at least one other protocol.

Figure 26:
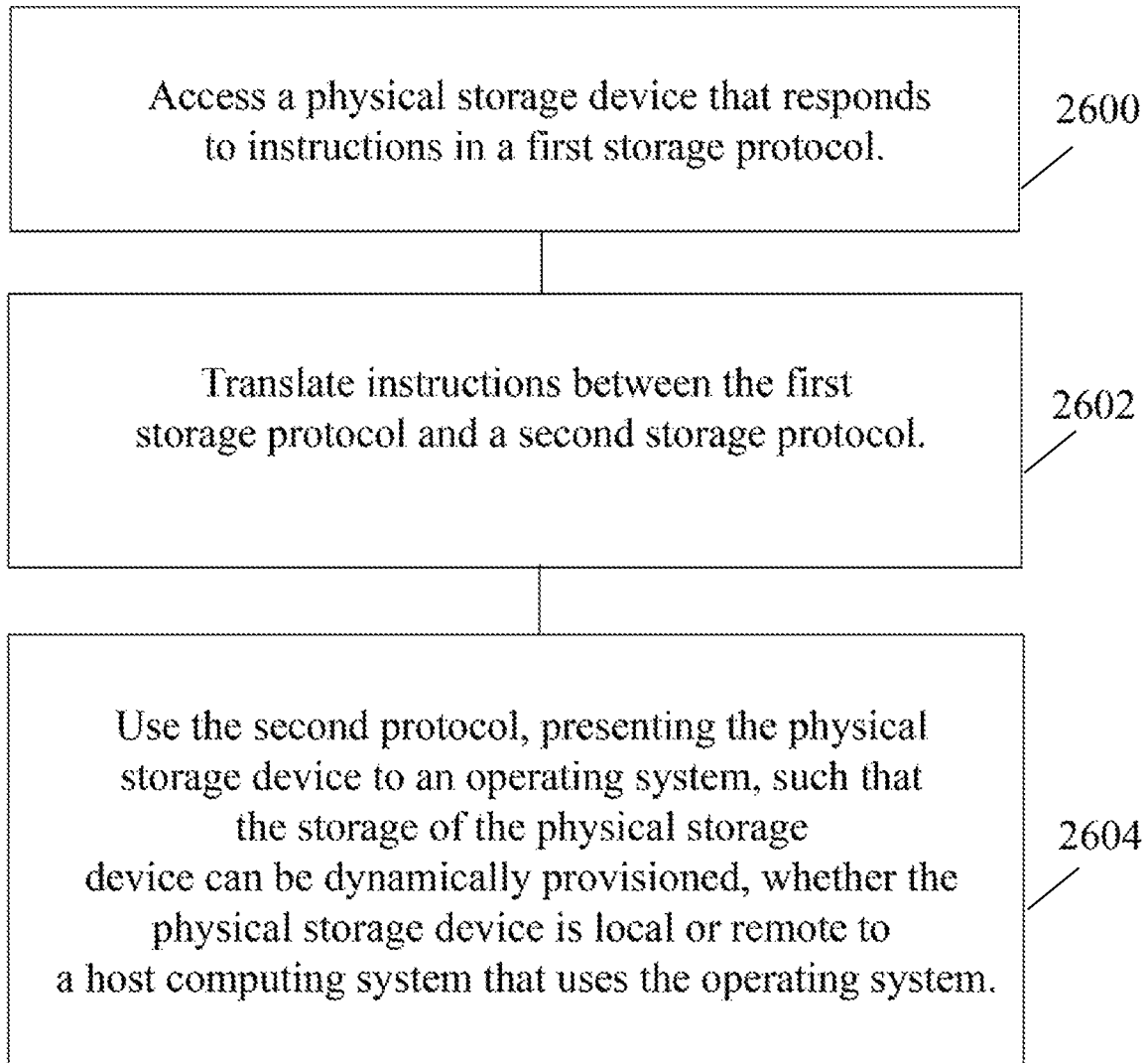
FIG. 26 illustrates a method according to an exemplary and non-limiting embodiment.

With reference to FIG. 26, there is illustrated an exemplary and non-limiting method of virtualization of a storage device. First, at step 2600 there is accessed a physical storage device that responds to instructions in a first storage protocol. Next, at step 2602, there are translated instructions between the first storage protocol and a second storage protocol. Lastly, at step 2604, using the second protocol, the physical storage device is presented to an operating system, such that the storage of the physical storage device can be dynamically provisioned, whether the physical storage device is local or remote to a host computing system that uses the operating system.

In accordance with various embodiments, the first protocol is at least one of a SATA protocol, an NVMe protocol, a SAS protocol, an iSCSI protocol, a fiber channel protocol and a fiber channel over Ethernet protocol. In other embodiments, the second protocol is an NVMe protocol.

In some embodiments, the method may further comprise providing an interface between an operating system and a device that performs the translation of instructions between the first and second storage protocols and/or providing an NVMe over Ethernet connection between the device that performs the translation of instructions and a remote, network-deployed storage device.

With reference to FIG. 27, there is illustrated an exemplary and non-limiting method of facilitating migration of at least one of an application and a container. First, at step 2700, there is provided a converged storage and networking controller, wherein a gateway provides a connection for network and storage traffic between a storage component and a networking component of the device without intervention of the operating system of a host computer. Next, at step 2702, the at least one application or container is mapped to a target physical storage device that is controlled by the converged storage and networking controller, such that the application or container can access the target physical storage, without intervention of the operating system of the host system to which the target physical storage is attached, when the application or container is moved to another computing system.

In accordance with various embodiments, the migration is of a Linux container or a scaleout application.

In accordance with yet other embodiments, the target physical storage is a network-deployed storage device that uses at least one of an iSCSI protocol, a fiber channel protocol and a fiber channel over Ethernet protocol. In yet other embodiments, the target physical storage is a disk attached storage device that uses at least one of a SAS protocol, a SATA protocol and an NVMe protocol.

With reference to FIG. 28, there is illustrated an exemplary and non-limiting method of providing quality of service (QoS) for a network. First, at step 2800, there is provided a converged storage and networking controller, wherein a gateway provides a connection for network and storage traffic between a storage component and a networking component of the device without intervention of the operating system of a host computer. Next, at step 2802, without intervention of the operating system of a host computer, there is managed at least one quality of service (QoS) parameter related to a network in the data path of which the storage and networking controller is deployed, such managing being based on at least one of the storage traffic and the network traffic that is handled by the converged storage and networking controller.

Figure 29:
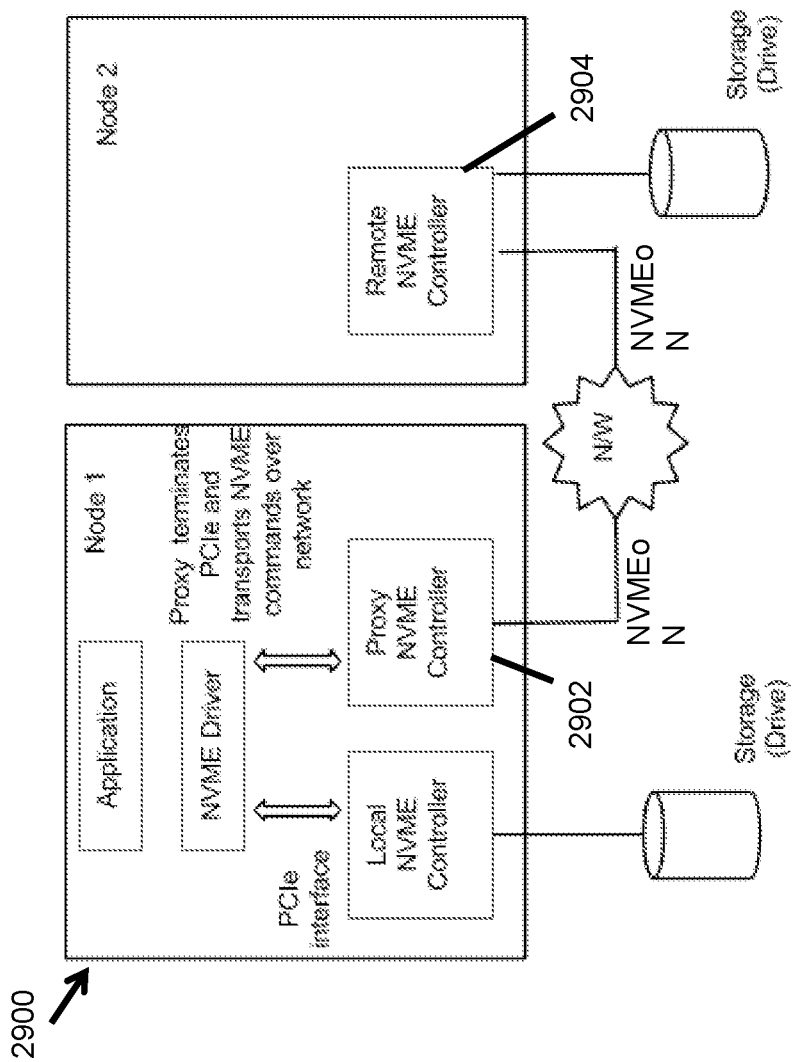
FIG. 29 illustrates an exemplary two-node architecture for the methods and systems described herein.

Referring to the architecture 2900 depicted in FIG. 29, the general philosophy followed in this proposal is not to send every PCIe access over the network as that would result in an inefficient implementation of I/Os with a heavy overhead (see Performance section). The idea is to terminate PCIe transactions and encapsulate NVME I/O commands (Read, Write, etc) and the Admin command sets (the relevant ones) with their data into network packets. To this end, there are two key components that can be used to enable NVMEoN, a proxy NVME controller 2902 and a remote (virtual) NVME controller 2904. The proxy NVME controller 2902 handles all PCIe transactions from the NVME driver. Functions such as doorbell management, queue management, PRP list processing and DMAs are performed by this controller locally on the node on which the NVME driver resides. The proxy NVME controller 2902 also encapsulates all NVME commands and data into network packets and sends them to the (virtual) remote controller 2904. The remote (virtual) NVME controller 2904 is a virtual controller in that there is no PCIe interface on the network facing side of this NVME controller 2904. NVME commands addressed to this controller are received over the network. At the target node, there may be a remote, virtual NVME controller 2904 instantiated for each <Initiator, Proxy NVME Controller> pair that can send NVME commands to that node. With this level of abstraction, the NVME driver (such as, in this example, of node 1) is agnostic as to whether a certain controller is located locally on node 1 or remotely or node 2 (or any other location connected to the network).

Figure 30:
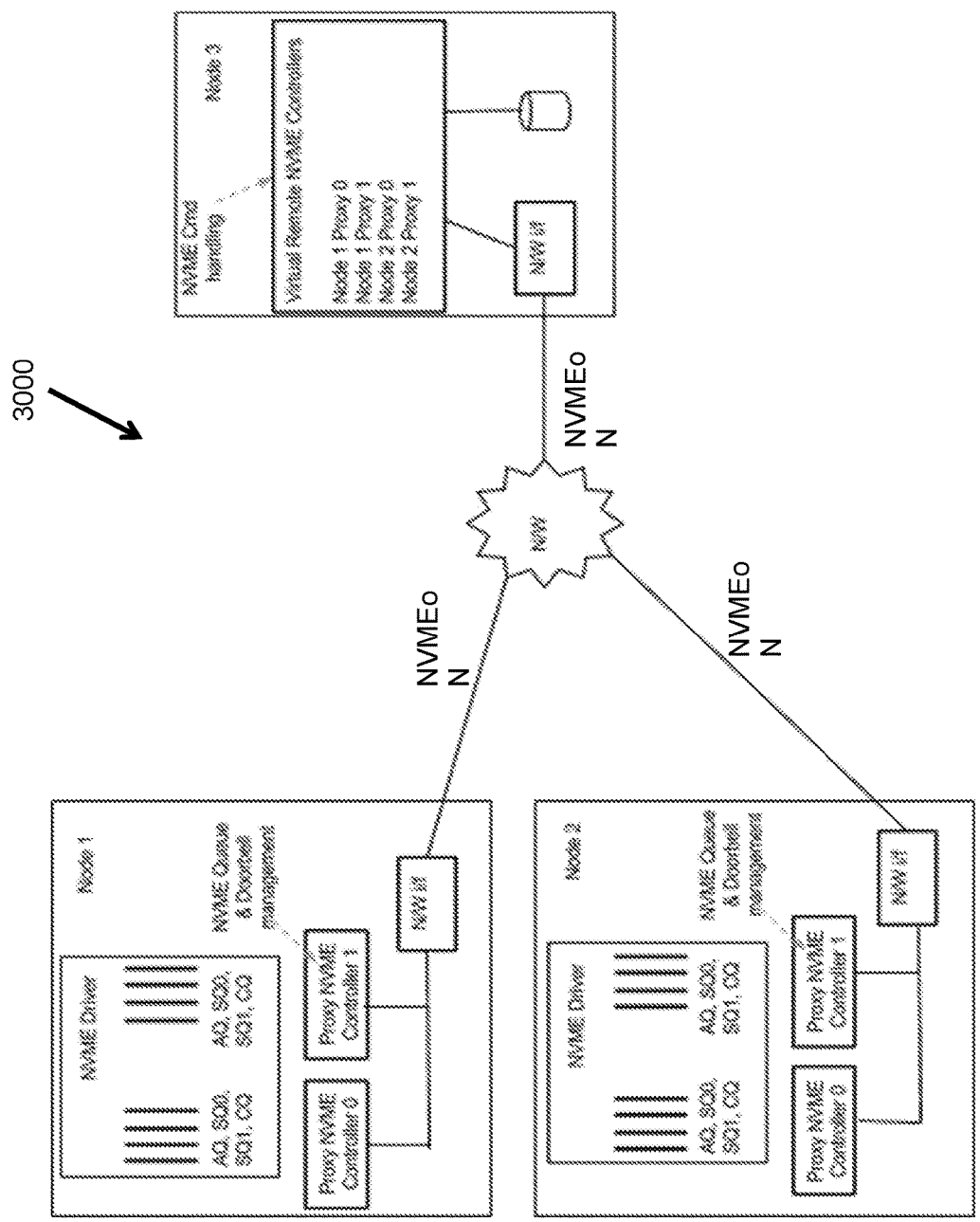
FIG. 30 illustrates an exemplary three-node architecture for the methods and systems described herein.

Referring to the architecture 3000 of FIG. 30, in embodiments certain rules or guidelines may be provided for implementing proxy and remote NVME controllers. For example, on a target, NVME namespaces that are to be exposed over a network may be required to be exposed through remote NVME controllers 2904. In embodiments, a single NVME namespace can be exposed via more than one remote NVME Controller. On an initiator, when an NVME namespace that needs to be accessed is located over the network, it can be exposed to the host operating system through a Proxy NVME controller 2902. There can be multiple Proxy NVME controllers 2902 instantiated on a given node for purposes of accessing remote NVME namespaces. The discovery association of namespaces to Proxy/Remote NVME controllers 2902 is an implementation choice. On a Target, each remote NVME controller 2904 may be associated with a single <Initiator, Proxy NVME Controller> pair. A given node can have any number of local NVME controllers and proxy NVME controllers 2902. Each of them should preferably have a controller ID that is locally unique to that node. Remote controllers 2904, being virtual, don't need to have any controller IDs assigned to them.

In embodiments, consideration may be given to DMA versus data transmission on a network. Any NVME I/O typically involves DMA to/from the host memory, such as using PRP/SGL lists. In embodiments, one way of architecting the protocol could be to pass the PRP/SGL lists over the network. The drawbacks associated with this approach are the need to reconcile various host OS page sizes and destination device page sizes, resulting in inefficiency and needless complexity. Also, passing host memory address pointers over a network is potentially insecure and may require protection, such as with digital signatures, against incorrect accesses.

Figure 31:
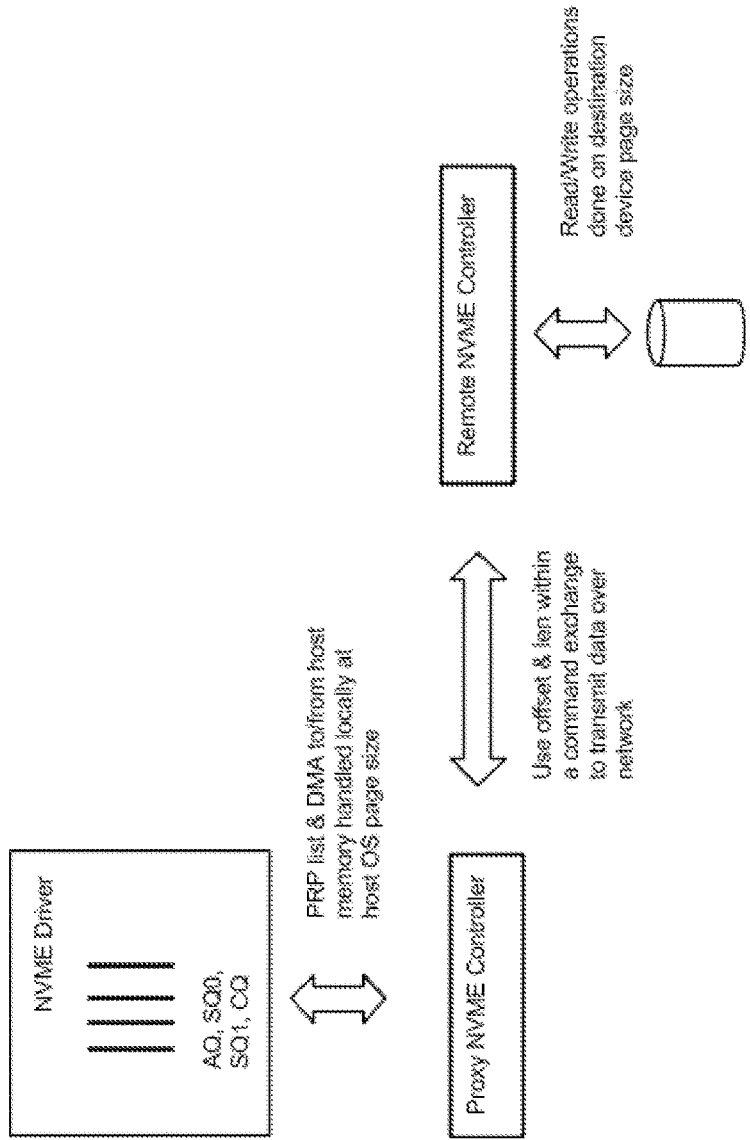
FIG. 31 illustrates an exemplary architecture with a proxy NVME controller and a remote NVME controller.

In embodiments, these problems may be mitigated or avoided by using an architecture 3100 as depicted in FIG. 31. A proxy NVME controller 2902 can be responsible for DMA to/from the host memory (to/from its local staging areas) at the host OS page size. A remote NVME controller 2904 can be responsible for data transfer to/from the disks based on the destination device page size. Within the context of a given I/O, offset and length are used to identify the unique point where each NVME data packet would fit. A SCSI/FC-4 mechanism like Xfer Ready may be used by the recipient of the data to control the transfer of data. By decoupling PRP list manipulation and DMA from actual read/write operations to disks, the methods and systems disclosed herein can parallelize the operations as much as possible and achieve lower latencies while keeping the architecture simple.

Figure 32:
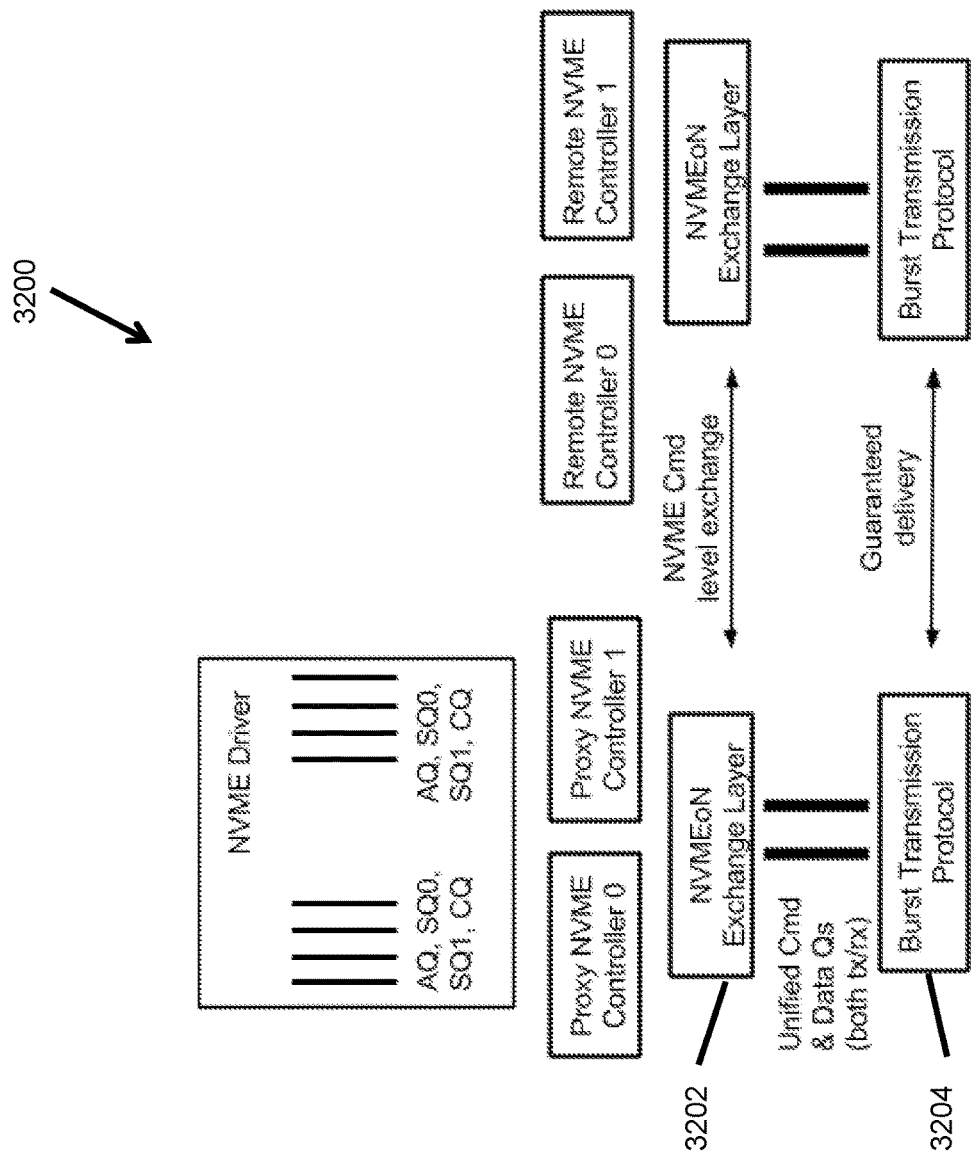
FIG. 32 illustrates a block diagram of exchange layer NVME operation.

Referring to FIG. 32, in embodiments such as depicted in the architecture 3200, in order to aggregate flows to best utilize network bandwidth and minimize latency, NVMEoN may be split into two layers. An NVMEoN exchange layer 3202 translates every NVME command sequence into an exchange and maintains state information to complete this exchange successfully. A burst transmission protocol (BTP) layer 3204 aggregates NVMEoN exchanges across multiple Proxy NVME controllers and its queues and provides guaranteed delivery for each of the NVME command and data packets associated with that exchange. In the description below, the NVMEoN protocol is described from ground up, including first the BTP layer and then the NVMEoN exchange layer.

The Burst Transmission Protocol (BTP) layer 3204 provides guaranteed delivery semantics for the NVMEoN protocol to run between a pair of nodes. The BTP layer 3204 may: provide guaranteed delivery of NVME command and data packets; reserve buffers at the receiver for the NVME command and data packets; avoid delivery of duplicate packets to upper layers; minimize control packet overhead by aggregating NVME flows across proxy controllers and queues (by transmitting multiple packets in one burst); and leave the order of delivery of packets to upper layer (such as in-order choice) as implementation choice for the designer.

In the context of the description of BTP, a BTP sender should be understood from the point of view of a node that sends packets to another node (the BTP receiver). This is distinct from NVME command initiators and targets. For instance, the NVME target, when processing a write command, becomes a BTP sender when it sends transfer ready (referred to herein in some cases as "Xfer Rdy") packets and data packets. A given node can be both a BTP sender and a receiver at any point of time.

In embodiments, four types of packets are supported by the BTP. First, BTP Command packets are small (e.g., default max 256 bytes) packets that are used for sending NVME command, status and NVMEoN control packets (like Xfer Rdy and Exchange Cleanup). Second, BTP Batched Command packets allow for multiple NVME commands to be packed into one packet (default max, e.g., 1500 bytes). Third, BTP Data packets may be large and may depend on the typical MTU configuration in the network (e.g., default max of 1500 bytes). Such packets may be used for sending actual NVME data packets. Fourth, BTP Control packets may exchange BTP control information. BTP Command and Data Packets may be stored in buffers in some implementations.

In embodiments, a burst window may be understood to comprise a window where a BTP sender can request for credits and send a number of packets. Expected and received burst windows may be used by a BTP receiver to track packets received, such as in a sliding window of sorts. A Request Credit may signify the start of a burst. An ACK may signify the end of a burst. See below for a further explanation of these.

In embodiments, a burst ID may comprise a number, such as a 24 (or not 32) bit number, identifying each burst window uniquely. A BTP sender may start with a random number and increment this for every new burst window.

In embodiments, a sequence ID may comprise a number, such as a 30-bit number, uniquely identifying every BTP packet (e.g., command, data, control) across burst windows. The only requirement is that the sequence id is preferably unique across burst windows and should only be reused by the sender after an ACK from the receiver indicating that it has been successfully delivered. It need not be monotonically increasing, but if it is implemented that way, the starting sequence id is preferably randomized.

Between a pair of nodes, there can be multiple BTP channels. All BTP state information may be maintained per BTP channel. The BTP protocol (described below) may runs within the scope of a BTP channel. The BTP channel may be identified, such as by using an 8 bit Channel id in the header (along with the 24 bit burst id). By default, at least 1 channel (with channel id 1) should preferably be supported between a pair of nodes. Setting up the BTP channels between a pair of nodes may be implemented as a design choice. In embodiments, multiple BTP channels may be used in order to achieve high throughput and link utilization or to provide multiple classes of service.

In embodiments, multiple burst windows may overlap, taking care of pipelining requirements. A burst of transfers may secure credits, use the credits, and close. In the case of errors, granularity at the per packet and the per window basis allows for efficient recovery. Overlapping windows, among other benefits, take advantage of available bandwidth at a receiver during the time that acknowledgements are being exchanged with a source. Thus, a burst protocol may use multiple, parallel burst windows to maximize use of the network bandwidth and the bandwidth/capability of the receiver.

In embodiments, priorities can be handled, such as having a higher priority packet initiate closing of a window so that the packet can be sent with priority. Handling priorities may also allow high priority commands to be scheduled to a BTP window than low priority commands. A burst window may be configured based on the type of data, the type of network, network conditions and the like. Thus, a configurable burst window may be provided for error recovery and reliable transmission in an NVMEoN approach.

Figure 33:
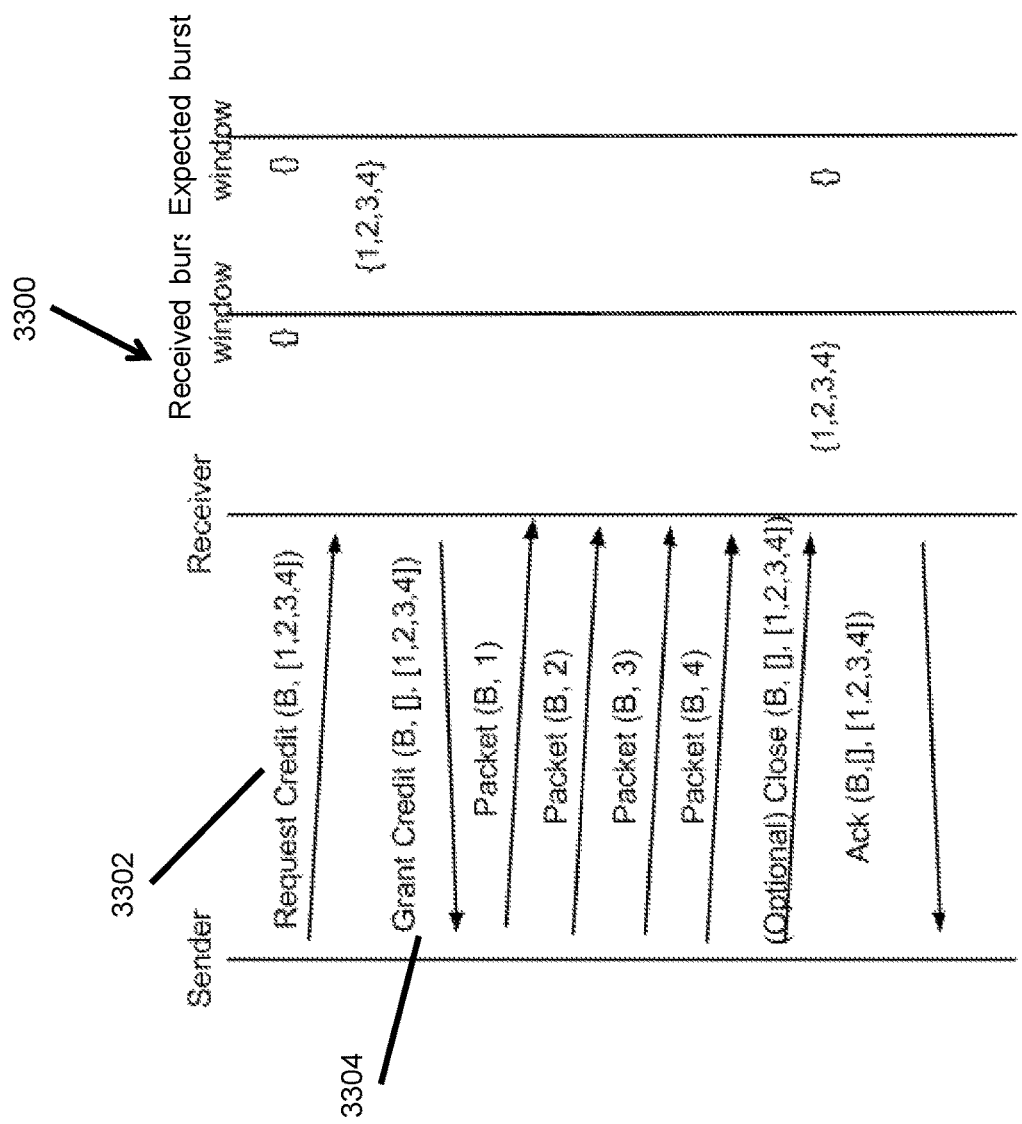
FIG. 33 illustrates a burst transmission protocol flow diagram.

Referring to FIG. 33, the flow diagram 3300 and the description below provide the basics of the BTP protocol. For purposes of this example, these flow diagrams illustrate the protocol in an embodiment that uses four credits. This can be extended to any number of credits without any loss of generality, as would be understood by one of ordinary skill in the art. When a BTP sender has command and/or data packets to send, it can request credits via a Request Credit message 3302. The two types of packets for credit can be requested are "BTP Command" and "BTP Data" packets as described earlier. In this example, credit for sending 32 packets (the sum total across command and data packet categories) can be requested in one burst. In the request credit message 3302, the sender may explicitly set the sequence id and type (e.g., command vs. data) of each packet. The BTP receiver can grant up to the number of credits requested by the sender (or can provide a lower value, which can even be zero) through a Grant Credit message 3304. The receiver may explicitly specify the sequence ids for which it grants credits. The receiver may pick the sequence ids in the same order as specified in the Request Credit message 3302 to buffer availability. Once credits are granted, the receiver may reserve the buffer allocated for each packet until it is received (or) until an error timer (ERROR_TOV) expires, as described more particularly below. Regardless of the number of credits granted, the receiver may send the Grant Credit message 3304 immediately to prevent timeout of the Request Credit 3302 at the sender. Each BTP sender preferably uses only one burst window at any point in time with a BTP receiver. If a Grant Credit 3304 is not received within the specified ERROR_TOV time after sending the Request Credit 3302, all packets queued for transmission in the current burst window may be queued for re-transmission in the next burst window. If the Grant Credit 3304 has been received for the current burst window, the sender can wait for ACK from the receiver or for the ERROR_TOV timer to expire after the Grant Credit 3304 is received before starting a new burst window. Each BTP receiver may maintain two windows per BTP sender: an expected window comprising a list of sequence ids of packets expected in this burst window, which may be set when the Grant Credit 3304 is sent and a received window comprising a list of sequence ids of packets received in the previous burst windows, which may be set when an ACK is sent. In embodiments, both of these burst windows may be initialized to 0.

When a BTP receiver gets a Request Credit 3302 with a new burst id, it may compare the sequence ids for which credits are requested with those received in the received window. In the Grant Credit message 3304, the receiver may specify two lists of sequence ids: a list of sequence ids "already received" for those packets in the received window and a list of sequence ids for which "credits are granted" (for packets not in the received window).

When the BTP sender receives a Grant Credit message 3304 it may first remove the packets whose sequence ids have been marked as "already received" from re-transmission queues. Next, it may send packets for which "credits are granted" in this burst window. Then, in the case that the sender has fewer packets to send than for which credits were granted (e.g. if the upper layers performed some cleanup between the request and grant operations of the window), the sender can send a "Close," specifying the list of sequence ids that were sent in the burst window. The Close message is optional in case where the sender can send all packets for which credits are granted.

An ACK message may be sent by the BTP receiver when all packets expected within a burst window are received by the BTP receiver or if the ERROR_TOV timer expires after the Grant Credit 3304 was sent by the receiver. The ACK may specify which packets have been received and which ones have not been received in two separate lists. A sender may use the ACK to determine which packets were delivered to the receiver. It may queue the packets that were not delivered to the receiver for retransmission. A receiver may drop any command/data packet with a burst id that is not in the current burst window.

In embodiments the size of the burst window may be provided with a maximum value of 32 packets, which is chosen to provide a balance between two objectives: minimizing control packets overhead (3 packets for every burst of 32) while, in the event of a complete burst failure (which requires retransmission of the entire set), providing an acceptable (not too high) retransmission overhead.

Certain choices of algorithms may be implementation specific, with embodiments provided below. For example, methods of distributing credit, which relates to the ability to assure quality of service (QoS), may be addressed by a credit distribution algorithm, which may be used by a BTP receiver to distribute its buffers among various senders for fairness. In embodiments, one may implement a default minimum of one command and one data buffer per BTP sender. Also, one may implement some form for maximum value for each of the command and data buffers that each BTP sender can use.

A backoff algorithm may be used by a BTP sender to factor in congestion at the BTP receiver using Grant Credit responses 3304.

Figure 34:
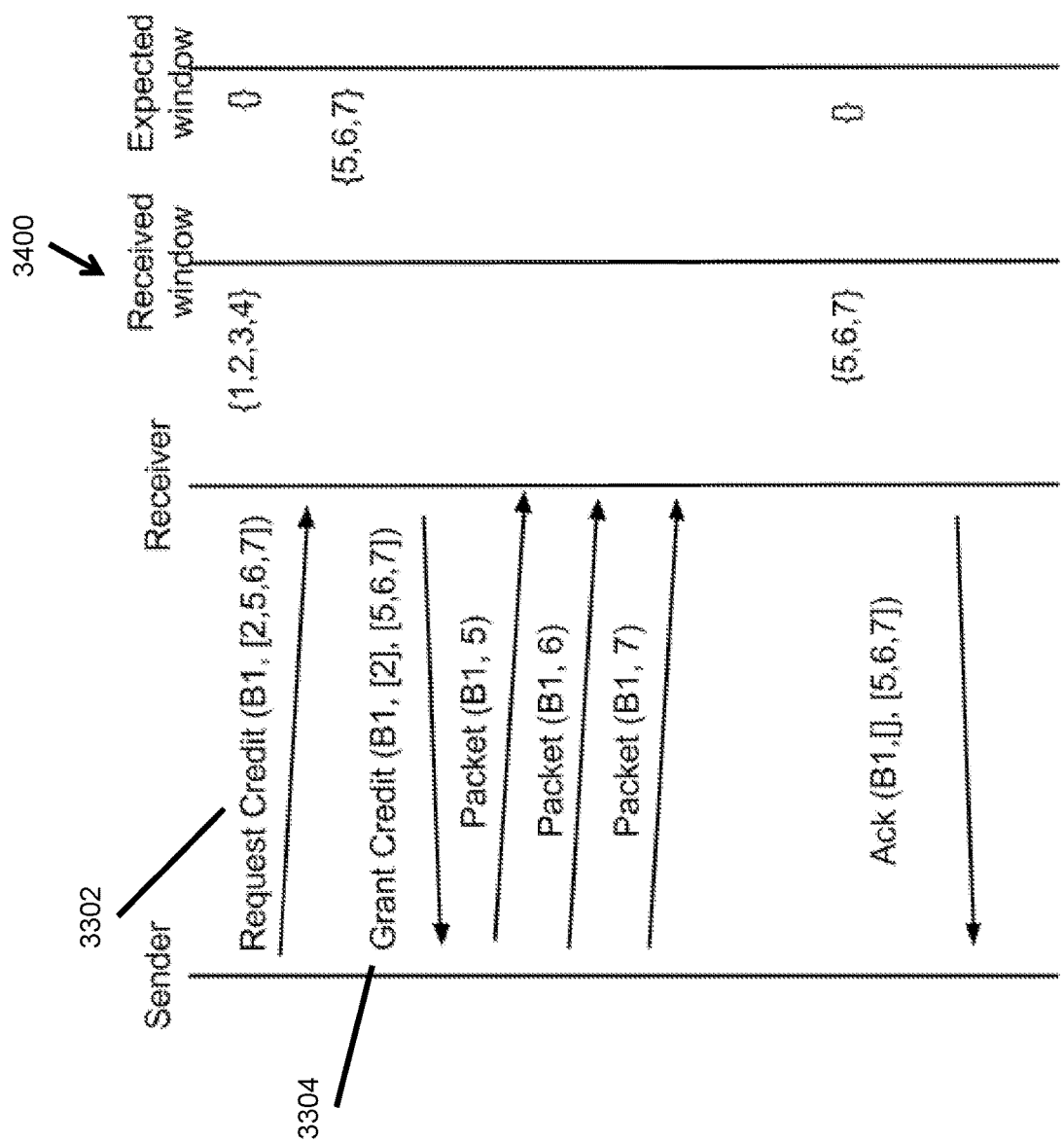
FIG. 34 illustrates a flow diagram for preventing duplicate transmission of delivered packets.

An algorithm may be used to prevent duplicate retransmission of delivered packets. Referring to FIG. 34, the flow diagram 3400 illustrates a case where a sender thinks that a certain packet (e.g., sequence id 2 in this case) has not reached the receiver, but that packet has actually been delivered to the receiver. So, the receiver places sequence id 2 in a separate list in the Grant Credit message indicating that it has already been received, thus preventing retransmission of an already delivered packet. The BTP sender implicitly derives the information about the delivery of sequence id 2 from the Grant Credit message 3304 and sends only items {5,6,7} in the current burst window. The BTP receiver sets the received window to {5,6,7} when the ACK is sent for this burst window, thereby advancing the sliding window.

Packet loss detection and recovery may be addressed by introducing BTP control packets to request/grant credits and provide ACKs for packets sent in a burst window. There are several possible different packet drop scenarios that need to be accounted for and recovered from. Such scenarios are presented as flows in FIGS. 35 through 40.

Figure 35:
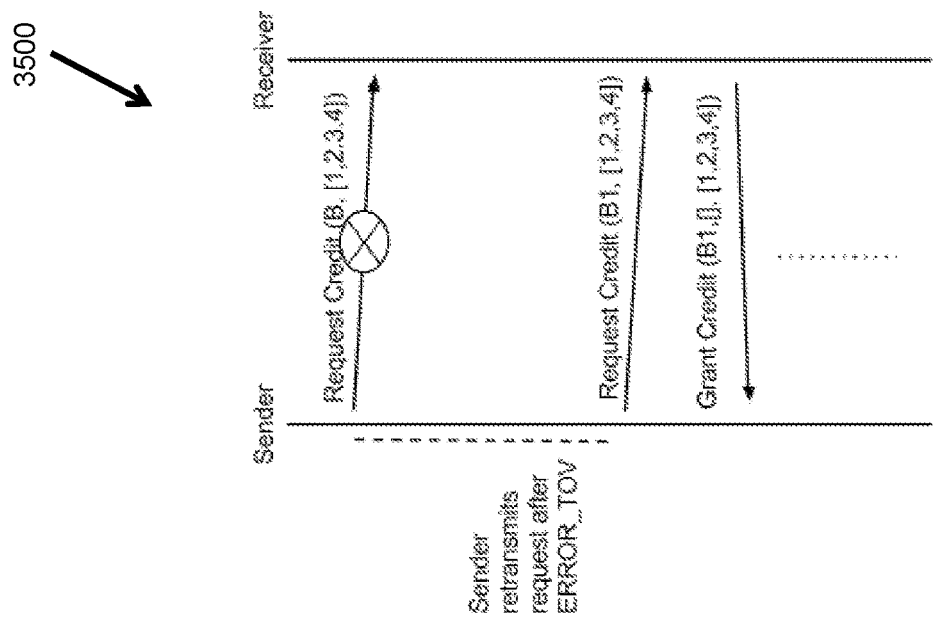
FIG. 35 illustrates a request credit loss scenario flow diagram.
Figure 36:
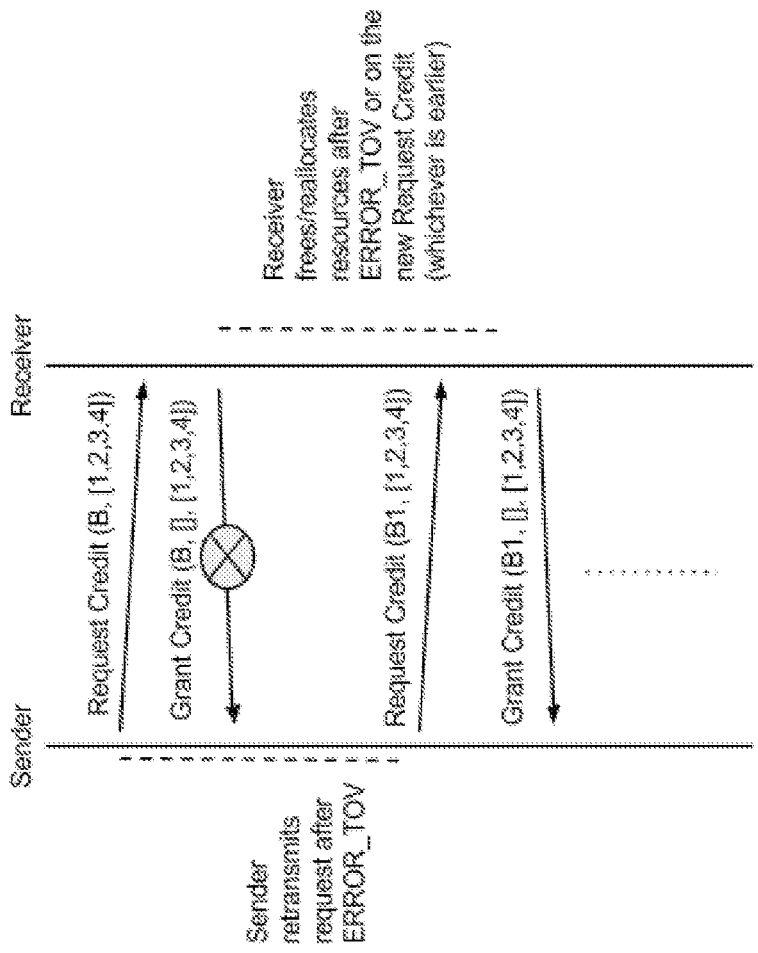
FIG. 36 illustrates a grant credit loss scenario flow diagram.

FIG. 35 shows a request credit loss scenario 3500 in which the receiver never receives the request for a credit. The BTP sender receives no grant credit message 3304, so it retransmits after the ERROR_TOV timeout.

FIG. 365 shows a grant credit loss scenario 3600 in which the grant credit message 3304 from the BTP receiver is lost on the way to the sender. The sender, not having received the grant credit message 3304, retransmits after the ERROR_TOV timeout period expires, retransmits the request credit message 3302, after which the receiver either frees, or reallocates resources after the expiration of the ERROR_TOV or receipt of the retransmission of the request credit message 3302 (whichever is earlier).

Figure 37:
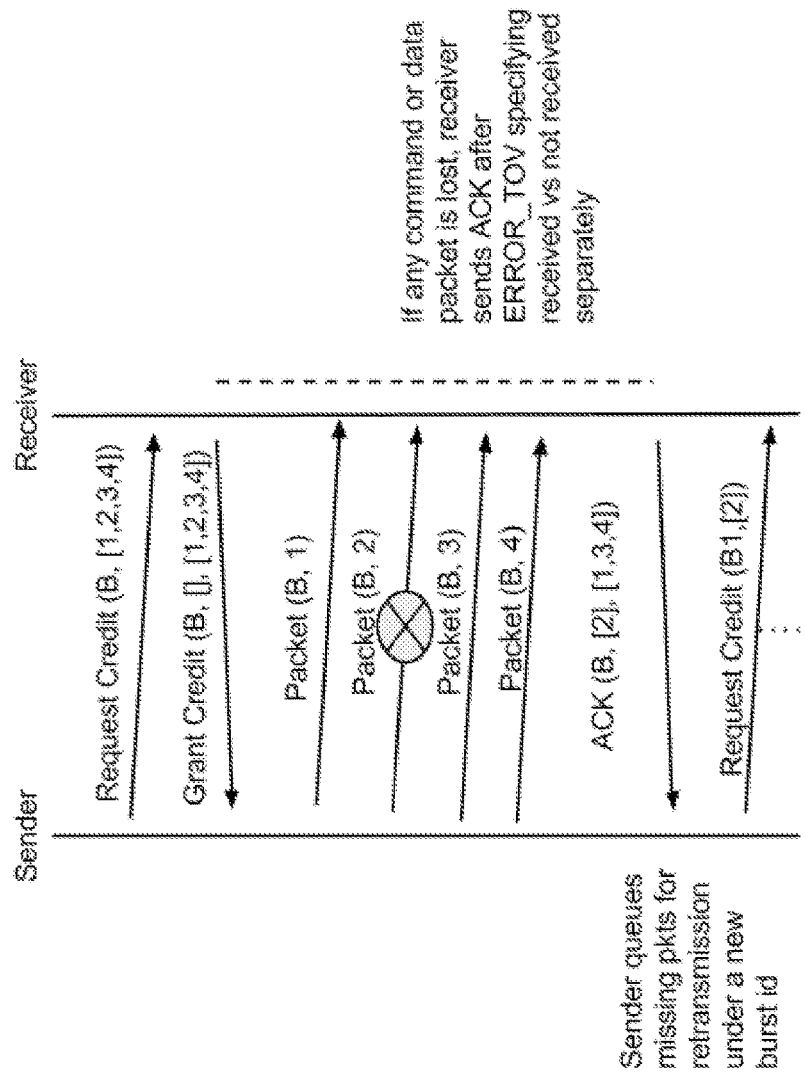
FIG. 37 illustrates a command/data packet loss scenario flow diagram.

FIG. 37 shows an NVME command/data packet loss scenario 3700 in which a command or data packet is lost. In this case, the receiver sends an ACK after ERROR_TOV timeout expiration, separately specifying received versus not received packets. Based on the content of the ACK, the sender queues missing packets for retransmission under a new burst ID.

Figure 38:
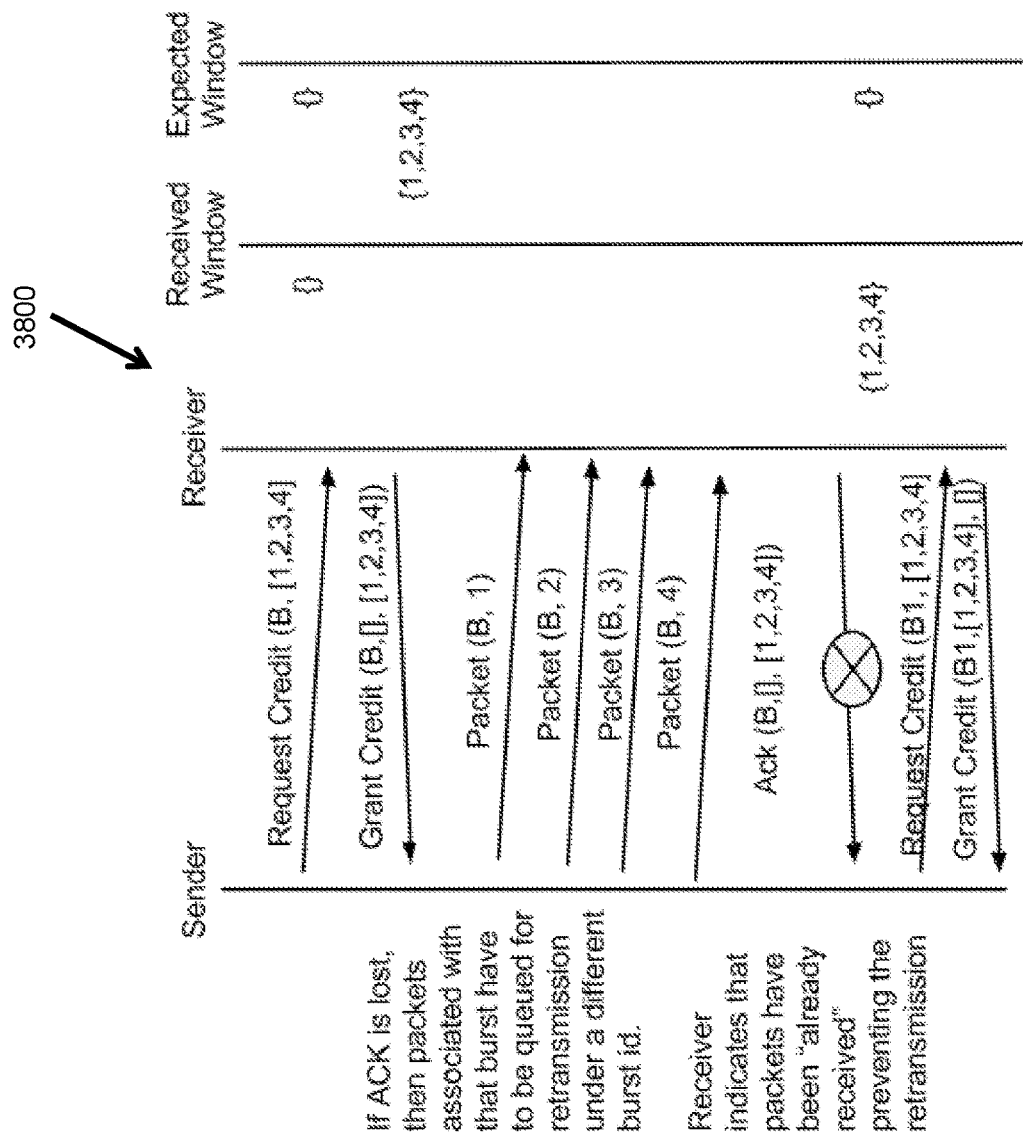
FIG. 38 illustrates an ACK loss scenario flow diagram.

FIG. 38 shows an ACK loss scenario 3800 in which the ACK message is lost. If the ACK is lost, then packets associated with the burst have to be queued for retransmission under a different burst ID. In the grant credit message 3304, the receiver may indicate that packets have already been received, preventing the retransmission.

Figure 39:
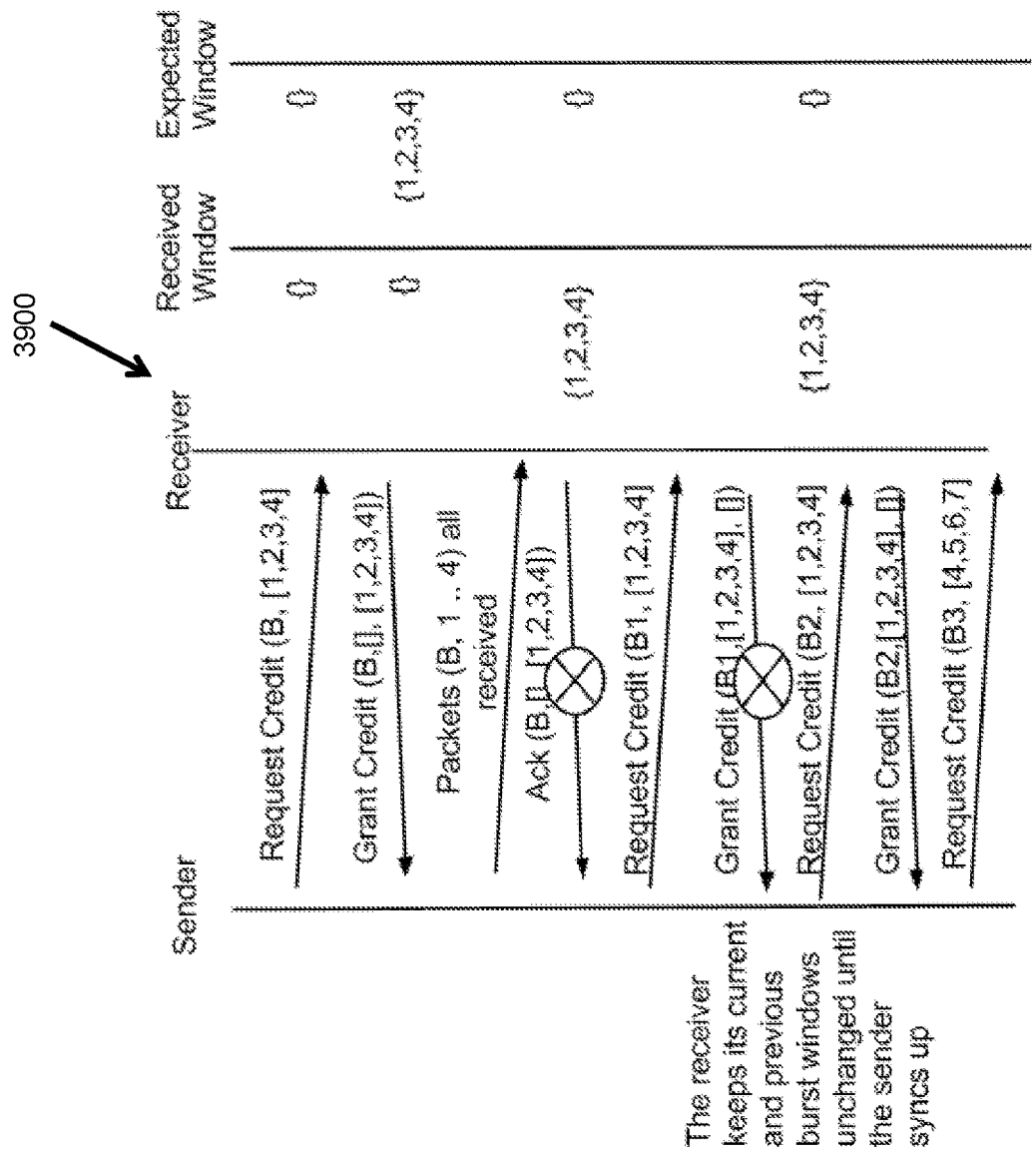
FIG. 39 illustrates a multiple loss scenario flow diagram.

FIG. 39 shows a scenario 3900 involving multiple failures, in this case loss of the ACK and a grant credit message loss. The receiver keeps its previous and current burst windows unchanged until the sender synchronizes, such as based on eventually receiving information from the receiver that confirms that the packets have in fact been received.

Figure 40:
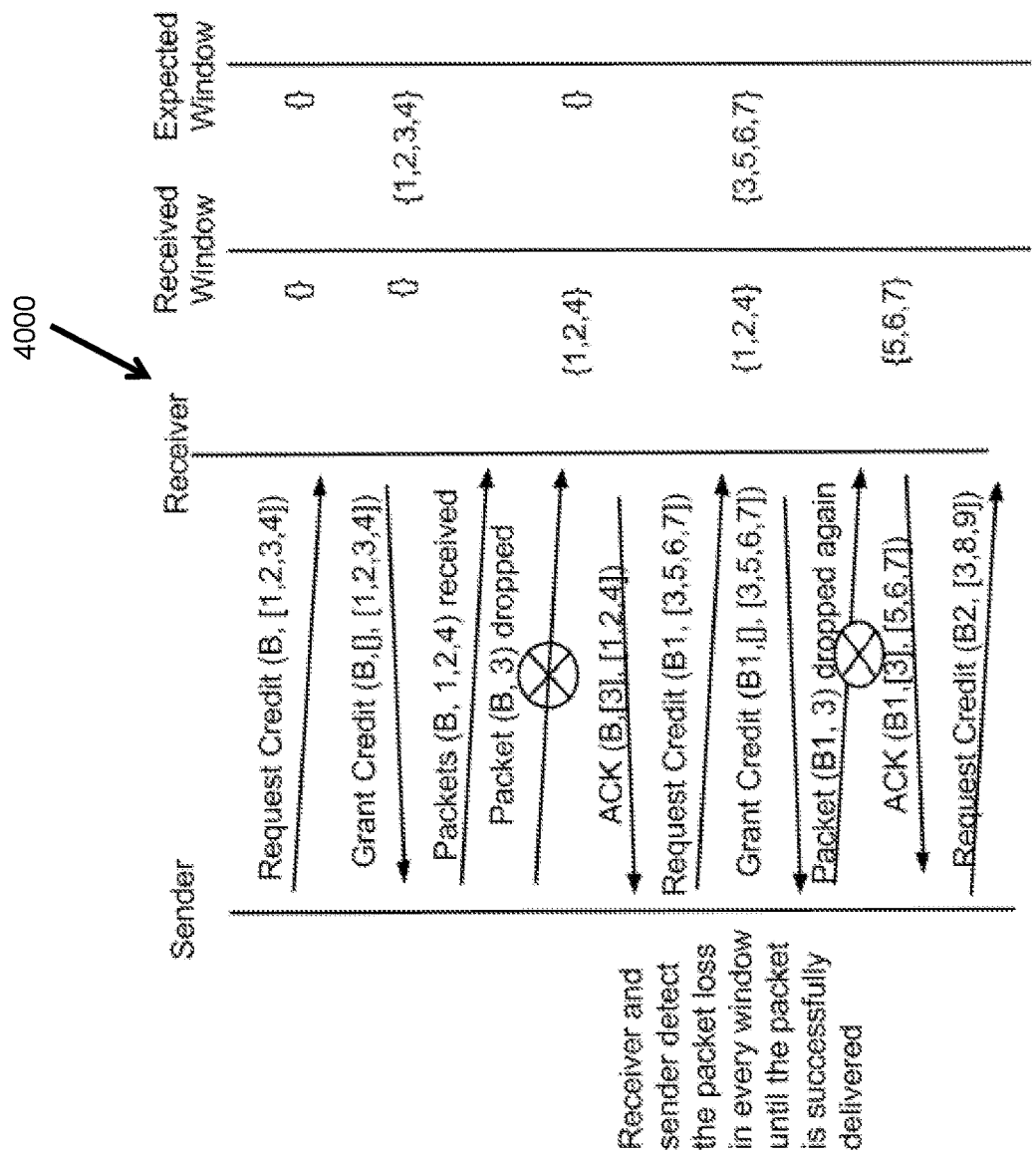
FIG. 40 illustrates an alternate multiple loss scenario flow diagram.

FIG. 40 shows a scenario 4000 involving multiple failures, such as in this case where the same packet has been lost more than once. The receiver and sender detect the packet loss in every window until the packet is successfully delivered.

Figure 41:
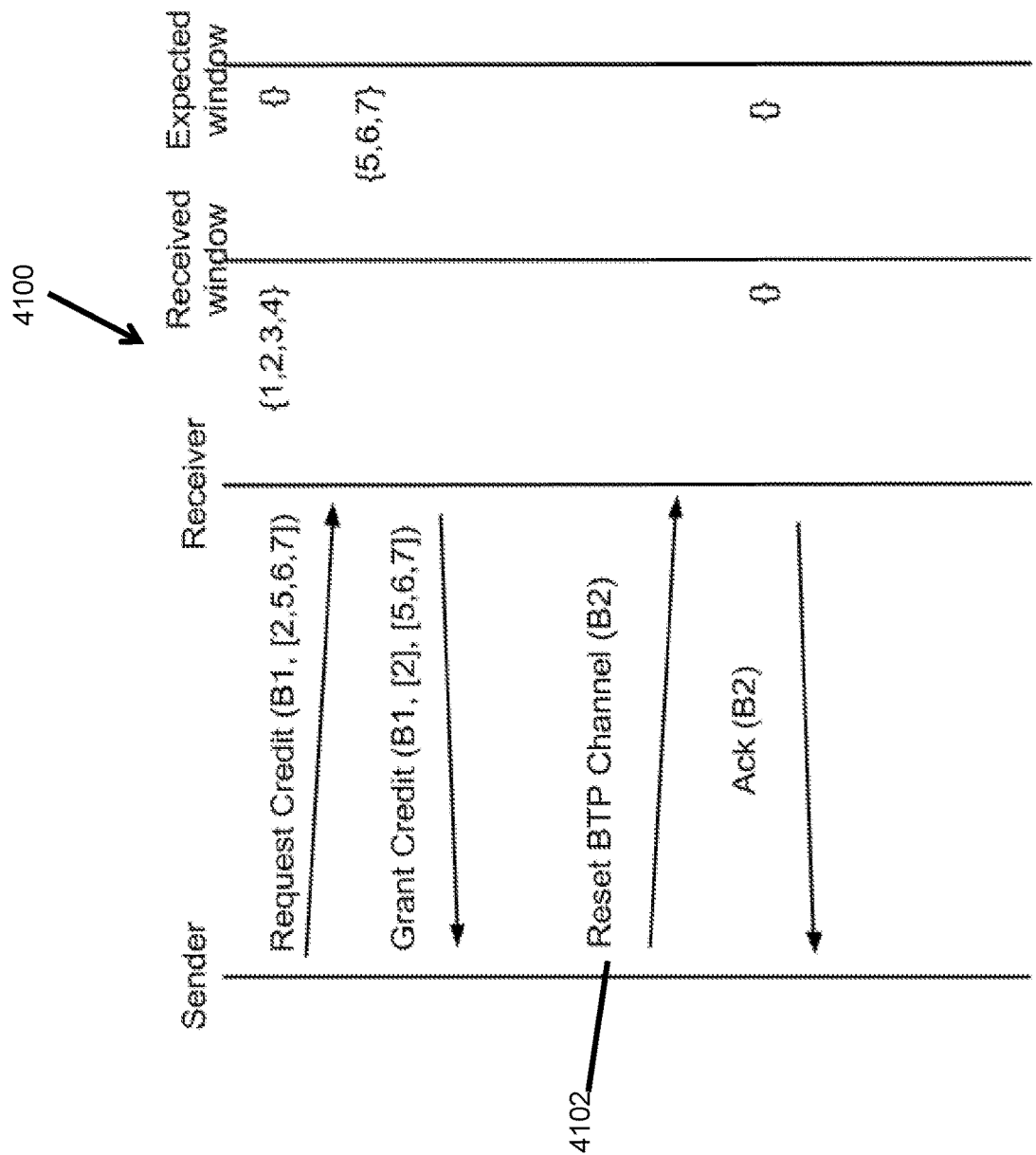
FIG. 41 illustrates a channel reset scenario flow diagram.

Referring to FIG. 41, in a flow 4100, at any point of time the BTP sender can send a channel reset message 4102, which may reset the received and expected burst windows at the receiver to an empty set. This may be used in cases where the BTP sender determines that it may be out of sync with the receiver and wishes to reset the BTP windows to a well-known state. The BTP Receiver in this case may drop all state information (receiver, expected windows and all packets) associated with that BTP Channel and respond with an ACK. The BTP sender may receive the ACK to the channel reset before it can send any newer request credit messages on that channel.

The NVMEoN exchange layer 3202 works on top of the BTP layer 3204 to provide framing and exchange level semantics for executing an NVME command (both admin and I/O) between an initiator and target. The fundamental building block for encapsulating NVME commands over the network is the introduction of the notion of an exchange for each NVME command. The NVMEoN exchange layer at the initiator may allocate a unique exchange for every NVME command that it sends to a given target. A NVME command may result in multiple exchanges. For example if a NVME command is divided into multiple sub-commands, there may be multiple exchanges associated with to NVME command. The initiator may maintain state information about this exchange in an exchange status block (ESB) until the exchange is completed. In embodiments, the initiator may ensure that the exchange is unique to cover NVME commands across the proxy controller ID (the ID of the proxy controller 2902 at the initiator), the queue ID (the ID of the queue within the proxy controller 2902, and the command ID (the ID of the NVME command within the given queue). Translating these parameters to a unique exchange at the initiator means that the network and the target can be agnostic to these parameters. The NVMEoN exchange layer at the target may allocate an ESB entry upon receipt of the first network packet in the exchange, which will be the NVME command that initiated the exchange.

Referring to FIG. 42, the NVMEoN exchange layers at both the initiator and target may use the Exchange Status Block, such as reflected in the table 4200 of FIG. 42, to establish synchronized, lockstep execution of the NVME commands.

The exchange id may be, for example, a 32-bit value divided into two components: an initiator's component of the exchange ID (IXID), which may be allocated by the initiator when the first packet of the exchange (the NVME command) is sent to the target and a target's component of the exchange ID (TXID), which may be allocated by the target when it receives the first packet of the exchange (i.e., the NVME command).

The following guidelines may govern the usage of exchange ids. First, the NVME command packet may signify the start of the exchange. The NVME status packet may also signify the end of an exchange. When the Initiator sends the first packet of the exchange, it may set the TXID, such as to 0xFFFF. The target may allocate a TXID upon receipt of this first packet. In the next packet that the target sends to the initiator, it may set the TXID for that packet to the allocated TXID. IXIDs and TXIDs are only required to be unique between an initiator and target pair. There is no necessity for this to be monotonically increasing, but that is an option.

As to the total number of concurrent exchanges, the initiator and target should support the same total number of concurrent exchanges in a given direction. In one example, the minimum value may be one, while the maximum value may be, for example, much larger, such as sixteen thousand. The actual value can be determined by an upper level entity, but should preferably be configured to be the same at the NVMEoN exchange layer 3202 at the initiator and at the target. If the target receives more than the number of concurrent exchanges that it supports with an initiator, it can drop an exchange, allowing the initiator to timeout.

A state machine may be implemented. Both initiator and target may follow a simple lock step mechanism in order to complete an I/O. There may be four states an exchange can be in: OPEN, DATA XFER, CLEANUP, or CLOSED. The triggers for the initiator and the target to place the exchange into the appropriate state is described in the table 4300 of FIG. 43. See the error recovery description below for an explanation on the state machine.

The NVMEoN exchange layer 3202 may be responsible for breaking down NVME command and data packets to adhere to the network MTU expected by the BTP layer 3204. In the depicted embodiment, the minimum workable size of MTU is 512 (as NVMEoN control packets are preferably not fragmented). However, in other examples, other minimum workable size may be set. The maximum size may uncapped to allow operating in networks with very large MTU enabled. An actual path for MTU discovery implemented in various ways as would be understood by those of ordinary skill in the art. It may be statically configured or discovered using agents running a standard discovery protocol on every node. The path MTU may remain or may not remain uniform in the network. For example, the path MTU may be different in each direction between a given pair of nodes. In accordance with the illustrated example of the protocol, per initiator, per target, or per pair, the MTU may be configured by some entity.

In an example, per the Remote NVME controller 2904 at the Target, exactly one <Initiator, Proxy NVME Controller 2902> pair may be associated by an entity. The nodes may discover remote namespaces exposed and the remote control pairing may be done in various ways without limitation. The control plane may be architected and proposed for standardization if the Network Path MTU and the Remote Controller Discovery may be specified as part of this protocol. In embodiments, various techniques used to discover hardware in a network fabric may be used, such as approaches used in connection with iSCSI (such as IQM-based discovery) or fiber channel approaches.

In embodiments, a handshake may be established between hardware and software elements of the burst transmission protocol layer and the NVMEoN exchange layer. In hardware, the handshaking may enable very precise handling of the timing of overlapping burst windows to make optimum use of bandwidth on the network and at the receiver.

The flow diagrams as to how the NVMEoN exchange layer 3202 handles each NVME command are provided herein in conjunction with the building blocks described above. In these flows, "E" represents an exchange as described in the above subsection.

Figure 44:
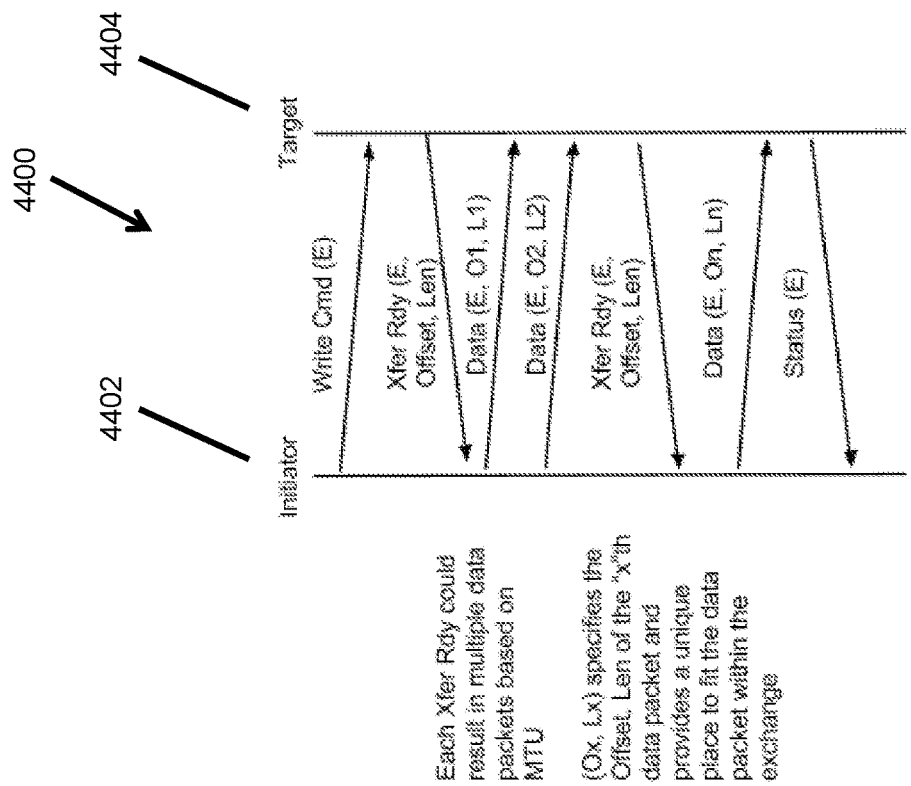
FIG. 44 illustrates a write command flow diagram.

Referring to FIG. 44, in a flow 4400 of a write command, an entire write I/O command may be sent in one shot by the initiator 4402. The target 4402 may control data transfer size using, for example, a Xfer Rdy message, based on its criteria (e.g. destination device page size, etc.). For instance, if it so chooses, the Target 4404 may ask for all of the data in the I/O in one shot. This may entirely depend on an implementer's choice. Each Xfer Rdy message may result in multiple data packets being generated by the exchange layer to adhere to the network path MTU. Each data packet may carry an offset and length uniquely identifying its place within the exchange.

Figure 45:
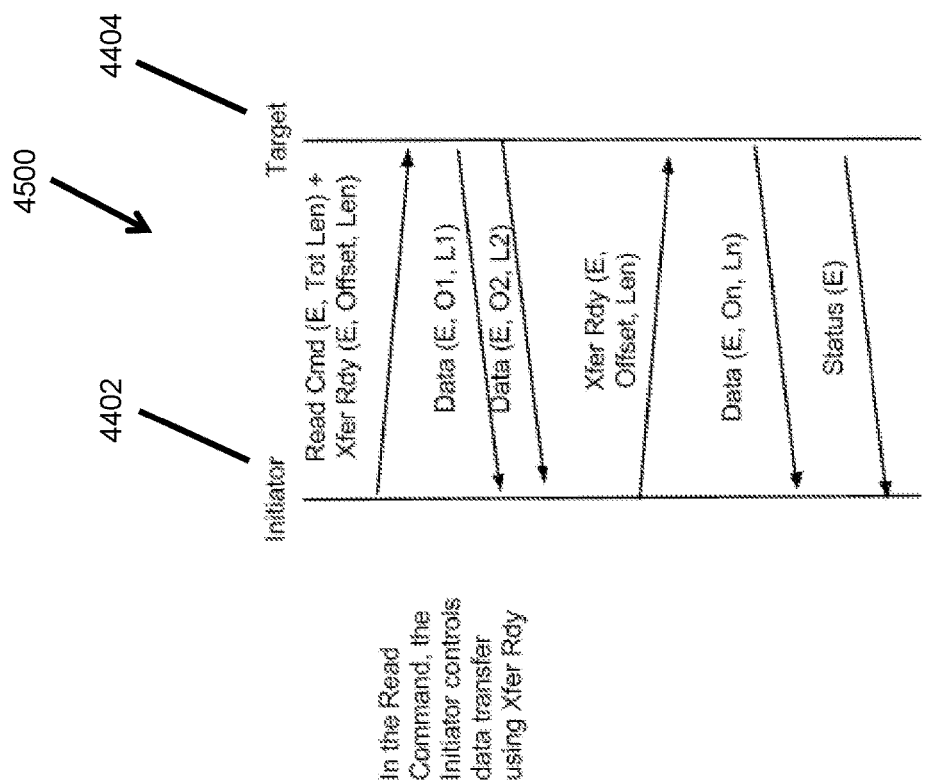
FIG. 45 illustrates a read command flow diagram.

Referring to FIG. 45, in a flow 4500 of a read command, the initiator 4402 may send a Xfer Rdy message right away. An entire Read I/O command may be sent in one shot by the initiator 4402. The first Xfer Rdy message may also be provided along with the Read Command indicating the size of initial transfer. The initiator 4402 may control data transfer size using a Xfer Rdy packet based on its criteria, which may be entirely based on the implementer's choice. Each Xfer Rdy packet may result in multiple data packets being generated by the exchange layer to adhere to the network MTU. Each data packet may carry the offset and length thereby uniquely identifying its place within the exchange.

Figure 46:
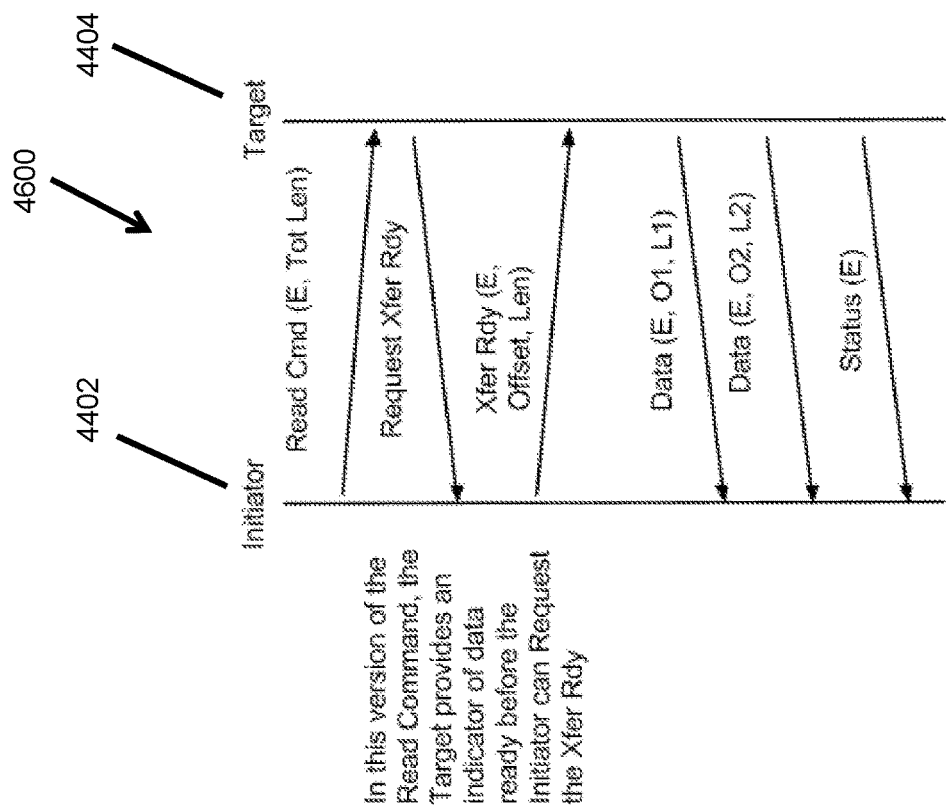
FIG. 46 illustrates a target ready indicator flow diagram.

Referring to FIG. 46, in a flow 4600, in a version of an exchange related to a read command, the target 4404 may provide an indicator of being ready for data before the initiator 4402 requests the Xfer Rdy packets.

Figure 47:
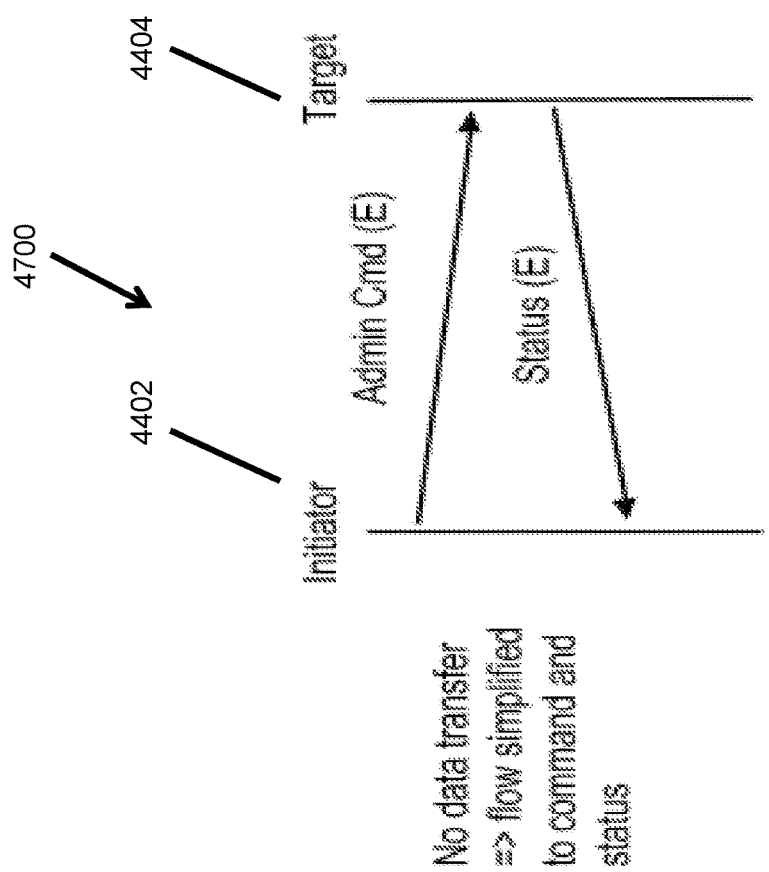
FIG. 47 illustrates an administrative command exchange flow diagram.
Figure 48:
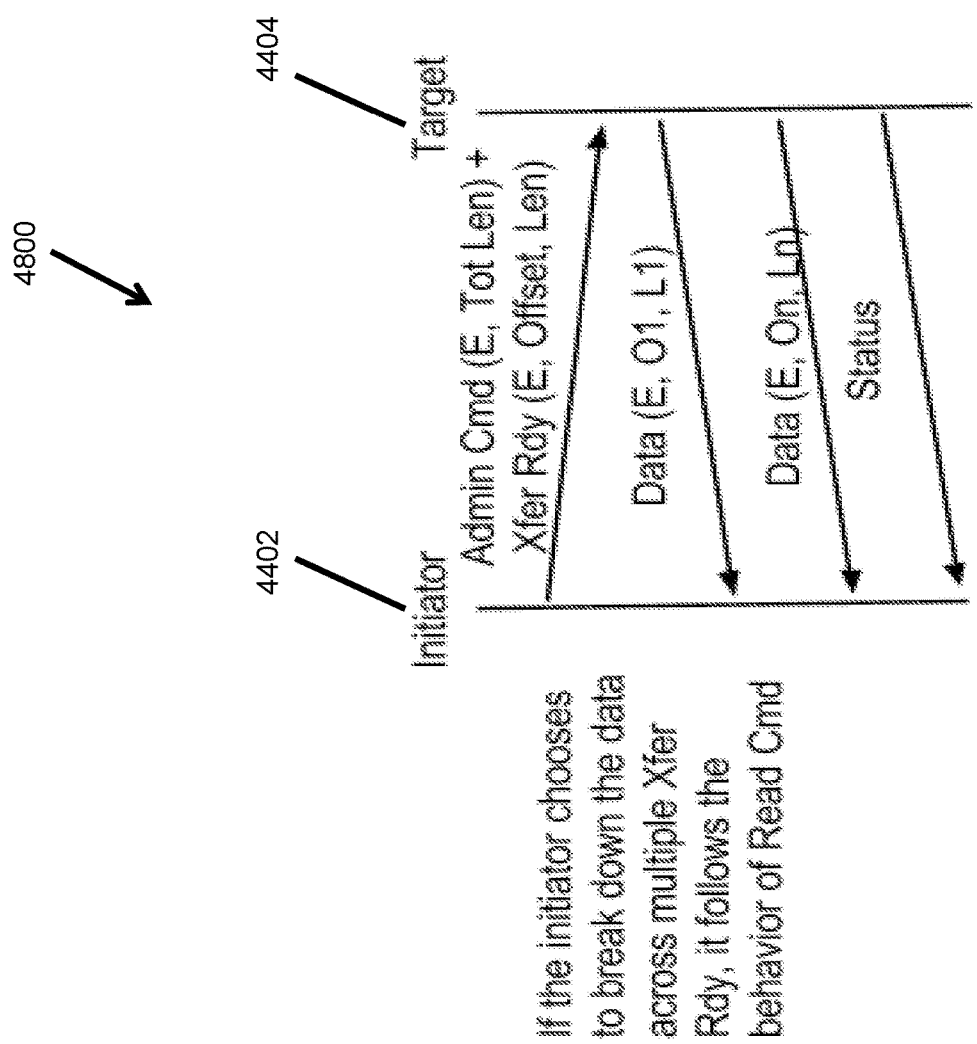
FIG. 48 illustrates use of multiple Xfer Rdy packets.

Referring to FIG. 47, in a flow 4700, administrative commands, such as a request for status and a reply, may be exchanged without any data transfer Referring to FIG. 48, in a flow 4800, a flow is provided for a case where an initiator breaks down data transfer across multiple Xfer Rdy packets. In this example, admin command data may be constrained to a particular length, such not going beyond 4K in this exemplary case. Therefore, while a single Xfer Rdy may work for many situations, in some examples the protocol may not preclude using multiple Xfer Rdys, which may use exchanges similar to those used for the read command discussed above. In some examples, the admin command data may be different and may go beyond 4K. The total length of transfer may be calculated by the initiator 4402.

Figure 49:
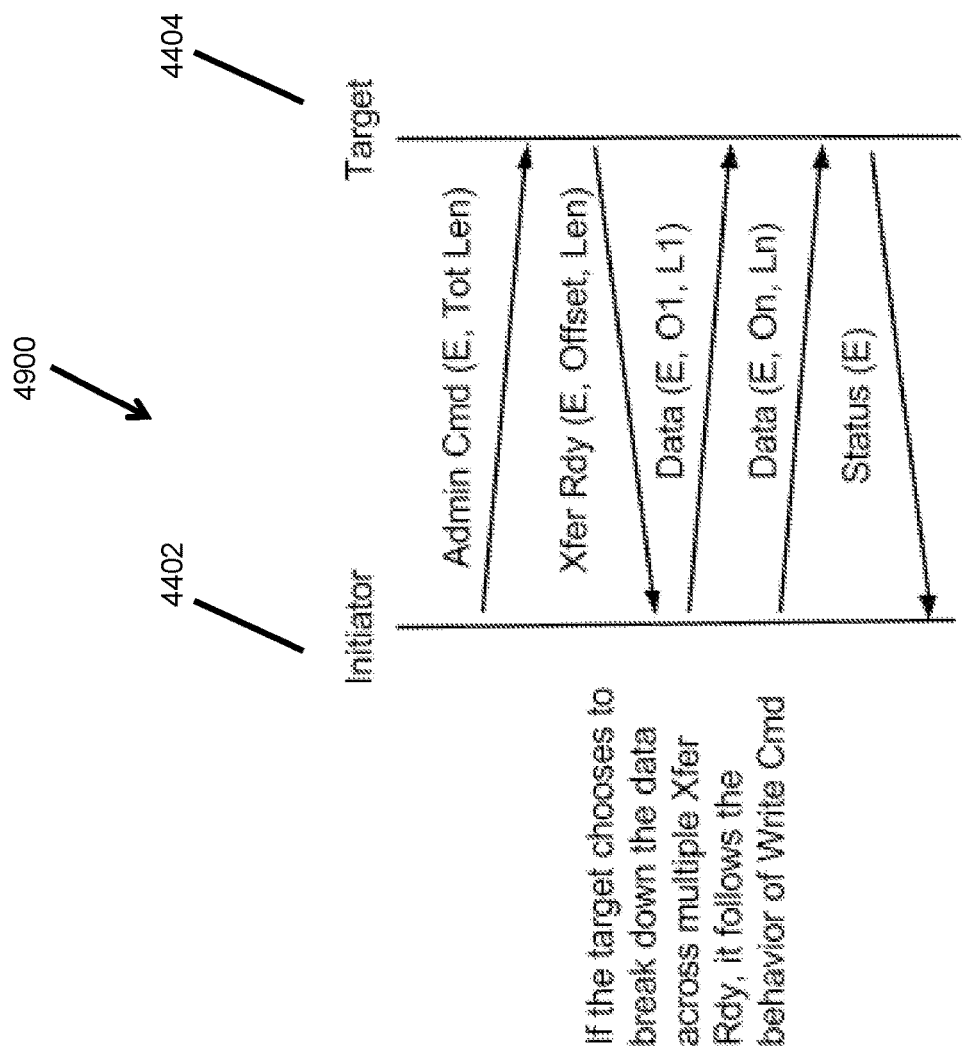
FIG. 49 illustrates admin command data length contraint.

Referring to FIG. 49, in a flow 4900, the admin command data may be constrained to a given length (e.g., in this case being constrained not to go beyond 4K). Thus, one Xfer Rdy message may work for the most part. However, the protocol may not preclude using multiple Xfer Rdys like Write Command. In some examples, the admin command data may be different and may go beyond 4K. The total length of transfer may be calculated by the initiator 4402.

Figure 50:
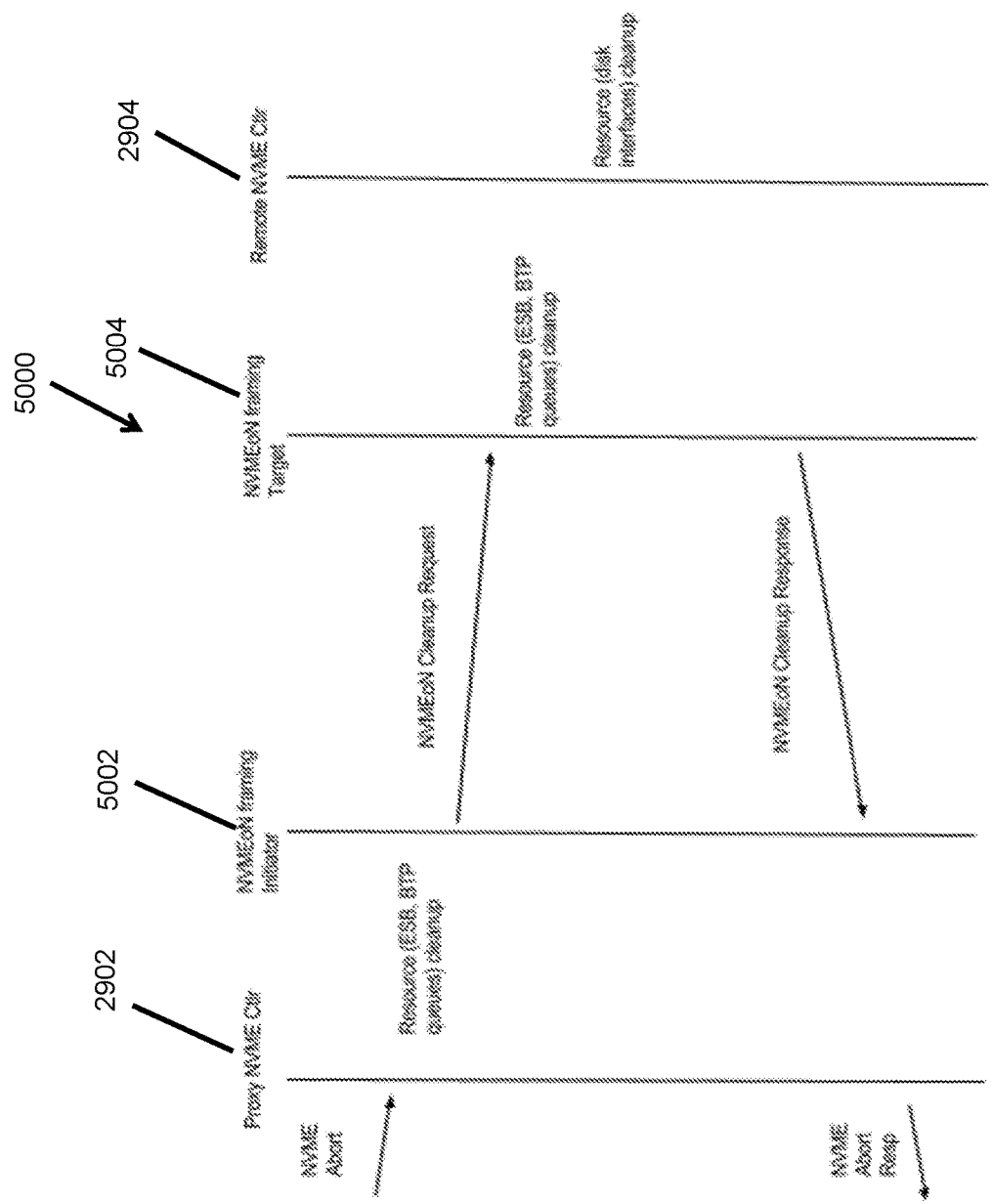
FIG. 50 illustrates a sequence of steps for error recovery.

Referring to FIG. 50, a sequence of steps for error recovery is described in a flow 5000. In an example, NVMEoN exchange layer at the initiator 5002 may not timeout exchanges because the BTP layer 3204 (below it, having capabilities described elsewhere in this disclosure) may provide guaranteed delivery of NVME command and data packets without duplicates using packet level retransmissions. In an example, the NVMEoN exchange layer at the initiator 5002 may not timeout exchanges because the NVME layer (above it) may use command timeouts to detect I/O level errors. The error recovery (except in network outage scenarios) may be initiated by the upper NVME layers, such as using NVME abort commands and/or NVME controller resets. The Proxy NVME controller 2902 may handle these scenarios, and the NVMEoN exchange layer at the initiator 5002 may then work with the target 5004 in lockstep to clean up resources (such as using a NVMEoN cleanup request). Various exemplary cases are discussed here without limitation. However, to protect against scenarios where a network outage may cause data packets like an NVMEoN cleanup request or its response to be dropped for long periods, the various timeouts may be implemented. For example, the NVMEoN exchange layer at the initiator 5002 may implement a timeout, e.g., called EXCH_CLEANUP_TOV, upon sending a NVMEoN cleanup request. If the response does not arrive within defined time period, the initiator 5002 may complete the trigger that instantiated the cleanup. Also, the NVMEoN exchange layer at the target 5004 may implement a very large exchange timeout, e.g., called EXCH_TOV, from the time the exchange is started to the time that it can complete or be completely cleaned up. If the timer expires, the target 5004 may clean up all the resources allocated for the exchange.

The error recovery may provide for handling an NVME abort Command. When an NVME driver detects an NVME command timeout, its recovery action may involve sending an NVME abort command. This command may be handled at various layers. For example, the proxy NVME Controller 2902 at the initiator 5002 may terminate the NVME abort command and use the NVME exchange layer APIs to clean up resources like the ESB and BTP queues. Also, the initiator 5002 may generate an NVMEoN cleanup request to the target 5004 identifying the exchange to clean up. Also, the remote NVME controller 2904 may clean up resources allocated for this exchange (e.g. commands queued to disk drives). Once all cleanup is done, a NVMEoN cleanup response may be passed all the way back to the Proxy NVME controller 2902 which may terminate the original I/O request and complete the Abort command.

The error recovery approach may provide for a reset of the proxy NVME controller 2902. The Proxy NVME controller reset may be handled using exactly the same or a similar flow as for an NVME abort command, but extending the NVMEoN cleanup request to specify multiple exchanges to clean up. The NVMEoN exchange layer at the initiator 5002 may keep track of which exchange IDs correspond to the proxy NVME controller 2902 and hence can do this translation. There may not need to be any resetting of the remote NVME controller 2904, as it is a logical, rather than physical, entity. Various possible failure scenarios during error handling (such as due to prolonged network drops) and recovery mechanisms that clean up resources at both the initiator 5002 and target 5004 are described here without limitation in accordance with various examples.

Figure 51:
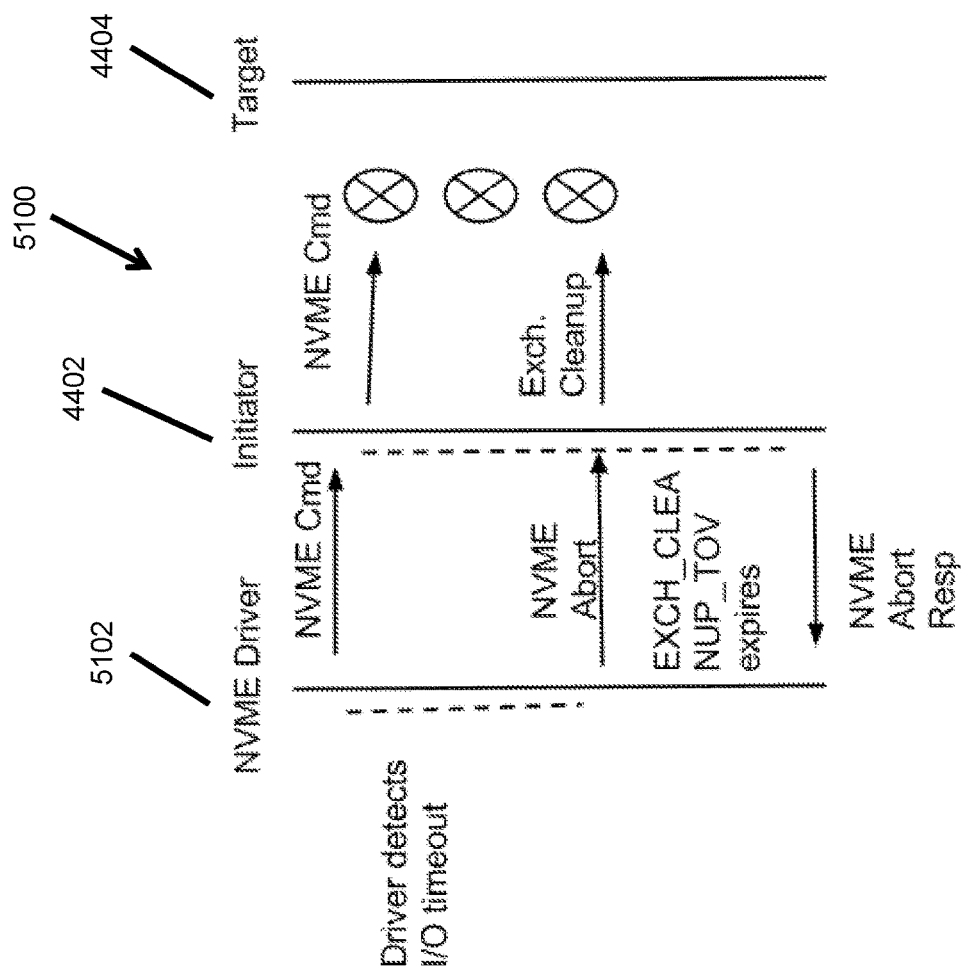
FIG. 51 illustrates time out flow due to repeated NVME first packet drops.

Referring to FIG. 51, repeated drops of a first NVME packet in an exchange are addressed discussed in a flow 5100. The NVME driver 5102 detects an I/O timeout after repeated drops and sends an abort command. An NVME abort response is sent after a timer, EXCH_CLEANUP_TOV, expires.

Figure 52:
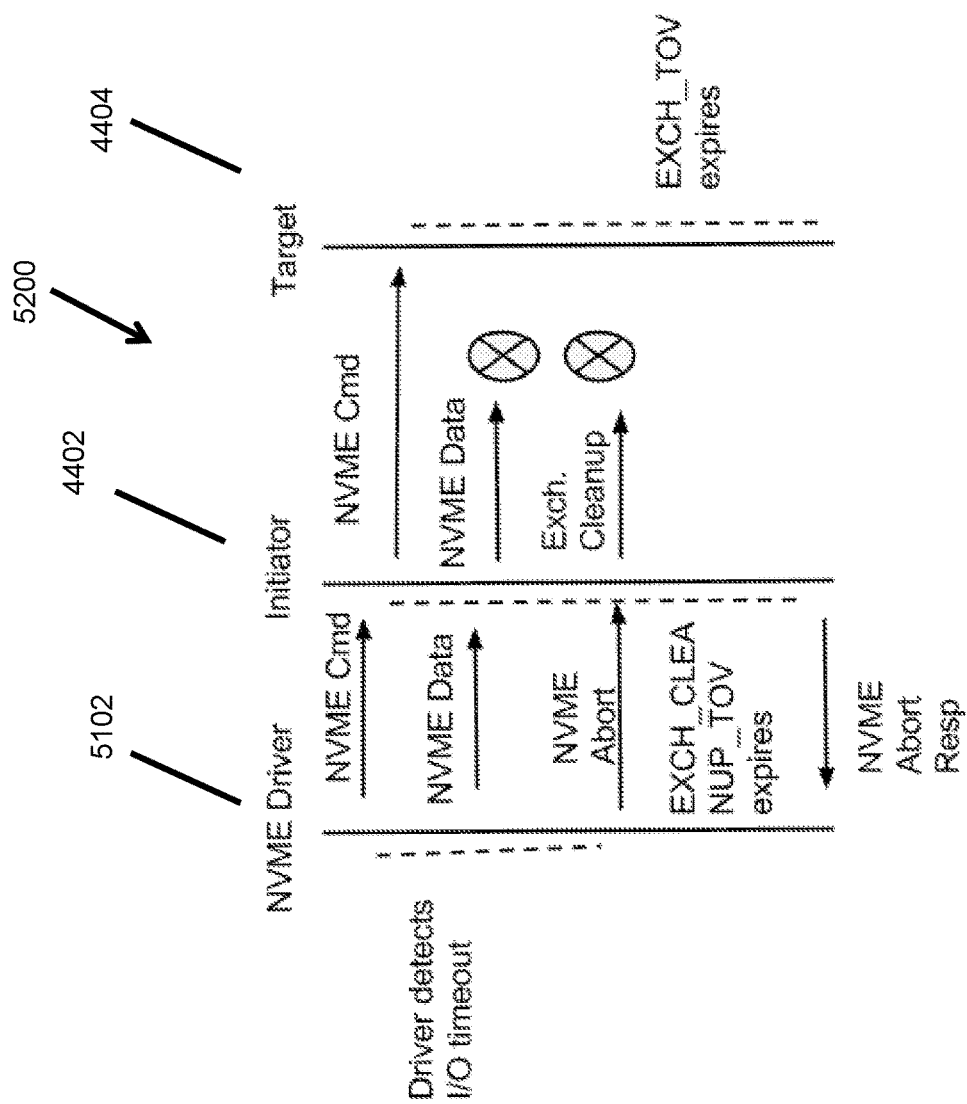
FIG. 52 illustrates time out flow due to repeated NVME subsequent packet drops.

Referring to FIG. 52, another example of an exchange involving repeated drops of subsequent NVME packets is discussed in a flow 5200. An abort command is sent after the NVME driver 5102 detects an I/O timeout. An abort response is sent after a timer, EXCH_TOV, expires.

Figure 53:
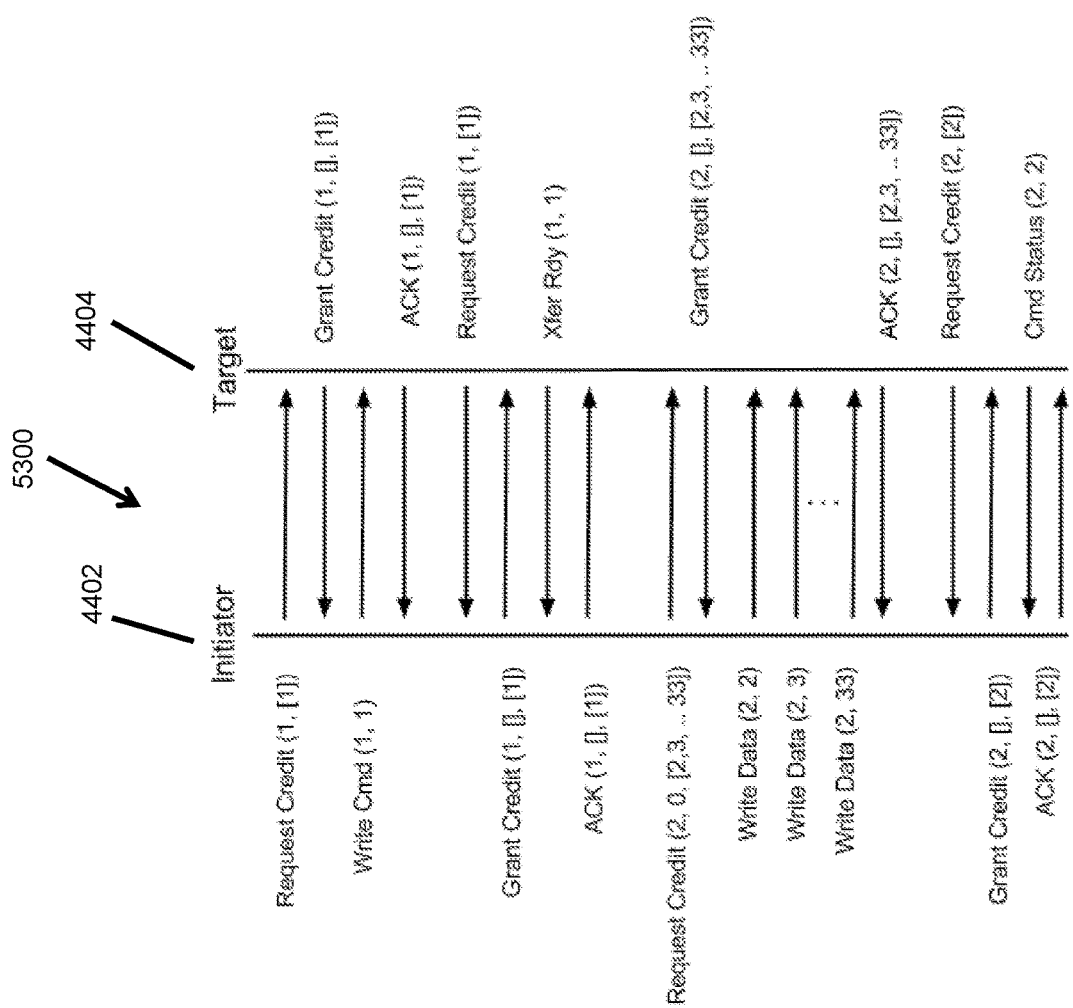
FIG. 53 illustrates a complete write command flow.

In order to determine the efficiency of the NVMEoN protocol, a comparison may be made relative to a protocol that sends every NVME PCIe transaction over the network with error detection boundaries at the NVME command level. Referring to FIG. 53, a flow diagram 5300 illustrates a complete flow of a 32K write command, but other length write commands may be implemented. The NVME command initiator 4402 and the target 4404 may each act as a BTP sender and a BTP receiver interchangeably depending on which one has data to send at a given step in the flow.

Figure 54:
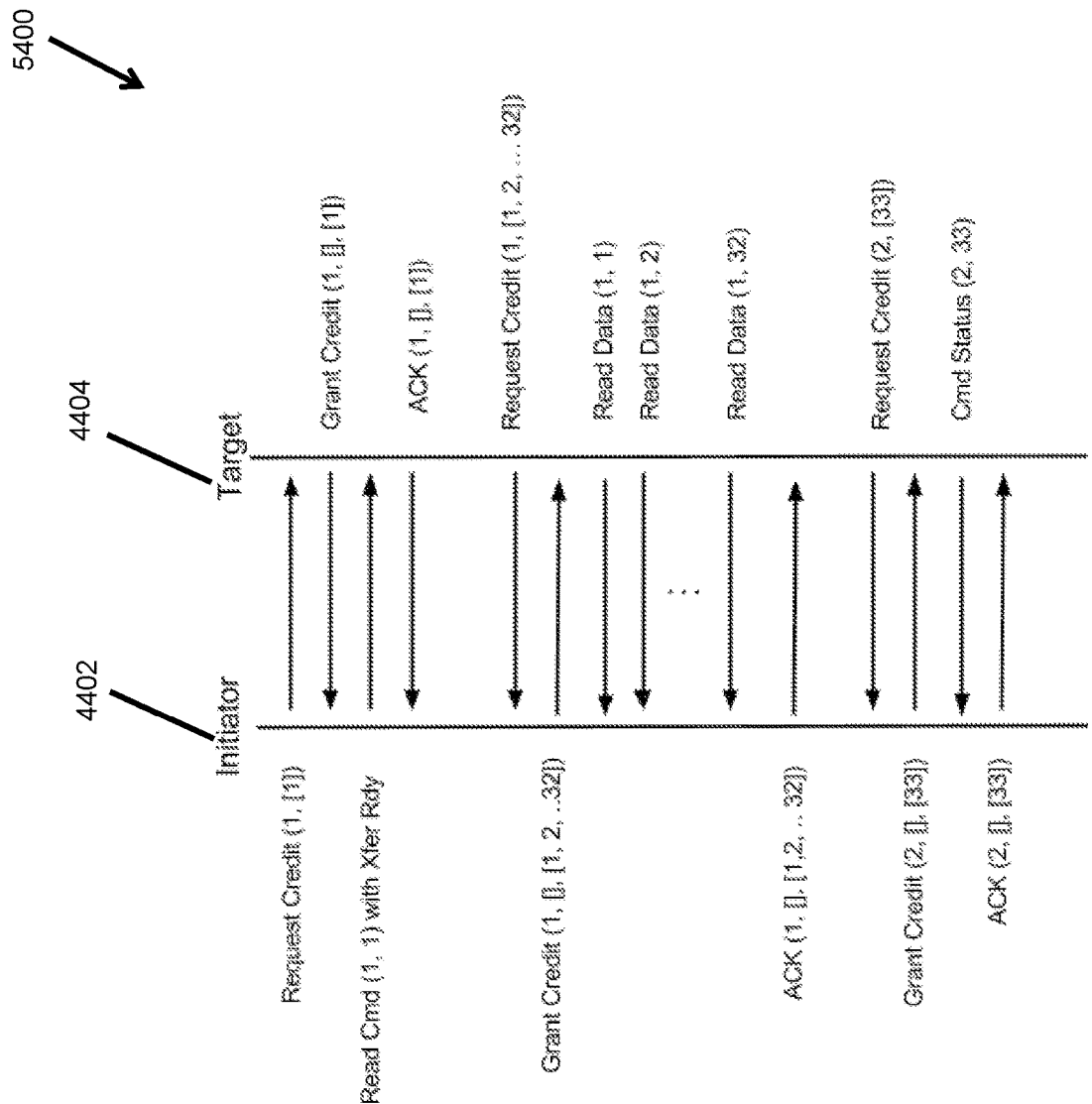
FIG. 54 illustrates a complete read command flow.

Referring to FIG. 54, a flow diagram 5400 illustrates a complete flow of a 32K read command, but other length read commands may be implemented. The NVME command initiator 4402 and the target 4404 may each act as a BTP sender and a BTP receiver interchangeably depending on which has data to send.

Figure 55:
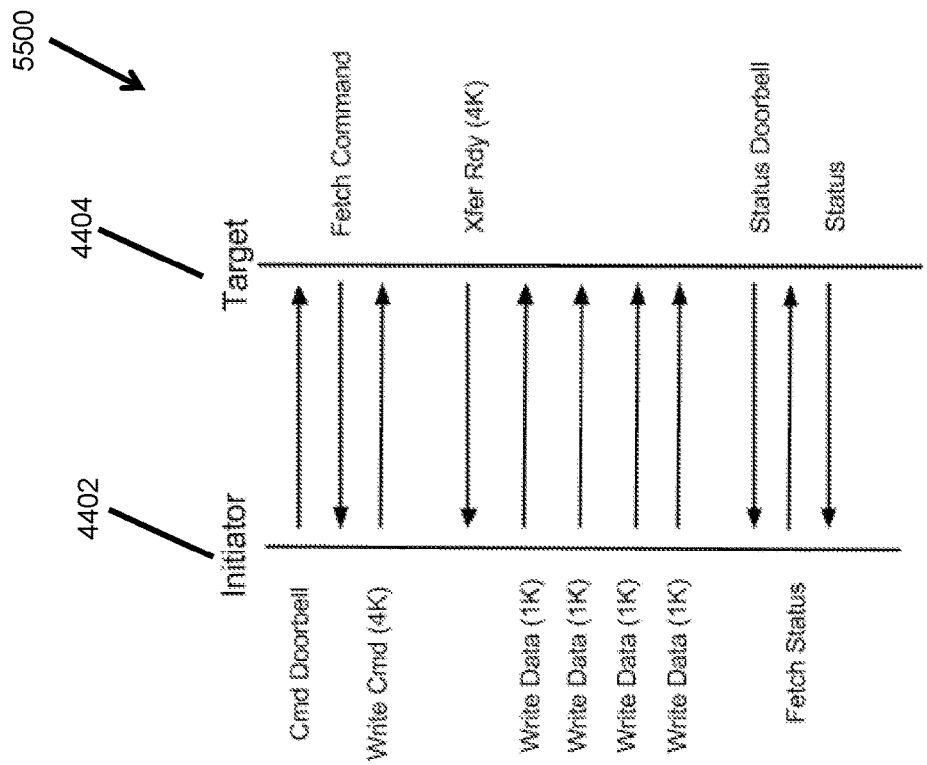
FIG. 55 illustrates a PCIe transmission over a network.

In contrast to the efficient flows of FIG. 53 and FIG. 54, in FIG. 55 a flow diagram 5500 illustrates a complete flow of a conventional 4K NVME write command that is implemented by sending every PCIe transaction over the network. Since the protocol has no inherent error recovery mechanism built into it, an entire I/O needs to be retried in the case where only a single packet is lost. The sending of an I/O at greater than a modest length boundary may likely result in inordinate number of retransmissions, warranting a split at some meaningful boundary like 4K. In order to achieve a 32K NVME write command, as compared in the previous example, the numbers for each cycle would be multiplied by eight, resulting in a far more steps to achieve the same command.

In order to compare overhead between the protocols, different sized I/Os, normal cases and drop scenarios may be considered. For example, "NVMEoN" may refer to the exemplary approach discussed above, while "Raw NVME" may refer to an approach of sending each NVME command without retransmissions being built into the protocol. The NVME data packets may be assumed to be fragmented at 1K boundaries (network MTU) in both cases for the sake of simple comparison, but may be fragmented differently in other examples.

Without limitation, an example comparison between NVMEoN and raw NVME for a single 4K write I/O command involves 19 total packets for NVMEoN (four request packets, four grant packets, and four ACK cycles=12 packets, plus three NVME command packets and four NVME data packets) and 11 total packets for raw NVME (command doorbell, fetch command, write command, Xfer ready, status doorbell, fetch status, status and four data packets). This example provides a theoretical scenario where only one NVME 4K I/O is outstanding between a pair of nodes, with no aggregation of flows. However, more typically there may be many flows between an initiator 4402 and a target 4402 allowing for a more efficient usage of every burst window in various examples. As there are additional flows, NVMEoN performs much better than raw NVME. An example comparison for 16 parallel 4K Write I/Os with no drops involves 127 total packets for NVMEoN (five request, grant, and ACK cycles=15 packets; 48 NVME command packets; and 64 NVME data packets) and at least 176 and up to 192 total packets for Raw NVME (11 packets for sending each 4K Write I/O (including Command Doorbell, Fetch Command, Write Command, Xfer Ready, Status Doorbell, Fetch Status, and Status, plus four data packets) times 16 I/Os results in 176 total packets.

In an example for a 32K Write I/O with no drops, NVMEoN requires 47 packets (four request, grand and ACK cycles=12 packets, three NVME command packets and 32 NVME data packets), while the Raw NVME requires 88 total packet (11 for each 4K write I/O as noted above times 8 cycles).

In an example involving a 128K Write I/O with no drops NVMEoN would require 152 total packets (7 Request, Grant, ACK cycles=21 packets, plus 3 NVME command packets and 128 NVME data packets), while Raw NVME would require 352 (the same 11 packets for each 4K write I/O as noted above, sent in 32 cycles for a total of 352 packets.

An example for a 32K Write I/O with a single data packet drop involves 51 packets for NVMEoN (5 Request, Grant, ACK cycles=15 packets, plus 3 NVME command packets, 32 NVME data packets and 1 NVME data packet retransmission, while Raw NVME requires 99 total packets (8 cycles of the same 11 packets needed for a 4K Write I/O as noted above, plus one retransmission of 11 packets, for a total of 99).

An example for a 32K Write I/O with two data packet drops is provided below without limitations. In accordance with this example, the two dropped packets may span 4K segments, but in other examples, the two dropped packets might span differently. Here NVMEoN requires 52 total packets (5 Request, Grant, ACK cycles=15 packets, plus 3 NVME command packets, 32 NVME data packets and 2 NVME data packets retransmission), while Raw NVME requires 110 total packets, including 8 cycles and 2 retransmission cycles (a total of 10), for the same 11 packets required for each 4K write I/O.

Thus, as seen in these examples, as complexity increases, drops occur, or parallel flows are involved, NVMEoN, which is comparable in performance to raw NVME for the simplest case, becomes significantly more efficient than raw NVME when sending data over a network.

Figure 56:
FIG. 56 illustrates a table of comparing different flow scenarios.

FIG. 56 illustrates a comparison table 5600 for different scenarios in an embodiment. In accordance with the depicted embodiment, at any I/O greater than 4K (or any other value in other embodiments), the overhead of NVMEoN protocol may be less compared to Raw NVME even without any aggregation of flows. With an aggregation of the flows, at any sized I/O the overhead associated with NVMEoN may be less than Raw NVME. As the size of the I/O increases, the overhead associated with the NVMEoN may become more and more minimal whereas that of Raw NVME may keep increasing.

Various timer values as used herein in various layers of the protocol may be set according to considerations relating to particular implementations. For example, a timer referred to as ERROR_TOV may be used by the BTP layer 3204 to detect packet losses in the network. An exemplary value may be 100 milliseconds, though other values may be defined in other examples. A timer referred to as EXCH_CLEANUP_TOV may be used by the initiator 4402 to determine a persistent network outage, causing the exchange cleanup to be dropped. An exemplary value may be 60 seconds, though other values may be defined in other examples. A timer referred to as EXCH_TOV may be used by the target 4404 to detect exchange timeouts due to repeated drops in the network and may clean up local resources. An exemplary value may be 90 seconds, but other values may be used.

Figure 57:
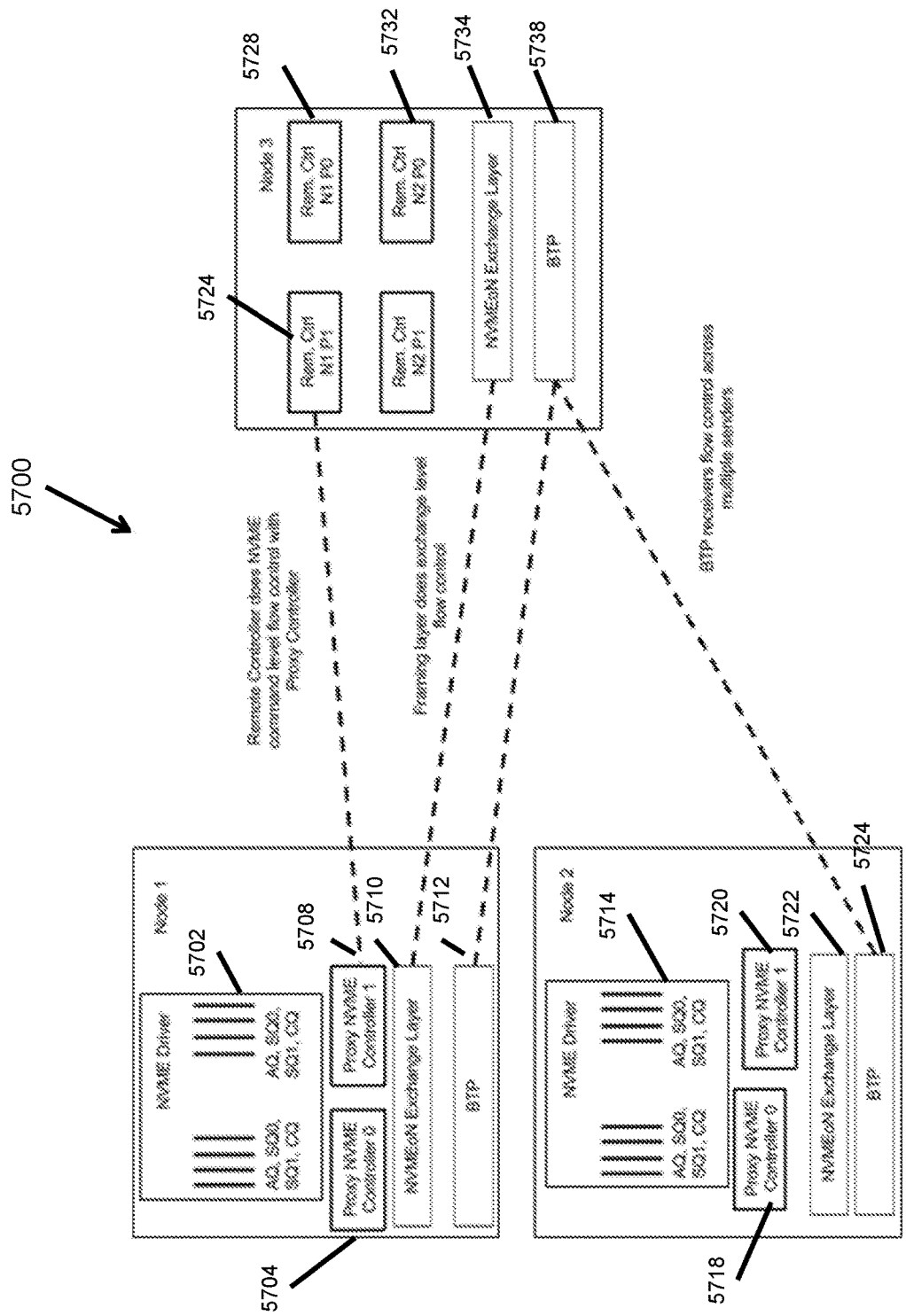
FIG. 57 illustrates a flow control enabling architecture diagram.

FIG. 57 illustrates an architecture diagram enabling flow control 5700 in an embodiment. End-to-End flow control knobs may be available at various levels in the protocol. These knobs may be best utilized with algorithms that are suitable for deployment scenarios based on an implementer's choice. At the lowest level, BTP receivers 5738 and senders 5712, 5724 may use a credit mechanism. This may happen at a packet level across I/O flows and may provide a basic building block to implement tunable parameters to throttle different senders to different rates. The NVMEoN Exchange Layer 5710, 5722, 5734 may perform flow control at the exchange level. While the target 4404 may support 256 concurrent exchanges with an initiator 4402 in accordance with the depicted embodiment, it may control the rate at which each of these exchanges are serviced, implicitly having an impact on the IOPs it exposes to a given Initiator. In other examples, the target 4404 may a support different number of concurrent exchanges. Since there may be one virtual remote controller 5724, 5728, 5732 per proxy controller 5704, 5708, 5718 5720, an actual rate of processing of the I/Os by a disk drive underneath the remote controller directly controls flows associated with queues in the NVME driver 5702, 5714 above the proxy controller.

There may be two possible options for implementing the NVMEoN to span network boundaries. In accordance with a first method, the initiator 4402 and the target 4404 end points may be identified using Ethernet MAC addresses. Any exemplary implementation may encapsulate the L2 packet in an overlay mechanism like VXLAN to span L3 segments. A special ether type may be needed to standardize this. In accordance with a second method, the initiator 4402 and the target 4404 end points may be identified using a special UDP port over a node's IP address. Standardizing on the UDP port number may facilitate the method.

In accordance with different embodiments, various network packet formats used for transporting NVME command/data packets and NVMEoN and BTP control packets may be employed. The packet formats may be defined with the initiator 4402 and the target 4404 as L2 endpoints. This may be seamlessly extended to L3 endpoints since it may not be dependent on the encapsulation in the protocol.

FIG. 58 illustrates NVMEoN encapsulation of an NVME Command Packet 5800 in an embodiment.

Figure 59:
FIG. 59 illustrates NVMEoN encapsulation of a batched NVME Command Packet 5900 in an embodiment.

FIG. 59 illustrates NVMEoN encapsulation of a batched NVME Command Packet 5900 in an embodiment.

FIG. 60 illustrates an NVMEoN Xfer Rdy command 6000 in an embodiment.

Figure 61:
FIG. 61 illustrates NVMEoN encapsulation of a NVME Data Packet 6100 in an embodiment.

FIG. 61 illustrates NVMEoN encapsulation of a NVME Data Packet 6100 in an embodiment.

FIG. 62 illustrates an NVMEoN Exchange Cleanup Request/Response 6200 in an embodiment.

Figure 63:
FIG. 63 illustrates BTP control packets 6300 in an embodiment.

FIG. 63 illustrates BTP control packets 6300 in an embodiment.

Figure 64:
FIG. 64 illustrates handling of undefined BTP opcodes.

Referring to FIG. 64, for BTP opcodes that are not defined in the table 6400, CTL bits may be set to 0. In other examples, the CTL bits may be set to other values.

Figure 65:
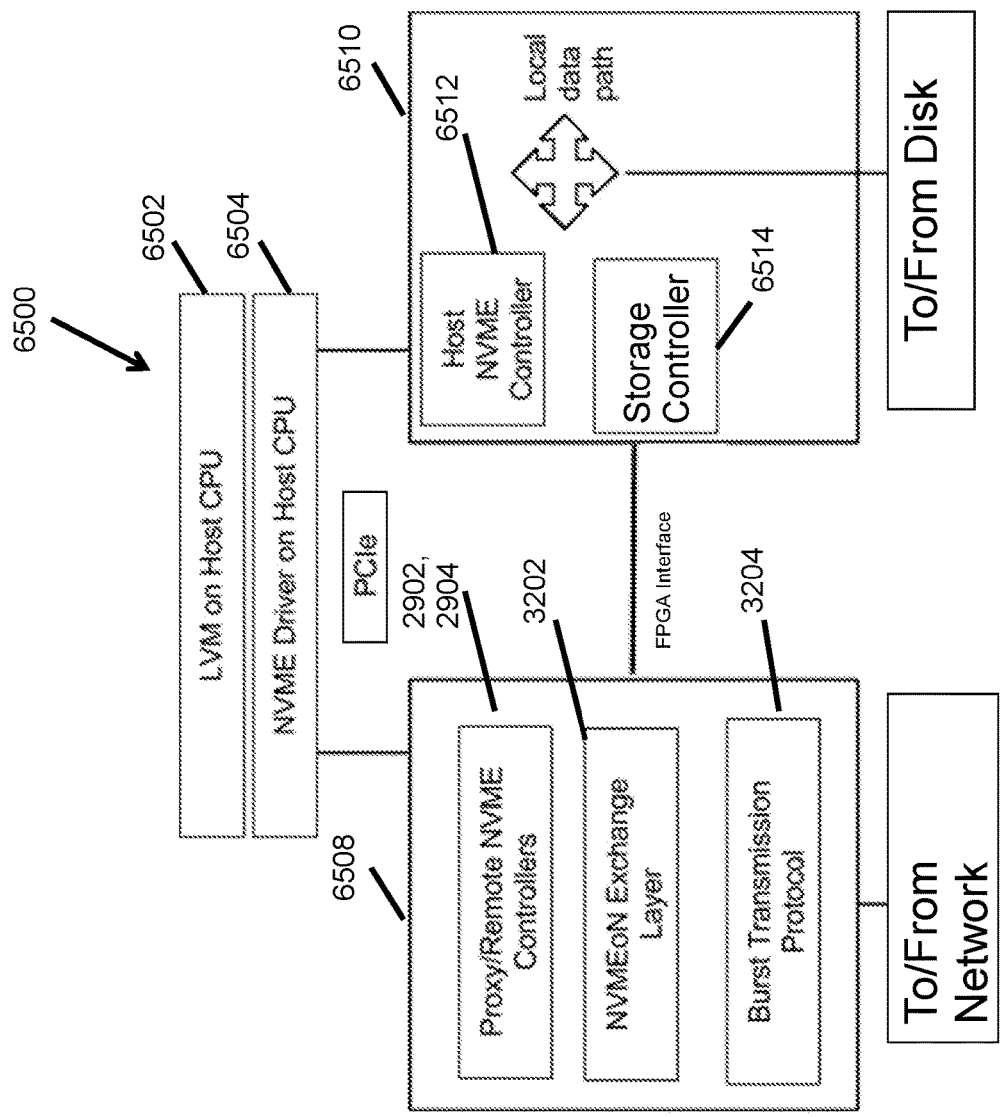
FIG. 65 illustrates an architecture for software-based NVMEoN deployment.

In various examples, various choices for implementation of the protocol may be employed. For example, FIG. 65 illustrates NVMEoN entirely in software 6500 in an embodiment. For example, all components of the NVMEoN may be implemented in the embedded CPU in software. The Proxy NVME controller 2902 may reside below a physical PCIe interface and may terminate all PCIe transactions. State Machines for the NVMEoN exchange layer 3202 and the BTP 3204 may be implemented in software, and packets may be sent over the network interface of the ECP network processorU. The remote controller may use the network processor ECPU NVME controller 6514 to translate all NVME commands received over the network to I/Os to/from the local disks. The depicted model may not depend on any particular hardware FPGA or other hardware assistance for NVME. In embodiments it may use board layout aspects, such as a PLX switch of some sort to support a PCIe slave end point at the network processor ECPU 6508, where the host CPU may be the master (just like an hardware FPGA embodiment as described elsewhere in this disclosure and/or involving an SRIOV NIC). In embodiments the network ECPU processor may have a PCIe interface that may function in a slave/target mode, with network interfaces going out of the network processor ECPU (which may or may not be connected to a switch of an hardware FPGA, such as an L2 switch, that embodies the methods described herein).

Figure 66:
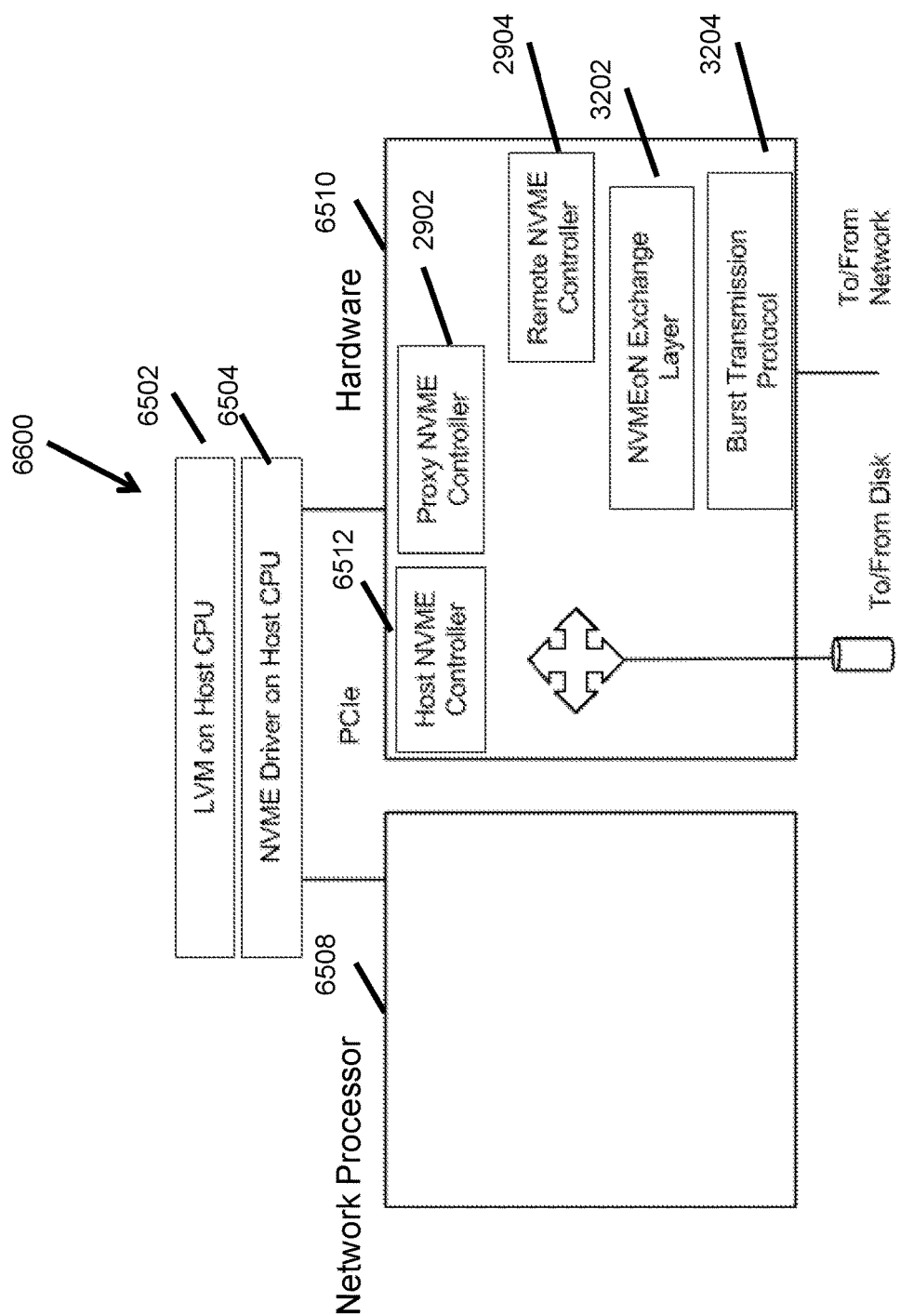
FIG. 66 illustrates an architecture for hardware-based NVMEoN deployment.

FIG. 66 illustrates a mode of the NVMEoN entirely in hardware 6600 in an embodiment. In accordance with the depicted model 6600 of FIG. 66, all components of the NVMEoN may be implemented in hardware 6510, such as an FPGA (Field Programmable Gate Array) referred to in some cases herein as Stevedore). The Proxy NVME controller 2902 may reside below a physical PCIe interface and may terminate all PCIe transactions, just like the host NVME controller 6512. A state machine for the NVMEoN exchange layer 3202 and the BTP 3204 may be implemented in hardware. The remote controller 2904 in a hardware embodiment may translate all NVME commands received over the network to I/Os to/from the local disks.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "has sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

We claim:

1. A method of using NVME over a network comprising:
    maintaining information about layer 2 network exchanges for each NVME command sent between an initiator node and a target node on a network in an exchange status block by an exchange layer executing on at least one node that is accessible over the network, wherein layer 2 network exchanges for each NVME command comprise a plurality of burst transmission protocol layer exchanges between the initiator node and the target node;
    encapsulating command packets and data packets for a plurality of PCIe I/O commands for a single target node into a burst packet;
    providing guaranteed delivery of each of the encapsulated data packets and the encapsulated command packets in the burst packet between the initiator node and the target node while avoiding retransmission of duplicate packets by one of the initiator node and the target node responding to a request credit message from one of the target node and the initiator node with a grant credit message that includes packet identifiers of packets identified in the request credit message that have been received and those that have not been received; and
    transporting PCIe level transactions of NVME commands via the burst packet as at least one of the encapsulated command packets and the encapsulated data packets to a virtual NVME controller executing on the target node over the network, the transporting performed by a proxy NVME controller located on a host node attached to the network.

2. A method of claim 1, further comprising initiating and closing of a burst window that is configurable based on at least one of a type of data, a type of network and a network condition, wherein the burst transmission protocol facilitates the initiating closing of the burst window.

3. A method comprising:
    encapsulating command packets and data packets for a plurality of PCIe input/output commands for a single target device into a NVME message; and
    communicating the NVME message through a layer 2 network connection with the target device, the layer 2 network connection for the NVME message comprises a plurality of burst transmission protocol layer exchanges at least one of which comprises a burst packet of at least one of the encapsulated command packets and the encapsulated data packets, wherein the communicating further guarantees that encapsulated information for each of the plurality of PCIe input/output commands is delivered to the target independent of a communication fault condition, the guarantee of delivery being provided by a retransmission protocol operating within the layer 2 network connection, the retransmission protocol comprising the target device responding to a request credit message with a grant credit message that includes packet identifiers of packets identified in the request credit message that have been received and those that have not been received.

4. The method of claim 3, wherein the target device comprises a NVME controller.

5. The method of claim 3, wherein a size of a payload of the NVME message is fixed.

6. The method of claim 5, wherein the fixed size comprises at least one integer multiple of 512 bytes.

7. The method of claim 3, wherein the retransmission protocol operating with the layer 2 network connection detects NVME messages that do not reach the target and in response thereto performs selective retransmission based on a credit redistribution algorithm.

8. The method of claim 7, wherein the credit redistribution algorithm manages burst transmission protocol buffers among initiators and targets.

* * * * *